US011143850B2

(12) United States Patent
Hori et al.

(10) Patent No.: US 11,143,850 B2
(45) Date of Patent: Oct. 12, 2021

(54) ZOOM LENS AND IMAGE PICKUP APPARATUS

(71) Applicant: CANON KABUSHIKI KAISHA, Tokyo (JP)

(72) Inventors: Masao Hori, Utsunomiya (JP); Naotoshi Ogawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 171 days.

(21) Appl. No.: 16/674,352

(22) Filed: Nov. 5, 2019

(65) Prior Publication Data

US 2020/0158997 A1 May 21, 2020

(30) Foreign Application Priority Data

Nov. 15, 2018 (JP) .............................. JP2018-214834

(51) Int. Cl.
G02B 15/14 (2006.01)
G02B 7/28 (2021.01)
G03B 5/02 (2021.01)
G03B 3/10 (2021.01)
H04N 5/232 (2006.01)

(52) U.S. Cl.
CPC ......... *G02B 15/1441* (2019.08); *G02B 7/282* (2013.01); *G03B 3/10* (2013.01); *G03B 5/02* (2013.01); *H04N 5/23296* (2013.01)

(58) Field of Classification Search
CPC ........ G02B 15/1441; G02B 15/144113; G02B 7/282; G03B 11/045; G03B 3/10; G03B 5/02; H04N 5/23296
See application file for complete search history.

(56) References Cited

U.S. PATENT DOCUMENTS

| 10,295,806 | B2 | 5/2019 | Miyazawa et al. |
| 10,359,604 | B2 | 7/2019 | Hori |
| 2018/0292627 | A1* | 10/2018 | Takemoto .............. G02B 15/20 |
| 2019/0265447 | A1 | 8/2019 | Hori et al. |
| 2019/0265448 | A1 | 8/2019 | Ogawa et al. |
| 2019/0265451 | A1 | 8/2019 | Shimomura et al. |

FOREIGN PATENT DOCUMENTS

| JP | H06186477 A | 7/1994 |
| JP | 2017078772 A | 4/2017 |

\* cited by examiner

*Primary Examiner* — Joseph P Martinez
*Assistant Examiner* — Vipin Patel
(74) *Attorney, Agent, or Firm* — Carter, DeLuca & Farrell LLP

(57) ABSTRACT

Provided is a zoom lens including, in order from object side: a positive first unit configured not to be moved for zooming; one or two negative second units configured to be moved for zooming; a stop configured to reduce an outer part of an off-axis light; two or three third units configured to be moved for zooming; and a fourth unit, in which focal lengths of the first unit and the second units, a distance on an optical axis from the stop to a vertex of a surface closest to the object side in the third units under a zoom state in which F-drop starts, and a distance on the optical axis from a vertex of a surface closest to the image side in the second units to the vertex of the surface closest to the object side in the third units under the zoom state are appropriately set.

12 Claims, 22 Drawing Sheets

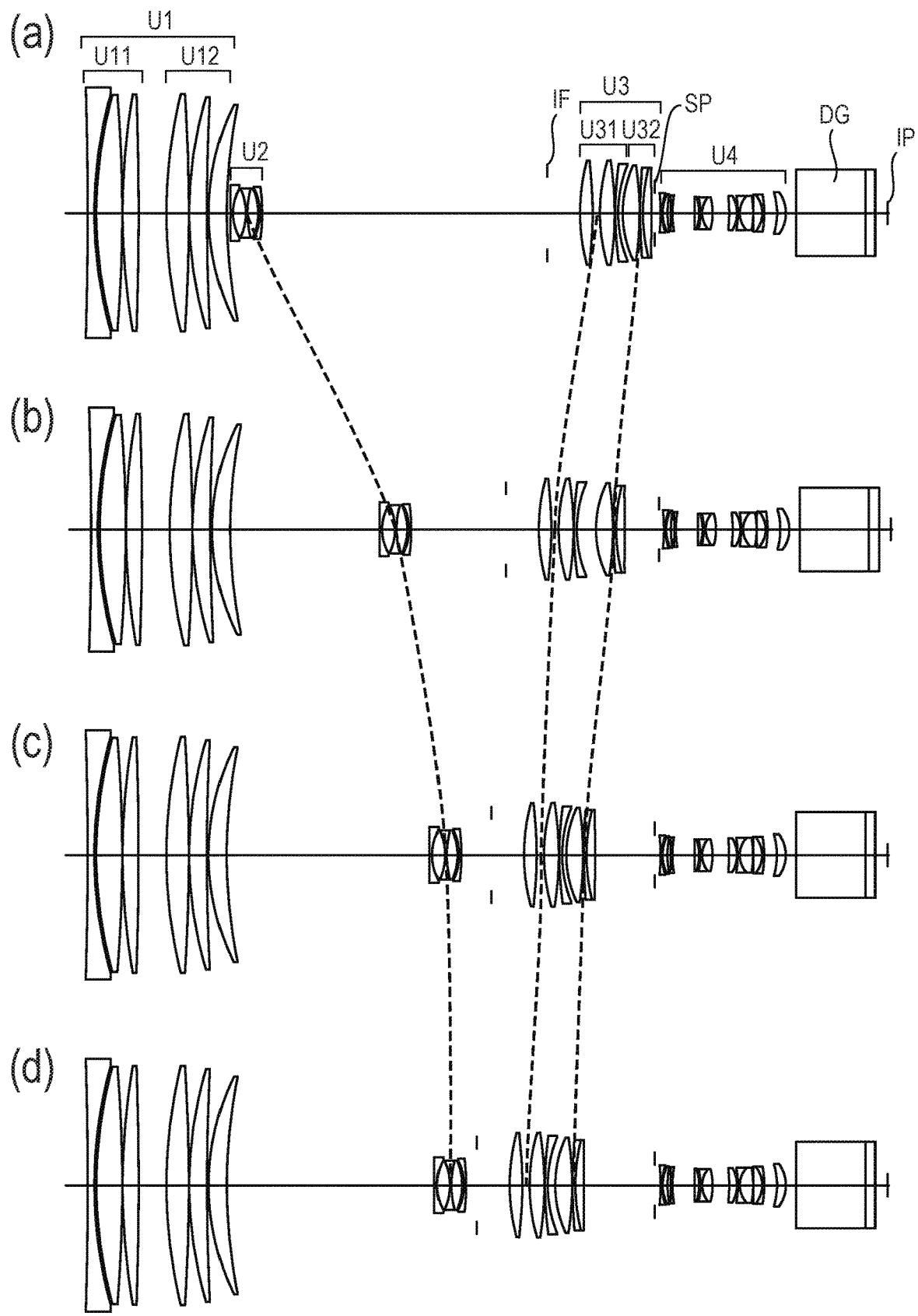

FIG. 3
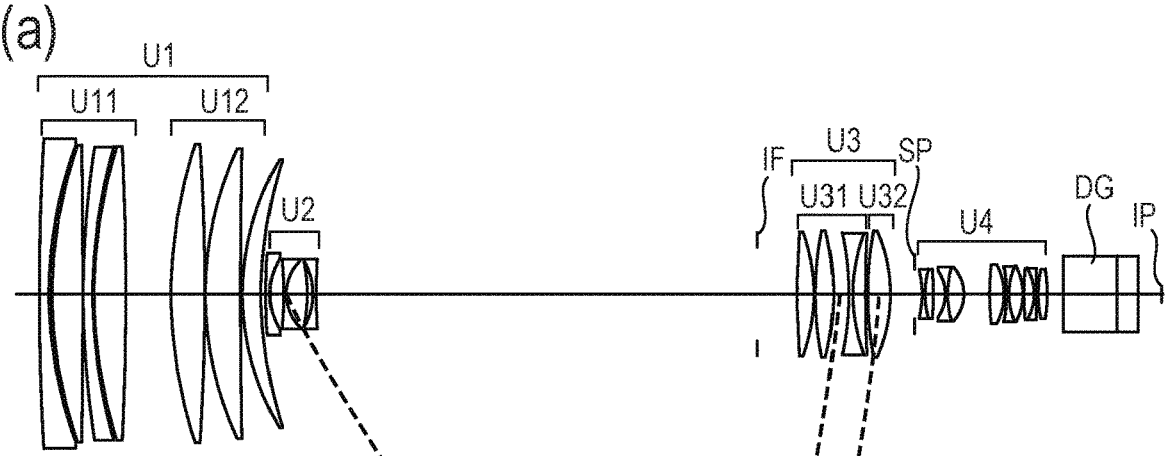
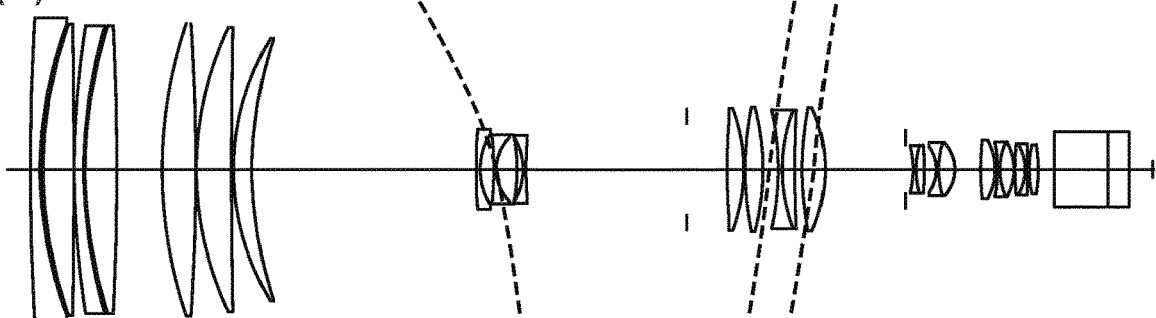
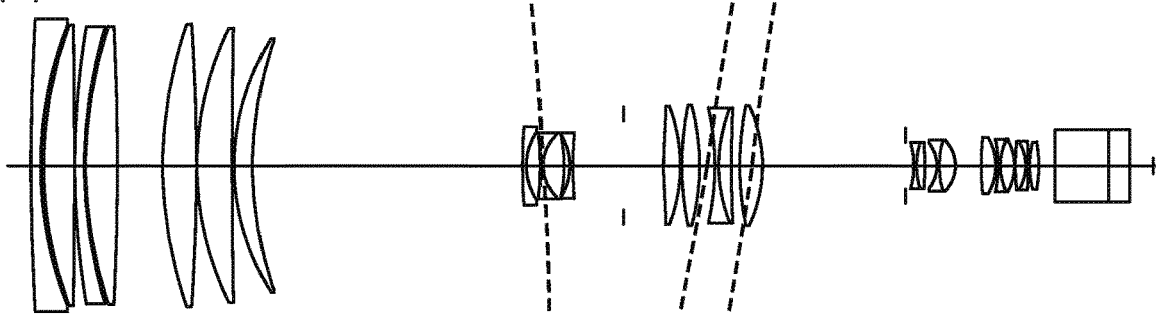
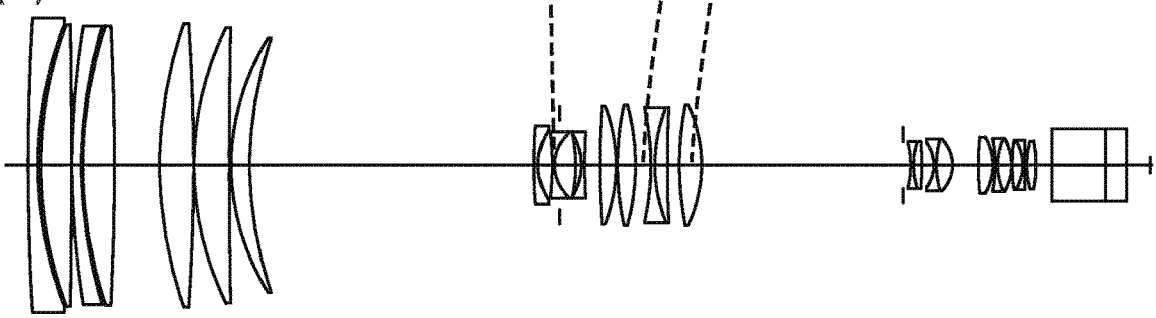

FIG. 5
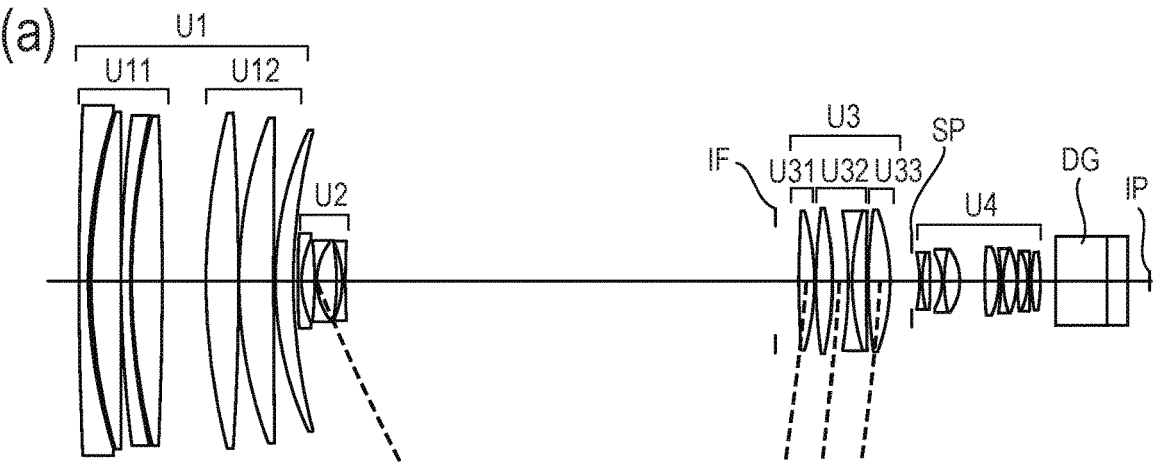
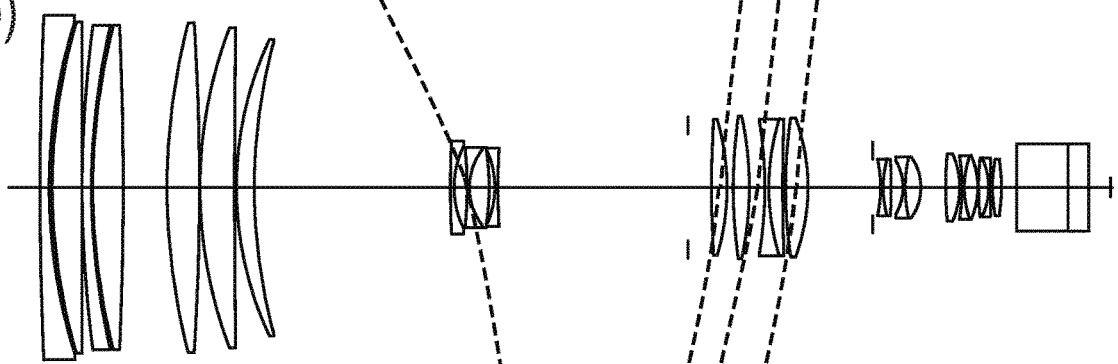
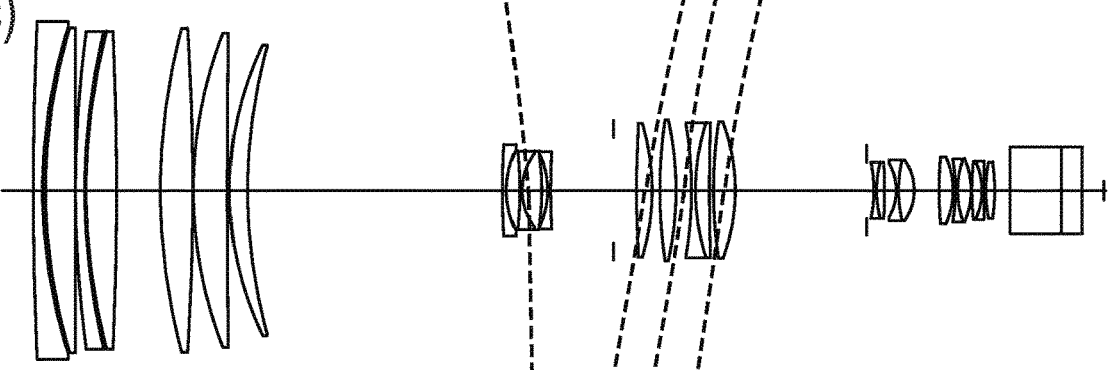
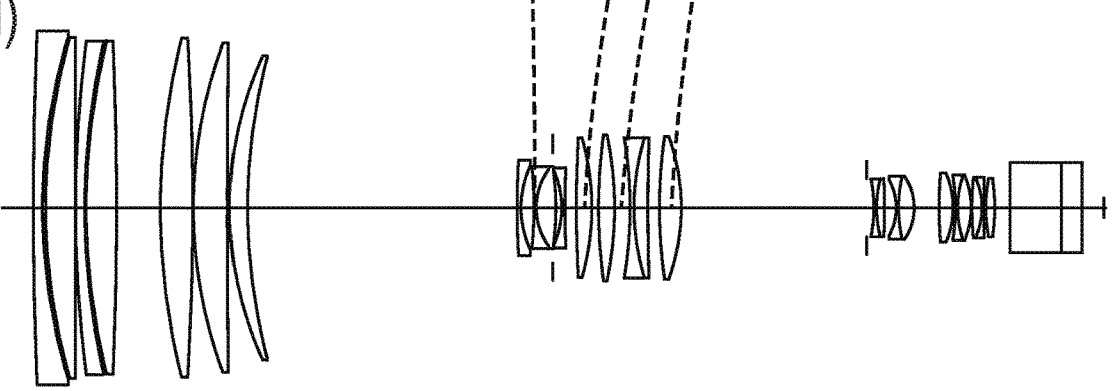

FIG. 7
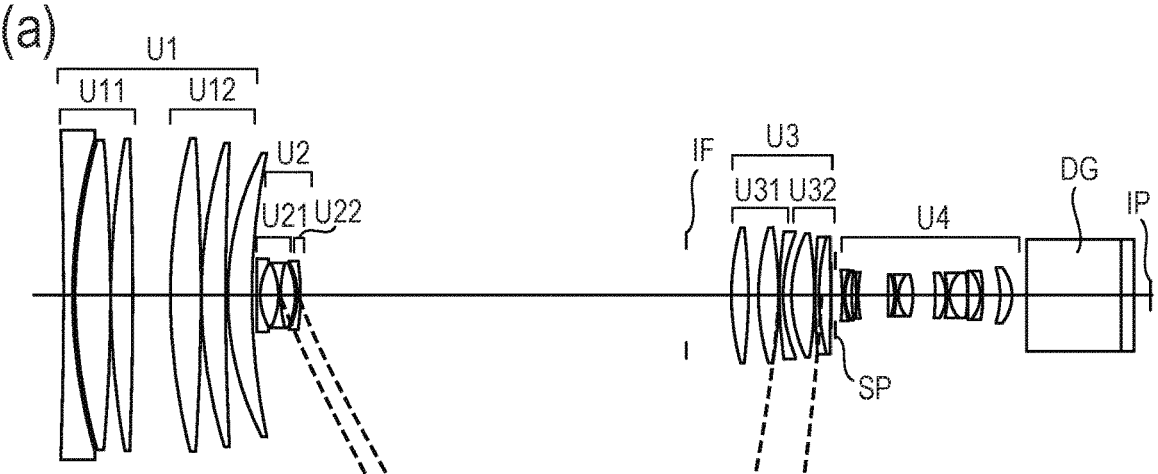
(a)
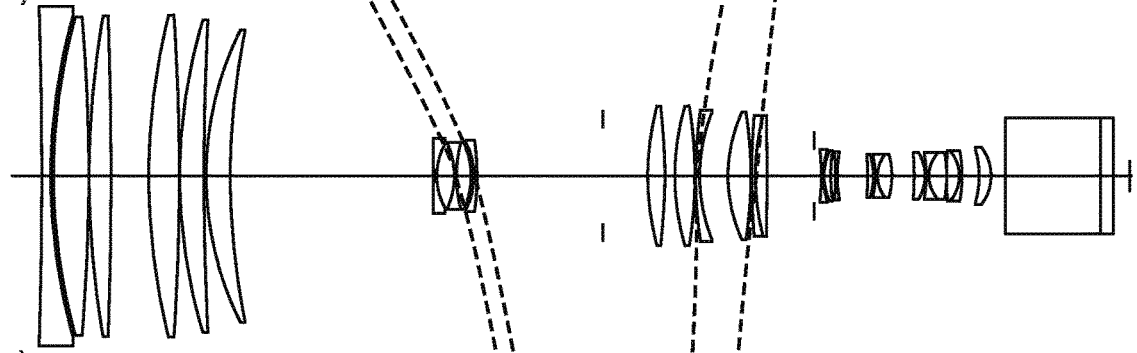
(b)
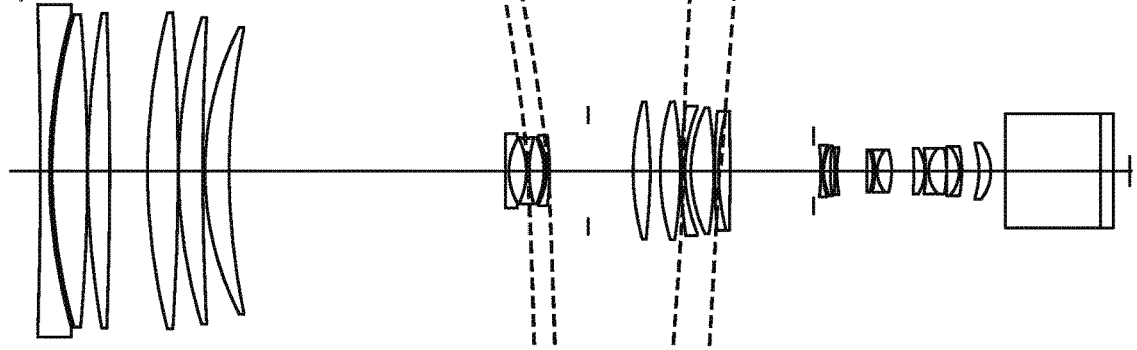
(c)
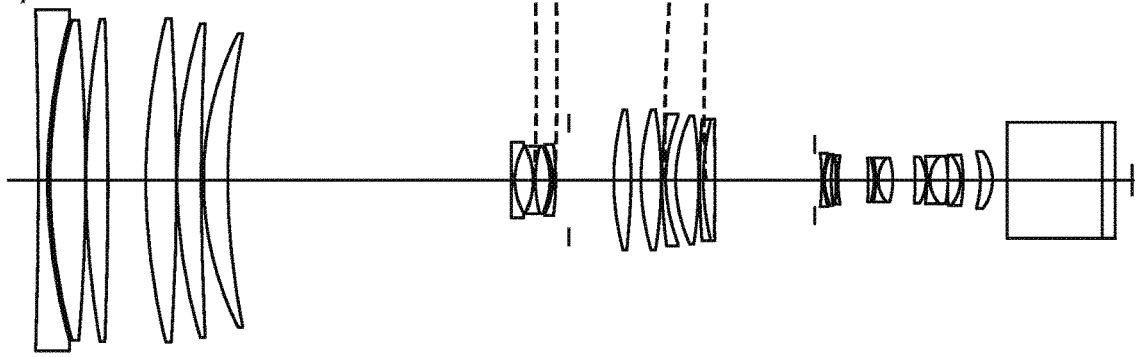
(d)

ZOOM LENS AND IMAGE PICKUP APPARATUS

BACKGROUND OF THE INVENTION

Field of the Invention

The present invention relates to a zoom lens and an image pickup apparatus.

Description of the Related Art

For image pickup apparatus, such as television cameras, silver-halide film cameras, digital cameras, and video cameras, in recent years, a zoom lens having a high magnification, a wide angle, and high optical performance is required. As an example of a zoom lens having a high magnification, there has been proposed a zoom lens of a so-called four-unit type including, in order from an object side, a first lens unit having a positive refractive power, which is configured to move for focusing, a second lens unit having a negative refractive power, which is configured to move for varying magnification, a third lens unit having a positive refractive power, which is configured to move for varying magnification and compensating for image plane variation, and a fourth lens unit having a positive refractive power for forming an image, in which the second lens unit and the third lens unit have image forming powers of −1 times at the same time for varying magnification.

In Japanese Patent Application Laid-Open No. H06-186477, there is disclosed a four-unit zoom lens consisting of a first lens unit having a positive refractive power, a second lens unit having a negative refractive power, a third lens unit having a positive refractive power, and a fourth lens unit having a positive refractive power, which has a photographing angle of view of 57.6° at a wide angle end and a zoom magnification of about 44×. The zoom lens disclosed in Japanese Patent Application Laid-Open No. H06-186477 includes a flare cutting stop, which is arranged between the second lens unit and the third lens unit, is configured to move on an optical axis, and has an invariable aperture diameter. Incidentally, the term "F-drop" refers to a phenomenon that an open f-number is increased on a telephoto side of a certain focal length, and is caused by a relationship between a focal length and an aperture diameter in the zoom lens. In this specification, a position of a lens unit involved in zooming at which the open f-number starts increasing is referred to as an "F-drop point" for convenience. In the structure according to Embodiment 1 of Japanese Patent Application Laid-Open No. H1106-186477, the flare cutting stop is attracted to a magnet of a lens barrel of the third lens unit to approach an object side together with the third lens unit until the F-drop point is reached, and is attracted to a magnet at a distal end of a lens barrel of the second lens unit to separate away from the magnet of the third lens unit, and is reduced in distance to the third lens after the F-drop point. In the structure according to Embodiment 2 of Japanese Patent Application Laid-Open No. H1106-186477, a spring mechanism is provided to a portion connecting between the stop and the third lens unit, and the spring structure is pressed after the F-drop point to reduce a distance between the flare cutting stop and the third lens unit.

There is also proposed a so-called multi-unit zoom lens including three or more lens units involved in varying magnification, and consisting of a total of five or more lens units. In Japanese Patent Application Laid-Open No. 2017-78772, there is disclosed a five-unit zoom lens consisting of a first lens unit having a positive refractive power, a second lens unit having a negative refractive power, a third lens unit having a positive refractive power, a fourth lens unit having a positive refractive power, and a fifth lens unit having a positive refractive power, which has a photographing angle of view at a wide angle end of 77.2° and a zoom magnification of about 4.3×. The first lens unit is configured not to move for zooming, the second to fourth lens units are configured to move for zooming, and a stop that is different from a stop configured to determine an f-number is arranged between the second lens unit and the third lens unit.

In the four-unit zoom lens proposed in Japanese Patent Application Laid-Open No. H06-186477, a movement locus of the third lens unit (compensator) is uniquely determined with respect to a movement locus of the second lens unit (variator) for varying magnification. Therefore, in order to achieve a zoom lens having a high magnification, a wide angle, and a small f-number, an effective diameter of the third lens unit tends to be increased, and it has been disadvantageous for downsizing, reducing a weight, and achieving high performance. To address this problem, although excess off-axial beams are cut by the flare cutting stop to increase performance (image performance) around a screen (image plane), movement of the stop is inverted discontinuously after the F-drop point, and a structure for holding the flare cutting stop is extended from the third lens unit toward the second lens unit, which are disadvantageous in terms of simplicity, small size, and light weight of the mechanism. Further, a possibility that instantaneous impact and a variation in load torque may be caused during zooming by the flare cutting stop may cause a sense of awkwardness in operability and image field change rate in the vicinity of the F-drop point.

Meanwhile, in Japanese Patent Application Laid-Open No. 2017-78772, although the stop is arranged between the second lens unit and the third lens unit in addition to the stop configured to determine the f-number, a main object thereof is to suppress upsizing of the first lens unit by reducing a distance to an entrance pupil, and there is no specific description on suppressing comatic flare from the wide angle end to an intermediate state.

SUMMARY OF THE INVENTION

An aspect of embodiments provides, for example, a zoom lens beneficial in imaging performance in a periphery of an image thereof.

According to embodiments of the present invention, there is provided a zoom lens including, in order from an object side to an image side: a first lens unit having a positive refractive power and configured not to be moved for zooming; one or two second lens units having a negative refractive power and configured to be moved for zooming; a stop configured to reduce an outer part of an off-axis light; two or three third lens units configured to be moved for zooming; and a fourth lens unit, wherein conditional expressions $$-13.0 \leq f1/f2 \leq -5.0; \text{ and}$$

$$0.26 \leq Xi3/S23 \leq 0.46,$$

are satisfied where f1 represents a focal length of the first lens unit, f2 represents a focal length of the one or two second lens units, Xi3 represents a distance on an optical axis from the stop to a vertex of a surface closest to the object side in the two or three third lens units at a zoom state in which F-drop starts, and S23 represents a distance on the optical axis from a vertex of a surface closest to the image side in the one or two second lens units to the vertex of the surface closest to the object side in the two or three third lens units at the zoom state.

Further features of the present invention will become apparent from the following description of exemplary embodiments with reference to the attached drawings.

BRIEF DESCRIPTION OF THE DRAWINGS

FIG. 1 shows lens cross-sectional views in a state in which focus is at infinity at (a) a wide angle end, (b) an intermediate zoom position, (c) an F-drop point, and (d) a telephoto end according to Embodiment 1 (Numerical Embodiment 1) of the present invention.

FIG. 2Ab shows lateral aberration diagrams in the state in which focus is at infinity at the wide angle end according to Numerical Embodiment 1.

FIG. 2Bb shows lateral aberration diagrams in the state in which focus is at infinity at the intermediate zoom position according to Numerical Embodiment 1.

FIG. 2Cb shows lateral aberration diagrams in the state in which focus is at infinity at the F-drop point according to Numerical Embodiment 1.

FIG. 2Db shows lateral aberration diagrams in the state in which focus is at infinity at the telephoto end according to Numerical Embodiment 1.

FIG. 3 shows lens cross-sectional views in the state in which focus is at infinity at (a) a wide angle end, (b) an intermediate zoom position, (c) an F-drop point, and (d) a telephoto end according to Embodiment 2 (Numerical Embodiment 2) of the present invention.

FIG. 4Ab shows lateral aberration diagrams in the state in which focus is at infinity at the wide angle end according to Numerical Embodiment 2.

FIG. 4Bb shows lateral aberration diagrams in the state in which focus is at infinity at the intermediate zoom position according to Numerical Embodiment 2.

FIG. 4Cb shows lateral aberration diagrams in the state in which focus is at infinity at the F-drop point according to Numerical Embodiment 2.

FIG. 4Db shows lateral aberration diagrams in the state in which focus is at infinity at the telephoto end according to Numerical Embodiment 2.

FIG. 5 shows lens cross-sectional views in the state in which focus is at infinity at (a) a wide angle end, (b) an intermediate zoom position, (c) an F-drop point, and (d) a telephoto end according to Embodiment 3 (Numerical Embodiment 3) of the present invention.

FIG. 6Ab shows lateral aberration diagrams in the state in which focus is at infinity at the wide angle end according to Numerical Embodiment 3.

FIG. 6Bb shows lateral aberration diagrams in the state in which focus is at infinity at the intermediate zoom position according to Numerical Embodiment 3.

FIG. 6Cb shows lateral aberration diagrams in the state in which focus is at infinity at the F-drop point according to Numerical Embodiment 3.

FIG. 6Db shows lateral aberration diagrams in the state in which focus is at infinity at the telephoto end according to Numerical Embodiment 3.

FIG. 7 shows lens cross-sectional views in the state in which focus is at infinity at (a) a wide angle end, (b) an intermediate zoom position, (c) an F-drop point, and (d) a telephoto end according to Embodiment 4 (Numerical Embodiment 4) of the present invention.

FIG. 8Ab shows lateral aberration diagrams in the state in which focus is at infinity at the wide angle end according to Numerical Embodiment 4.

FIG. 8Bb shows lateral aberration diagrams in the state in which focus is at infinity at the intermediate zoom position according to Numerical Embodiment 4.

FIG. 8Cb shows lateral aberration diagrams in the state in which focus is at infinity at the F-drop point according to Numerical Embodiment 4.

FIG. 8Db shows lateral aberration diagrams in the state in which focus is at infinity at the telephoto end according to Numerical Embodiment 4.

DESCRIPTION OF THE EMBODIMENTS

Figure 2A:
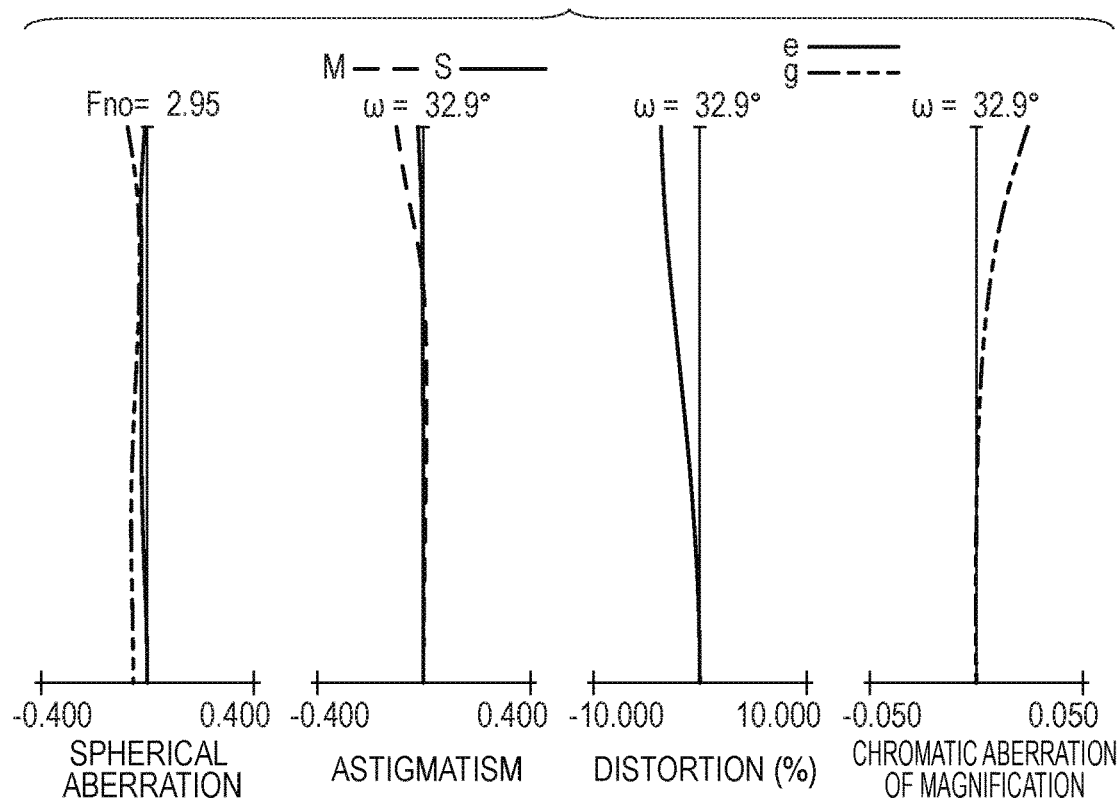
FIG. 2Aa shows longitudinal aberration diagrams in the state in which focus is at infinity at the wide angle end according to Numerical Embodiment 1.
Figure 2A:
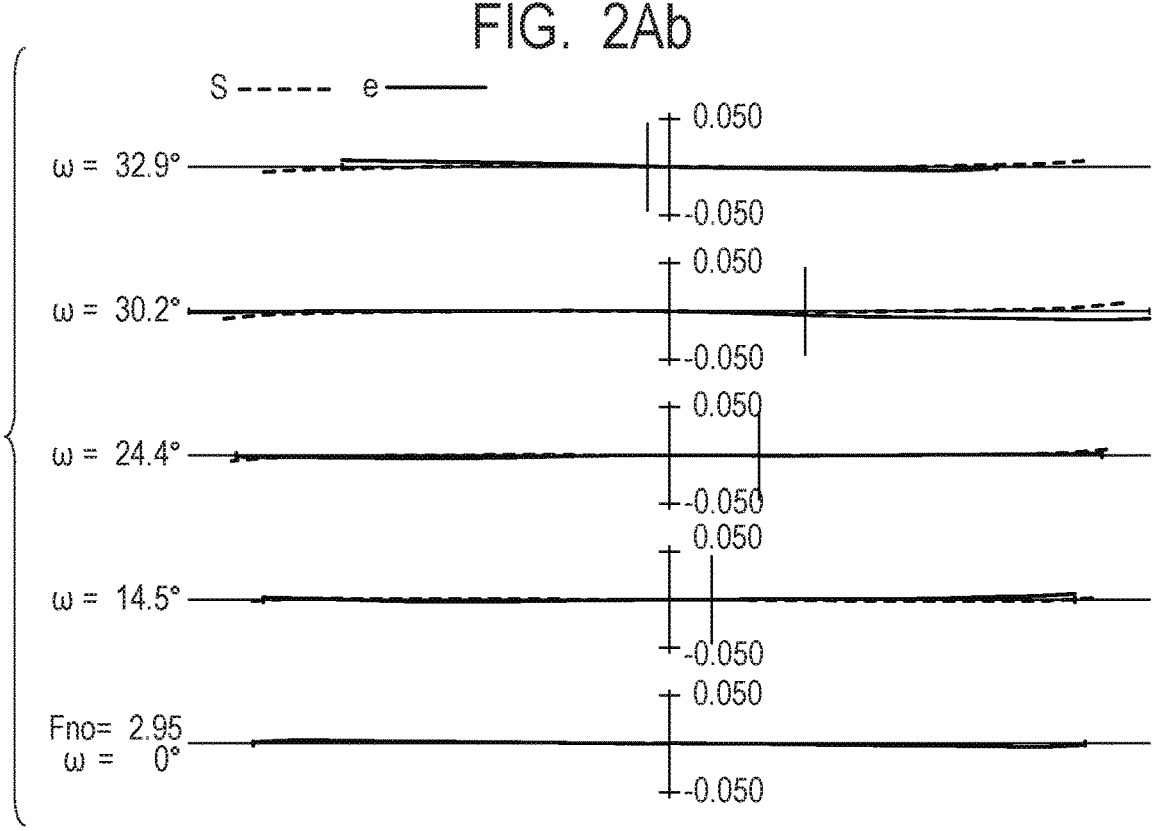

In the following, exemplary embodiments of the present invention are described with reference to the attached drawings.

A zoom lens according to embodiments of the present invention includes, in order from an object side to an image side: a first lens unit having a positive refractive power, which is configured not to move for zooming; one or two second lens units having a negative refractive power, which is/are configured to move for zooming; a stop configured to reduce a part of outer light of an off-axis light; two or three third lens units having a positive refractive power, which are configured to move for zooming; and a fourth lens unit.

In the zoom lens according embodiments of the present invention, the following conditional expressions are satisfied:

$$-13.0 \leq f1/f2 \leq -5.0 \quad (1); \text{ and}$$

$$0.26 \leq Xi3/S23 \leq 0.46 \quad (2),$$

where f1 represents a focal length of the first lens unit, f2 represents a focal length of the one or two second lens units, Xi3 represents a distance on an optical axis from the stop to a vertex of a surface closest to the object side in the two or three third lens units under a zoom state in which F-drop starts, and S23 represents a distance on the optical axis from a vertex of a surface closest to the image side in the one or two second lens units to the vertex of the surface closest to the object side in the two or three third lens units under the zoom state.

The conditional expressions (1) and (2) are intended to define conditions for effectively cutting off-axis light flare in a zoom lens having a high magnification and a wide angle of view.

In the conditional expression (1), a ratio between the focal lengths of the first lens unit U1 and the second lens unit U2 defines a first aspect of the zoom lens according to embodiments of the present invention. When the conditional expression (1) is satisfied, a power ratio between the first lens unit U1 and the second lens unit U2 that is optimal for achieving a long focal length of the zoom lens at the telephoto end can be set, in particular. Further, based on the conditional expression (1), an appropriate range of the effective lens diameter of the second lens unit U2 can be defined with respect to specifications of the zoom lens assumed in embodiments of the present invention.

When the ratio exceeds the upper limit of the conditional expression (1), it becomes difficult to correct aberrations on a telephoto side of the first lens unit U1. Further, a power required for varying magnification of the second lens unit U2 falls short, and it becomes difficult to achieve a high magnification of the zoom lens, and downsizing and reducing a weight of the second lens unit U2. When the ratio falls below the lower limit of the conditional expression (1), the power of the second lens unit U2 becomes relatively stronger, with the result that it becomes difficult to suppress variations in aberrations accompanying zooming, and to achieve both downsizing and reducing a weight of the first lens unit U1.

It is more preferred to set the conditional expression (1) as follows:

$$-12.5 \leq f1/f2 \leq -6.0 \quad (1a).$$

It is more preferred to set the conditional expression (1a) as follows:

$$-12.0 \leq f1/f2 \leq -7.0 \quad (1aa).$$

It is more preferred to set the conditional expression (1aa) as follows:

$$-11.5 \leq f1/f2 \leq -8.0 \quad (1aaa).$$

In this example, the first lens unit U1 refers to the entire lens unit that is arranged closer on the object side than the second lens unit U2, and is at a constant distance from an image pickup surface during zooming. The first lens unit in embodiments of the present invention includes a mechanism configured to move a part or whole of the first lens unit during focusing. The above-mentioned focal length f1 of the first lens unit U1 refers to a focal length of the first lens unit U1 in the state in which focus is at infinity.

Further, in the conditional expression (2), an appropriate range of arrangement of the flare cutting stop in the vicinity of an F-drop point in which a diameter of a ray passing through the second lens unit U2 and the third lens unit U3 is maximized while achieving a high magnification of the zoom lens. In the expression (2), Xi3 represents the distance on the optical axis from the flare cutting stop IF to the vertex of a frontmost surface (lens surface closest to the object side) of the third lens unit U3 at the so-called F-drop point, which is a zoom position at which a drop of an amount of light of an f-number starts, and S23 represents the distance on the optical axis from the vertex of a last surface (rearmost surface) of the second lens unit U2 to the vertex of the frontmost surface (lens surface closest to the object side) of the third lens unit U3 at the F-drop point. When the conditional expression (2) is satisfied, the flare cutting stop configured to effectively cut only an unnecessary off-axis light can be arranged appropriately without affecting an f-number ray, and comatic flare at the periphery of the image plane, which tends to occur when zooming is performed slightly toward the telephoto side from the wide angle end, can be suppressed appropriately.

When the ratio exceeds the upper limit of the conditional expression (2), a sufficient stroke from the F-drop point to the telephoto end cannot be secured, and it becomes difficult to achieve a sufficiently high magnification of the zoom lens. Further, when a range exceeding the upper limit is to be achieved, a mechanism configured to steeply change a stop position as in Japanese Patent Application Laid-Open No. H06-186477 is separately required, to thereby complicate a zoom mechanism and hinder smooth zooming. When the ratio falls below the lower limit of the conditional expression (2), a position of the flare cutting stop is too close to the third lens unit U3, and the effect of cutting the off-axis light becomes disadvantageously relatively weaker.

It is more preferred to set the conditional expression (2) as follows:

$$0.27 \leq Xi3/S23 \leq 0.45 \quad (2a).$$

It is more preferred to set the conditional expression (2a) as follows:

$$0.28 \leq Xi3/S23 \leq 0.44 \quad (2aa).$$

Further, in the zoom lens according to embodiments of the present invention, it is preferred to satisfy one or more of the following conditions.

The following conditional expression is satisfied:

$$0.1 \leq |(\beta 3t/\beta 3w)/(\beta 2t/\beta 2w)| \leq 0.9 \quad (3),$$

where $\beta 2w$ and $\beta 2t$ represent lateral magnifications of the one or two second lens units at a wide angle end and a telephoto end, respectively, and β3w and β3t represent lateral magnifications of the two or three third lens units at the wide angle end and the telephoto end, respectively.

The conditional expression (3) is intended to define a condition for achieving an even higher magnification and effectively cutting off-axis light flare in the zoom lens according to embodiments of the present invention. When the conditional expression (3) is satisfied, shares of the second lens unit and the third lens unit for a magnification varying ratio can be appropriately assigned, which is advantageous in achieving high performance, downsizing, and reducing the weights.

When the ratio exceeds the upper limit of the conditional expression (3), the second lens unit becomes relatively short in power and small in magnification varying share, which leads to an increase in effective diameter of the second lens unit, and a configuration that is disadvantageous in achieving a wide angle of the zoom lens. Further, the zoom stroke of the third lens unit, which is relatively heavy and large, is disadvantageously increased. When the ratio falls below the lower limit of the conditional expression (3), a relative magnification varying share of the third lens unit is reduced, which disadvantageously results in enlargement of a magnification varying portion of the zoom lens having a high magnification, and a situation in which the effect of effectively cutting flare cannot be exerted.

It is more preferred to set the conditional expression (3) as follows:

$$0.12 \leq (\beta 3t/\beta 3w)/(\beta 2t/\beta 2w) | \leq 0.80 \quad (3a).$$

It is more preferred to set the conditional expression (3a) as follows:

$$0.15 \leq (\beta 3t/\beta 3w)/(\beta 2t/\beta 2w) | \leq 0.65 \quad (3aa).$$

Further, at a focal length expressed by:

$$fw \times \sqrt{Z},$$

where "fw" represents a focal length of the zoom lens at the wide angle end, and Z represents a magnification varying ratio from the wide angle end to the telephoto end, the following conditional expression is satisfied:

$$0.73 \leq x2i/s23 \leq 0.95 \quad (4),$$

where x2i represents a distance on the optical axis from the vertex of the last surface of the second lens unit to the flare cutting stop, and s23 represents a distance on the optical axis from the vertex of the last surface of the second lens unit to the vertex of the frontmost surface of the third lens unit.

The conditional expression (4) is intended to define a condition regarding the position of the flare cutting stop for achieving both a high magnification and the flare cutting effect of the zoom lens according to embodiments of the present invention. In the conditional expression (4), x2i represents the distance on the optical axis from the vertex of the surface closest to the image side of the second lens unit to the flare cutting stop at the focal length of an intermediate zoom position fw×√Z, where Z represents the magnification varying ratio of the entire lens system. In the conditional expression (4), s23 represents the distance on the optical axis from the vertex of the last surface of the second lens unit to the vertex of the frontmost surface of the third lens unit at the same position. A range in which it is most desired to exert the effect of cutting the lowermost ray by the flare cutting stop in embodiments of the present invention is a range from the wide angle end to the zoom position fw×√Z. Through appropriate setting of arrangement of the flare cutting stop at this position, arrangement with which the effect of cutting the lowermost ray can be sufficiently exerted while ensuring a high magnification of the zoom lens is defined.

When the ratio exceeds the upper limit of the conditional expression (4), the position of the flare cutting stop at the intermediate zoom position is close to the third lens unit, and the flare cutting effect cannot be sufficiently exerted. When the ratio falls below the lower limit of the conditional expression (4), it is required to separately install a mechanism configured to enable non-linear movement, a mechanism configured to avoid interference with the second lens unit, a unit configured to detect photographic conditions, and the like to a flare cutting stop holding portion in order to achieve a high magnification of the zoom lens. Therefore, complication of a mechanism and an increase in weight of the magnification varying portion are disadvantageously caused.

It is more preferred to set the conditional expression (4) as follows:

$$0.74 \leq x2i/s23 \leq 0.92 \quad (4a).$$

It is more preferred to set the conditional expression (4a) as follows:

$$0.75 \leq x2i/s23 \leq 0.90 (4aa).$$

Further, an image pickup apparatus according to at least one embodiment of the present invention includes the zoom lens of each Embodiment and a solid image pickup element having a predetermined effective image pickup range, which is configured to receive an image formed by the zoom lens.

In this example, it is preferred to satisfy the following conditional expressions:

$$45 < ft/fw < 130 \quad (5); \text{ and}$$

$$56.0 < 2\omega w < 72.6 \quad (6),$$

where "ωw" represents a photographing half angle of view of the zoom lens at the wide angle end, "fw" represents a focal length of the entire system at the wide angle end, and "ft" represents a focal length of the entire system at the telephoto end.

In the conditional expressions (5) and (6), ranges of the magnification of the zoom lens and the photographing angle of view at the wide angle end that are suitable for exerting the effects obtained by the present invention are defined, respectively. The phrase "photographing angle of view at the wide angle end" as used herein is a maximum photographing angle of view at the wide angle end with respect to an effective diagonal length of the image pickup element. The flare cutting stop described in embodiments of the present invention is configured to appropriately cut a lowermost ray flare component, which tends to be increased in the zoom lens having a high magnification and a wide angle of view, and is a technology that is effective in increasing optical performance at the intermediate zoom position in particular. In the conditional expressions (5) and (6), ranges of the magnification of the zoom lens and the angle of view at the wide angle end, to which embodiments of the present invention is effectively applied, are defined, respectively. When the magnification and the angle of view fall outside of the above-mentioned conditions, it is considered that a lens configuration and power arrangement of the zoom lens, and arrangement and a diameter of the flare cutting stop in achieving desired specifications are not appropriately set.

It is more preferred to set the conditional expression (5) as follows:

$$50 < ft/fw < 125 \quad (5a).$$

It is more preferred to set the conditional expression (5a) as follows:

$$55 < ft/fw < 115 \quad (5aa)$$

It is more preferred to set the conditional expression (5aa) as follows:

$$56 < ft/fw < 90 \quad (5aaa)$$

It is more preferred to set the conditional expression (6) as follows:

$$56.1 < 2\omega w < 70.8 \quad (6a)$$

It is more preferred to set the conditional expression (6a) as follows:

$$56.2 < 2\omega w < 68.0 \quad (6aa)$$

Now, a specific configuration of the zoom lens according to embodiments of the present invention is described by way of features of lens configurations of Numerical Embodiments 1 to 4 corresponding to Embodiments 1 to 4, respectively.

Embodiment 1

FIG. 1 shows lens cross-sectional views of a zoom lens according to Embodiment 1 (Numerical Embodiment 1) of the present invention at (a) a wide angle end (14.3 mm), (b) an intermediate zoom position (focal length: 107.0 mm), (c) an F-drop point (552.2 mm), and (d) a telephoto end (800.8 mm). In the lens cross-sectional views, the left side is the object side (front side), and the right side is the image side (rear side).

Figure 2B:
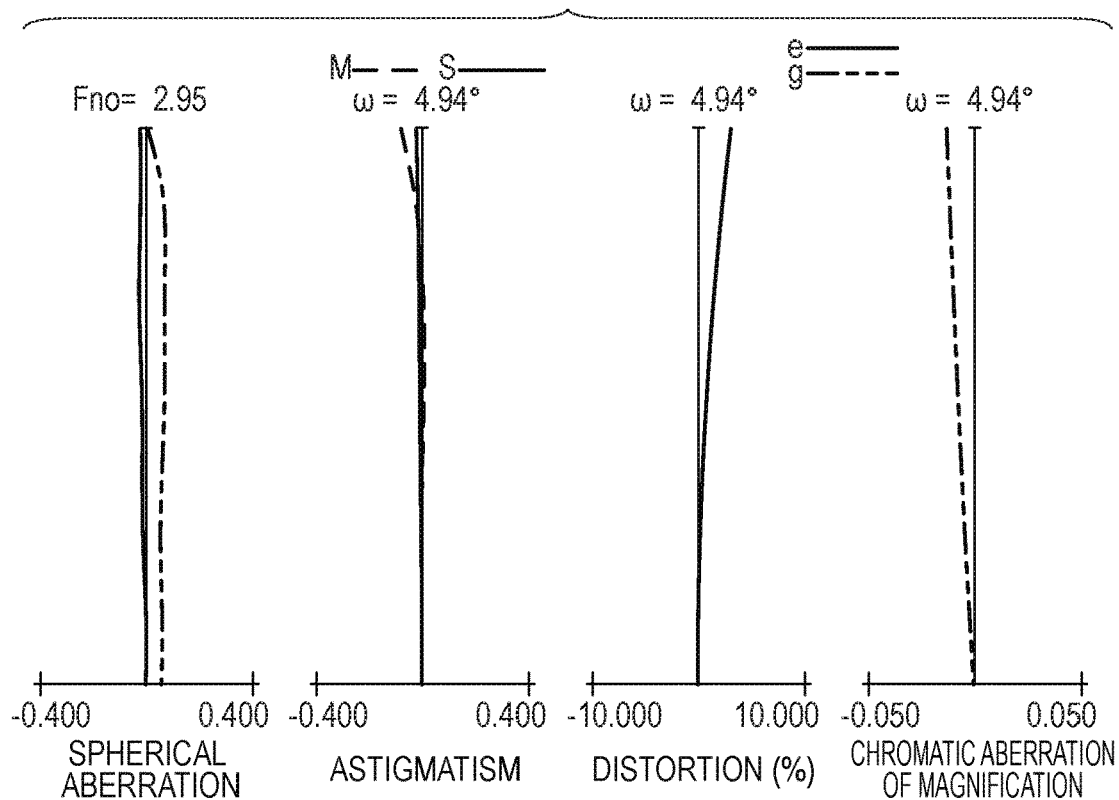
FIG. 2Ba shows longitudinal aberration diagrams in the state in which focus is at infinity at the intermediate zoom position according to Numerical Embodiment 1.
Figure 2B:
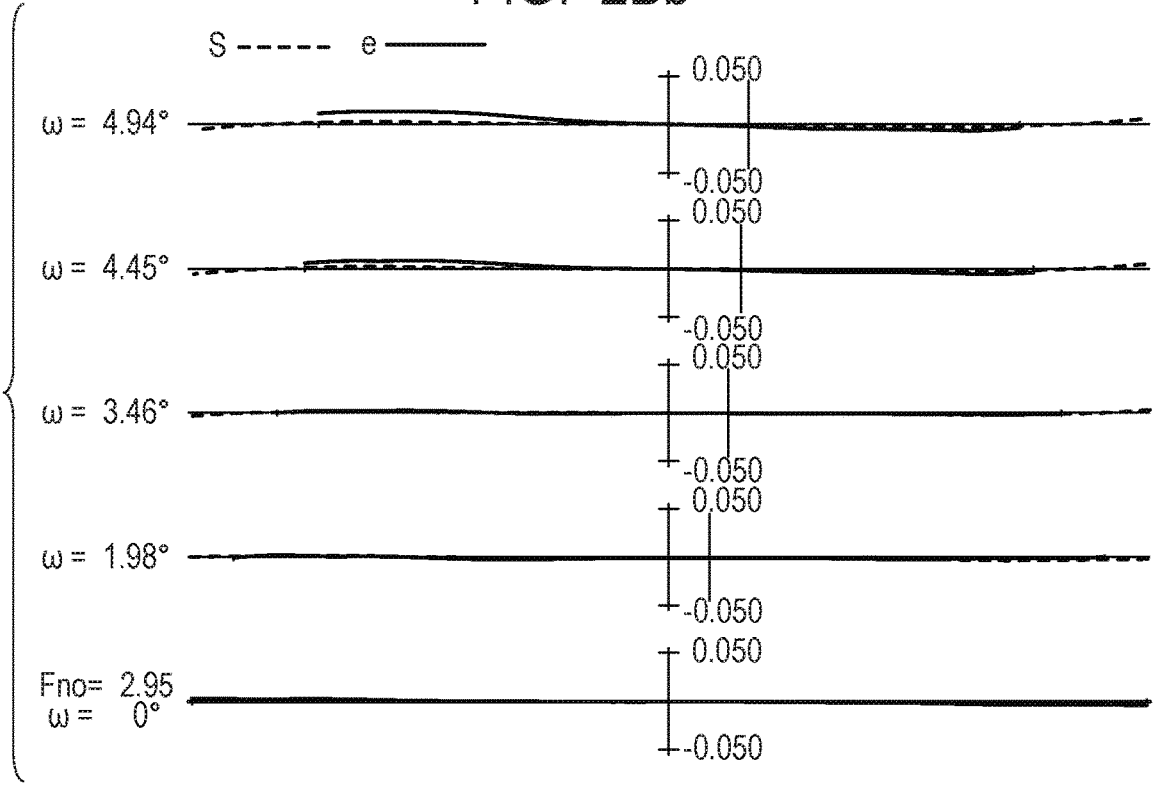
Figure 2C:
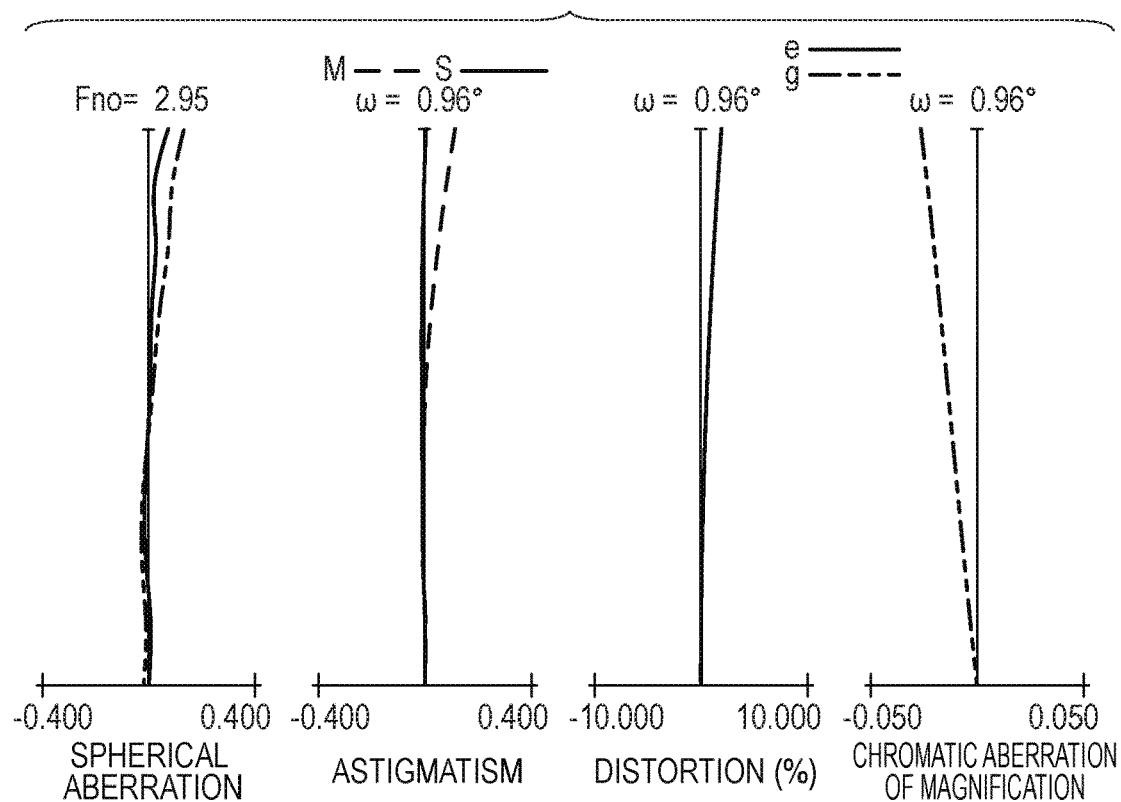
FIG. 2Ca shows longitudinal aberration diagrams in the state in which focus is at infinity at the F-drop point according to Numerical Embodiment 1.
Figure 2C:
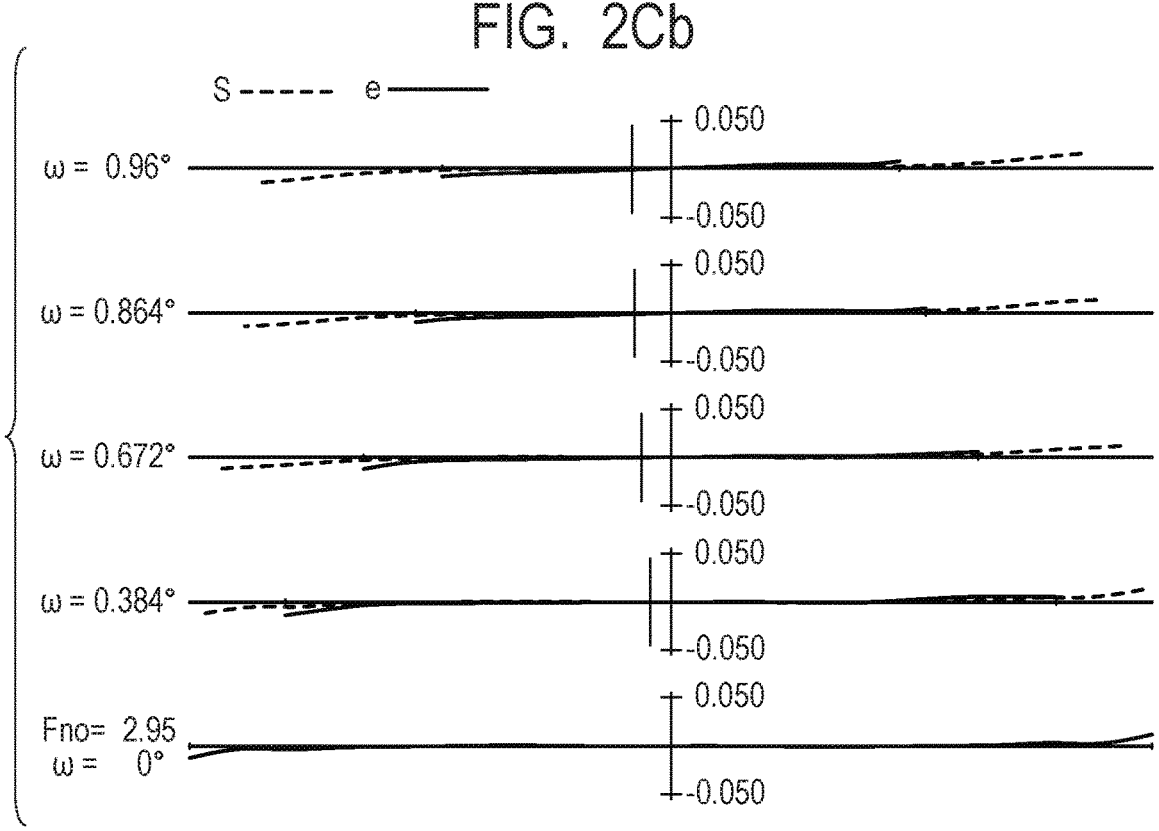
Figure 2D:
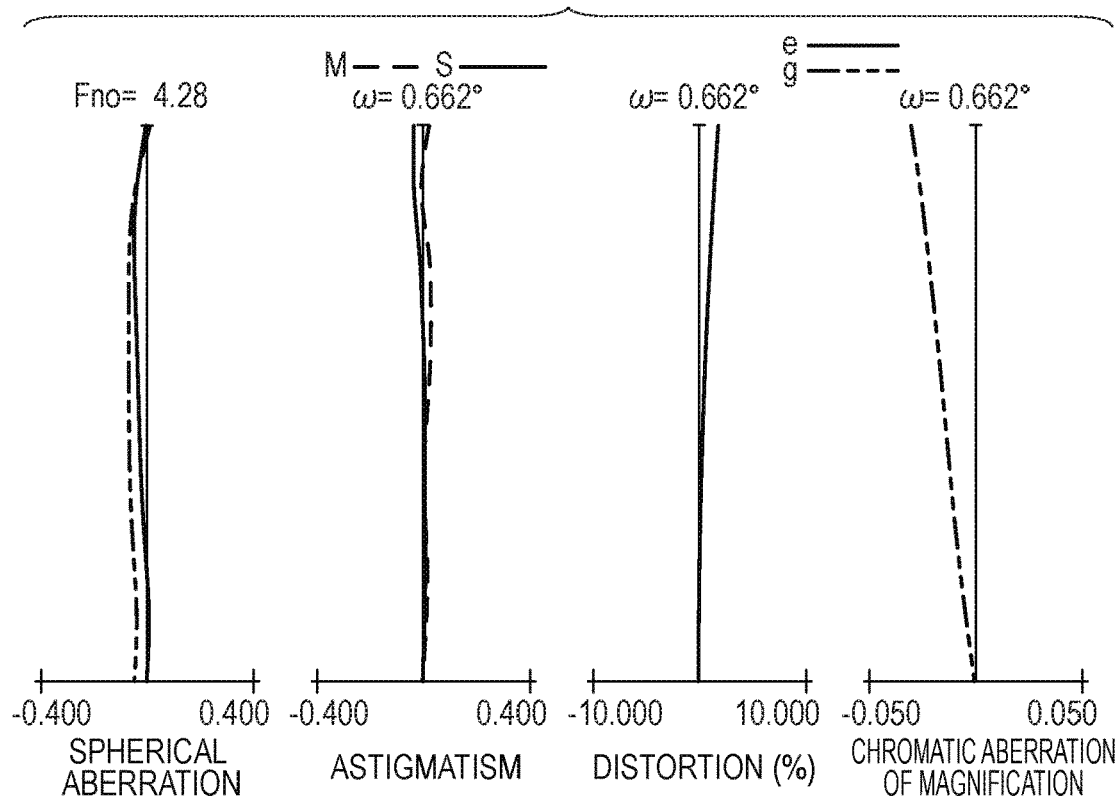
FIG. 2Da shows longitudinal aberration diagrams in the state in which focus is at infinity at the telephoto end according to Numerical Embodiment 1.
Figure 2D:
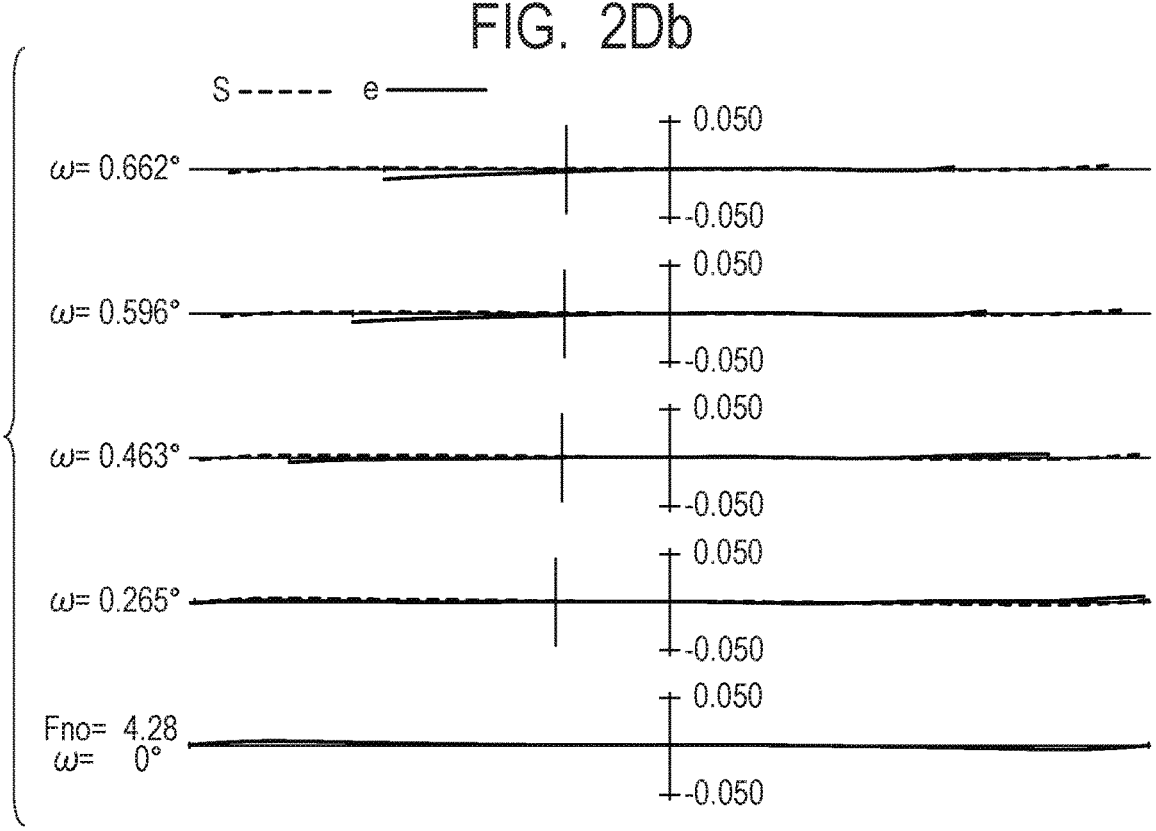

FIG. 2Aa, FIG. 2Ba, FIG. 2Ca, and FIG. 2Da are longitudinal aberration diagrams of the zoom lens according to Embodiment 1 at the wide angle end (14.3 mm), the intermediate zoom position (focal length: 107.0 mm), the F-drop point (552.2 mm), and the telephoto end (800.8 mm), respectively. FIG. 2Ab, FIG. 2Bb, FIG. 2Cb, and FIG. 2Db are lateral aberration diagrams of the zoom lens according to Embodiment 1 at the wide angle end (14.3 mm), the intermediate zoom position (focal length: 107.0 mm), the F-drop point (552.2 mm), and the telephoto end (800.8 mm), respectively. The figures are the lens cross-sectional views and the aberration diagrams in the state in which focus is on an object at infinity. Further, a value of a focal length is a value obtained by expressing a Numerical Embodiment, which is to be described later, in units of mm. The same equally applies to the subsequent Numerical Embodiments.

In FIG. 1, the zoom lens according to Embodiment 1 includes, in order from the object side, a first lens unit U1 having a positive refractive power for focusing, a second lens unit U2 having a negative refractive power for varying magnification, which is configured to move from the object side to the image side for varying magnification from the wide angle end to the telephoto end, and a third lens unit U3. The third lens unit U3 consists of a first lens subunit U31 having a positive refractive power, which is configured move from the image side to the object side for varying magnification from the wide angle end to the telephoto end, and a second lens subunit U32 having a positive refractive power, which is configured to move from the image side to the object side for varying magnification. The zoom lens further includes a fourth lens unit U4 having a positive refractive power, which has an image forming action, on the image side of the third lens unit U3.

The zoom lens according to embodiments of the present invention forms a zoom type of a so-called "multi-unit zoom system", in which three or more lens units consisting of a front magnification varying lens unit and a rear magnification varying lens unit are configured to move, to easily achieve a high magnification and satisfactory optical performance.

In the zoom lens according to embodiments of the present invention, a rear lens unit may include a lens unit that is removable from an optical path and is configured to shift the focal length of the entire system of the zoom lens. Further, an optical member forming a part of the fourth lens unit U4 may be moved along the optical axis to have a function of playing a role of adjusting a back focus.

A flare cutting stop IF configured to cut only an unnecessary off-axis light without affecting an axial ray (f-number ray) is arranged between the second lens unit U2 and the third lens unit U3. The flare cutting stop may be adopted to have a form of being formed integrally with the third lens unit U3, and following the same locus as the third lens unit during varying magnification. Further, the flare cutting stop in Embodiment 1 has a constant aperture diameter over the entire zoom range, and does not require a mechanism configured to open and close a stop aperture and a zoom position detection unit for controlling a stop diameter, with the result that the flare cutting stop is easy to install at low cost.

An aperture stop SP configured to determine the f-number is arranged between the third lens unit U3 and the fourth lens unit U4. Dummy glass DG corresponds to an optical filter or a color separation optical system in a camera, and is illustrated as a glass block in FIG. 1. When the zoom lens is used as an image pickup optical system for a broadcasting television camera, a video camera, or a digital still camera, an image plane IP corresponds to an image pickup surface of a solid-state image pickup element (photoelectric conversion element) or the like configured to receive light of an image formed by the zoom lens and to convert the light to electricity. When the zoom lens is used as an image pickup optical system for a film camera, the image plane IP corresponds to a film surface on which the image formed by the zoom lens is exposed.

In each of the longitudinal aberration diagrams, spherical aberration is illustrated with respect to an e-line and a g-line by a solid line and a two-dot chain line, respectively. Further, astigmatism is illustrated on a meridional image plane by a broken line and on a sagittal image plane by a solid line. In addition, lateral chromatic aberration is illustrated with respect to the g-line by a two-dot chain line. A half angle of view is denoted by "ω" and an F number is denoted by Fno. In each of the longitudinal aberration diagrams, spherical aberration is illustrated in the unit of 0.4 mm, astigmatism in the unit of 0.4 mm, distortion in the unit of 10%, and a lateral chromatic aberration in the unit of 0.05 mm. In each Embodiment described below, each of the wide angle end and the telephoto end refers to a zooming position obtained when the second lens unit U2 for varying magnification is positioned at each of the ends of a range in which the lens unit may mechanically move along the optical axis.

Next, correspondences with surface data of Numerical Embodiment 1 are described. The first lens unit U1 corresponds to the 1st surface to the 12th surface. The 1st surface to the 6th surface form a first lens subunit U11 having a negative refractive power (or substantially no power), which is configured not to move for focusing, and the 7th surface to the 12th surface correspond to a second lens subunit U12 having a positive refractive power, which is configured to move from the image pickup surface side to the object side during focusing from an infinity side to a proximity side. As the second lens subunit U12, a so-called "floating focus system" may be adopted, in which a part thereof takes a different locus when being driven for focusing, to thereby improve variations in aberrations during drive for focusing. The second lens unit U2 corresponds to the 13th surface to the 19th surface, and has a negative refractive power. The flare cutting stop IF configured to cut only the unnecessary off-axis light without affecting the f-number ray corresponds to the 20th surface. The first lens subunit U31 corresponds to the 21st surface to the 26th surface, and has a positive refractive power. The second lens subunit U32 corresponds to the 27th surface to the 31st surface, and has a positive refractive power. The aperture stop configured to determine the f-number corresponds to the 32nd surface. The fourth lens unit U4 corresponds to the 33rd surface to the 53rd surface, and has a positive refractive power. The 54th surface to the 56th surface form the dummy glass, which corresponds to the optical filter and the color separation optical system in the camera.

Figure 9A:
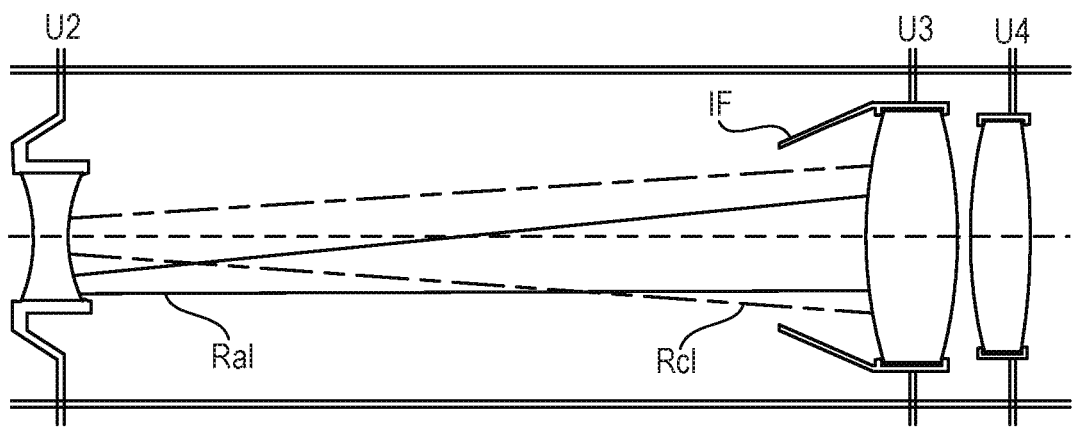
FIG. 9A is a schematic diagram for illustrating an operation of a movement mechanism according to an Embodiment of the present invention.
Figure 9B:
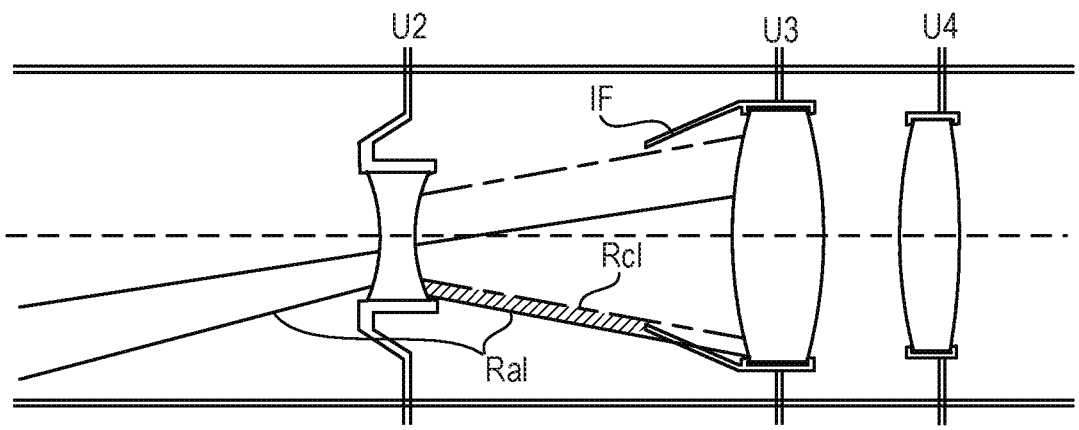
FIG. 9B is a schematic diagram for illustrating an operation of the movement mechanism according to the Embodiment of the present invention.
Figure 9C:
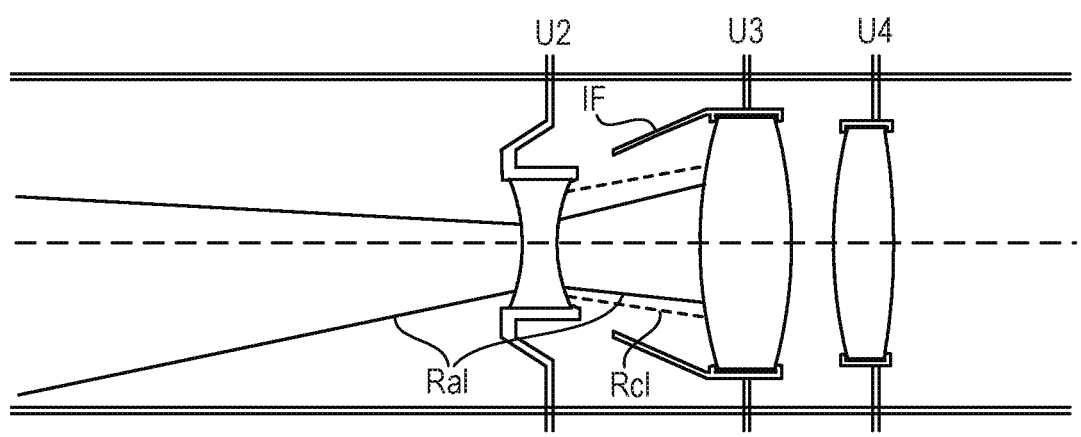
FIG. 9C is a schematic diagram for illustrating an operation of the movement mechanism according to the Embodiment of the present invention.

Now, with reference to FIG. 9A, FIG. 9B, and FIG. 9C, operations of a movement mechanism of the zoom lens according to embodiments of the present invention and flare cutting by the flare cutting stop are outlined using the configuration of Embodiment 1 as an example. In FIG. 9A, FIG. 9B, and FIG. 9C, approximate positions of the movement mechanism of the zoom lens according to embodiments of the present invention at the wide angle end, the intermediate zoom position, and the telephoto end are illustrated, respectively. The second lens unit U2, the third lens unit U3, and the fourth lens unit U4 illustrated in the FIG. 9A, FIG. 9B, and FIG. 9C are connected from lens barrels configured to hold the lenses to a zoom cam structure, and are configured to move in an optical axis direction during zooming. The flare cutting stop IF in Numerical Embodiment 1 is formed integrally with a lens barrel configured to hold the first lens subunit U31, and is formed into a shape that does not affect an axial (f-number) ray. The flare cutting stop IF follows a locus of moving monotonously from the image plane side to the object side without being inverted during varying magnification from the wide angle end to the telephoto end. Further, the flare cutting stop IF has no mechanism configured to open and close an aperture portion, and has an invariable aperture diameter over the entire zoom range.

Under a state at the wide angle end of FIG. 9A, the second lens unit U2 and the third lens unit U3 are arranged to be separated farthest from each other in the entire zoom range. When the axial ray and a most off-axis light from the second lens unit U2 to the third lens unit U3 are indicated by the one-dot chain line and the solid line, respectively, the axial (f-number) ray passes through an area of the second lens unit U2 near the optical axis in a state of a small ray width (pupil diameter), and then reaches the third lens unit U3 while being diverged. In contrast, the off-axis light passes through a portion of the second lens unit with a high effective diameter, and reaches the third lens unit U3 while being diverged. When a lowermost ray of the axial ray is represented by Rcl, and a lowermost ray of the off-axis light is represented by Ral, the lowermost ray Ral of the off-axis light passes through a position at a distance that is farther away from the optical axis at a position near the second lens unit U2, and the lowermost ray Rcl of the axial ray passes through a position at a distance that is farther away from the optical axis at a position near the third lens unit U3. Further, in the zoom lens according to embodiments of the present invention, a peripheral light amount ratio at the wide angle end is often determined by the effective diameter of the first lens unit U1 or the second lens unit U2, and there are few cases where it is required to cut the lowermost ray by the flare cutting stop at the wide angle end.

Next, for the intermediate zoom position of FIG. 9B, a zoom range expressed by the focal lengths is assumed as the intermediate zoom position in embodiments of the present invention:

$$fw \times 5\sqrt{Z} \text{ to } fw \times \sqrt{Z},$$

where "fw" represents a focal length at the wide angle end, and Z represents a zoom magnification from the wide angle end to the telephoto end of the zoom lens.

At the intermediate zoom position of FIG. 9B, the axial ray and the off-axis light both have larger ray widths than at the wide angle end, but in the vicinity of the third lens unit U3, the off-axis light Ral has a larger area (hatched portion of FIG. 9B) of passing through a position away from the optical axis than the axial ray Rcl. The hatched portion is a ray portion that can be cut without affecting the f-number, and is a portion in which comatic flare occurs as a variation accompanying zooming from the wide angle end. Therefore, through cutting of the off-axis light in a range in which the peripheral light amount ratio with respect to a light amount at the center of the image plane does not cause a problem in terms of quality, optical performance in the periphery of the image plane can be increased. This area exists continuously up to almost the F-drop point, and hence it is effective to arrange the flare cutting stop, which is determined based on the diameter of the f-number ray, at an appropriate position to cut an unnecessary off-axis light as much as possible.

At the telephoto end of FIG. 9C, the lowermost ray Ral of the off-axis light passes through the inside of the lowermost ray Rcl of the axial ray, and hence in a region from the F-drop point to the telephoto end, flare cutting cannot be achieved without affecting the f-number.

To address this problem, in the four-unit zoom lens of a so-called "transfer type" described in Japanese Patent Application Laid-Open No. H06-186477, an effective diameter of the third lens unit U3 is defined by an f-number condition, and there is a tendency that a large amount of excess off-axis light enters to cause a large amount of off-axial comatic flare. Therefore, it is required to arrange the flare cutting stop at a position that is as close to the front as possible from the wide angle end to the F-drop point, and a complicated configuration by means of a magnet, for example, is required to reduce unnecessary space for varying magnification after the F-drop point.

In contrast, when the multi-unit zoom system as in FIG. 9A, FIG. 9B, and FIG. 9C is used, the third lens unit and the fourth lens unit of a five-lens zoom lens can be arranged on the object side and on the image plane side, respectively, while maintaining a principal point position of the third lens unit U3 of the four-unit zoom lens, which results in the effect that effective diameters of the third and fourth lens units can be reduced while maintaining the f-number. With this effect, the axial ray and the off-axis light can be lowered with respect to the four-unit zoom lens, and downsizing and reducing the weight of moving lens units are achieved, which are very advantageous factors. However, when a variation in optical performance accompanying zooming is to be improved, the power of the second lens unit can be relatively mitigated in the multi-unit zoom system. As a result, the effective diameter of the second lens unit U2 is increased to result in a problem in which a diameter of the off-axis light from the wide angle end to the intermediate zoom range is mainly increased in accordance therewith. To address this problem, embodiments of the present invention may be applied to effectively cut off-axial comatic flare. The arrangement of the second lens unit U2 and the third lens unit U3 and the way the rays pass through those lens units, which are configured to move for varying magnification, are changed from the four-unit zoom lens described in Japanese Patent Application Laid-Open No. H06-186477, with the result that the conditional expression related to the configuration of the flare cutting stop is changed.

To give a specific comparative example for consideration, in Japanese Patent Application Laid-Open No. H06-186477, it is specified that a value corresponding to Xi3/S23 of the conditional expression (2) in embodiments of the present invention is from 0.459 to 0.918. As an index of the effect of cutting the lowermost ray by the flare cutting stop, a ratio between ray heights of a principal ray and a lowermost ray of the most off-axis light at the zoom position of FIG. 9B is considered, for example. According to a reproduction experiment based on patent data of Japanese Patent Application Laid-Open No. H06-186477, an embodiment in which about 15% of a lowermost ray component was cut by the flare cutting stop is found. In contrast, according to Embodiments of the present invention, a value corresponding to Xi3/S23 of the conditional expression (2) is from 0.271 to 0.456, which is outside the range of Embodiments of Japanese Patent Application Laid-Open No. H06-186477, but up to about 20% of a lowermost ray component can be cut by the flare cutting stop. As a result, it was confirmed that the effect of the flare cutting stop that was equivalent to or larger than in the related art was exerted also in an area of a numerical range that is different from that of the four-unit zoom lens in the related art while achieving high specifications, high performance, downsizing, and reducing the weight through employment of the multi-unit zoom lens. It should be noted, however, that the above-mentioned experiment is merely an example of verifying the effect of embodiments of the present invention, and it can be understood that a method of evaluating and a required proportion of the lowermost ray cutting vary depending on differences in required specifications and performance. This equally applies to all Embodiments.

Numerical Embodiment 1, which corresponds to Embodiment 1, is described. In all Numerical Embodiments without limiting to Numerical Embodiment 1, the order of a surface (optical surface) from the object side is represented by "i", a curvature radius of the i-th surface from the object side is represented by "ri", and an interval between the i-th surface and the (i+1)-th surface from the object side (on the optical axis) is represented by "di". Moreover, a refractive index, an Abbe number, and a partial dispersion ratio with respect to a medium (optical member) between the i-th surface and the (i+1)-th surface are represented by "ndi", "vdi", and θgFi, respectively, and an air-equivalent back focus is represented by BF. When an X axis is set in the optical axis direction, an H axis is set in a direction perpendicular to the optical axis, a direction of travel of light is defined as positive, a paraxial curvature radius is represented by R, a conic constant is represented by "k", and aspherical coefficients are represented by A3 to A16, the aspherical shape is expressed by the expression below. Moreover, "e-Z" means "×10−Z".

$$X = \frac{H^2/R}{1+\sqrt{1-(1+k)(H/R)^2}} + A4H^4 + A6H^6 + A8H^8 + A10H^{10} + A12H^{12} + A14H^{14} + A16H^{16} + A3H^3 + A5H^5 + A7H^7 + A9H^9 + A11H^{11} + A13H^{13} + A15H^{15}$$

Values corresponding to the conditional expressions in Embodiment 1 are shown in Table 1. In Embodiment 1, the expressions (1) to (6) are satisfied as appropriate to achieve the zoom lens having a wide angle of view, a high zoom ratio, a small size, a light weight, and high optical performance over the entire zoom range. Although it is required that the zoom lens according to embodiments of the present invention satisfy the expressions (1) and (2), the zoom lens is not always required to satisfy the expressions (3) to (6). However, when at least one of the expressions (3) to (6) is satisfied, even better effects may be provided. The same holds true for the Embodiments 2 to 4.

Embodiment 2

FIG. 3 shows lens cross-sectional views of a zoom lens according to Embodiment 2 (Numerical Embodiment 2) of the present invention in the state in which focus is on an object at infinity at (a) a wide angle end (focal length: 10.00 mm), (b) an intermediate zoom position (focal length: 89.44 mm), (c) an F-drop point (focal length: 342.87 mm), and (d) a telephoto end (focal length: 800.00 mm).

Figure 4A:
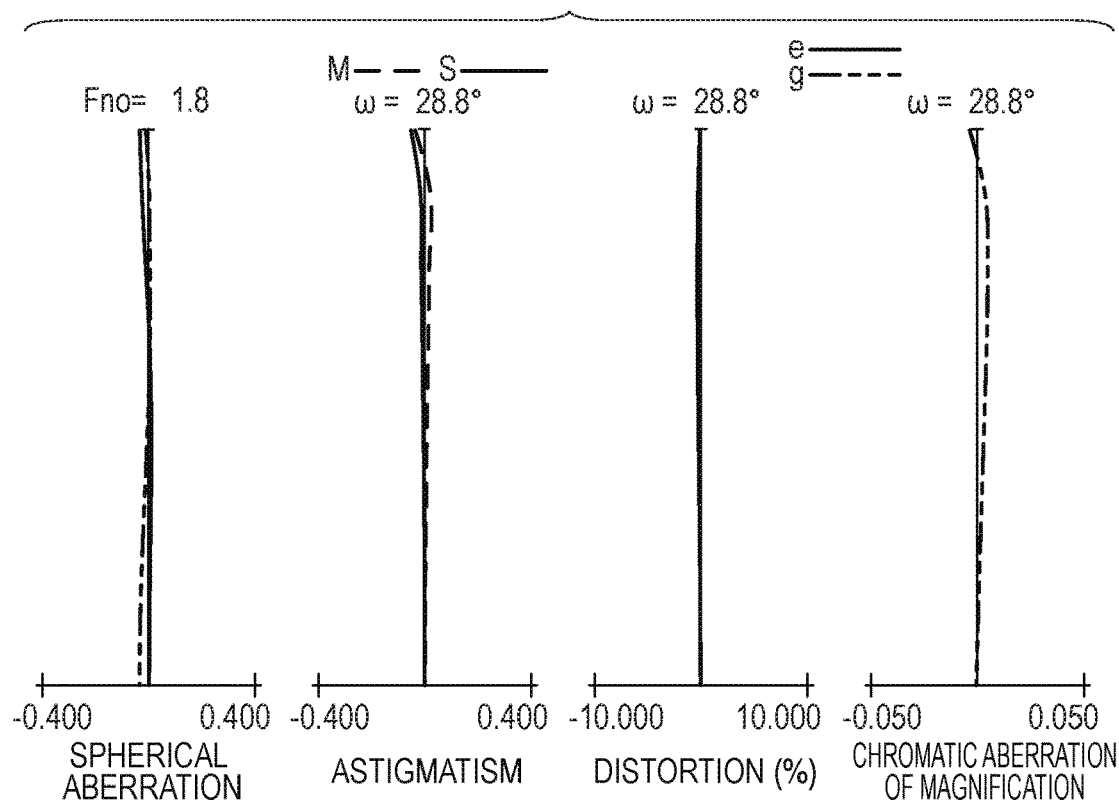
FIG. 4Aa shows longitudinal aberration diagrams in the state in which focus is at infinity at the wide angle end according to Numerical Embodiment 2.
Figure 4A:
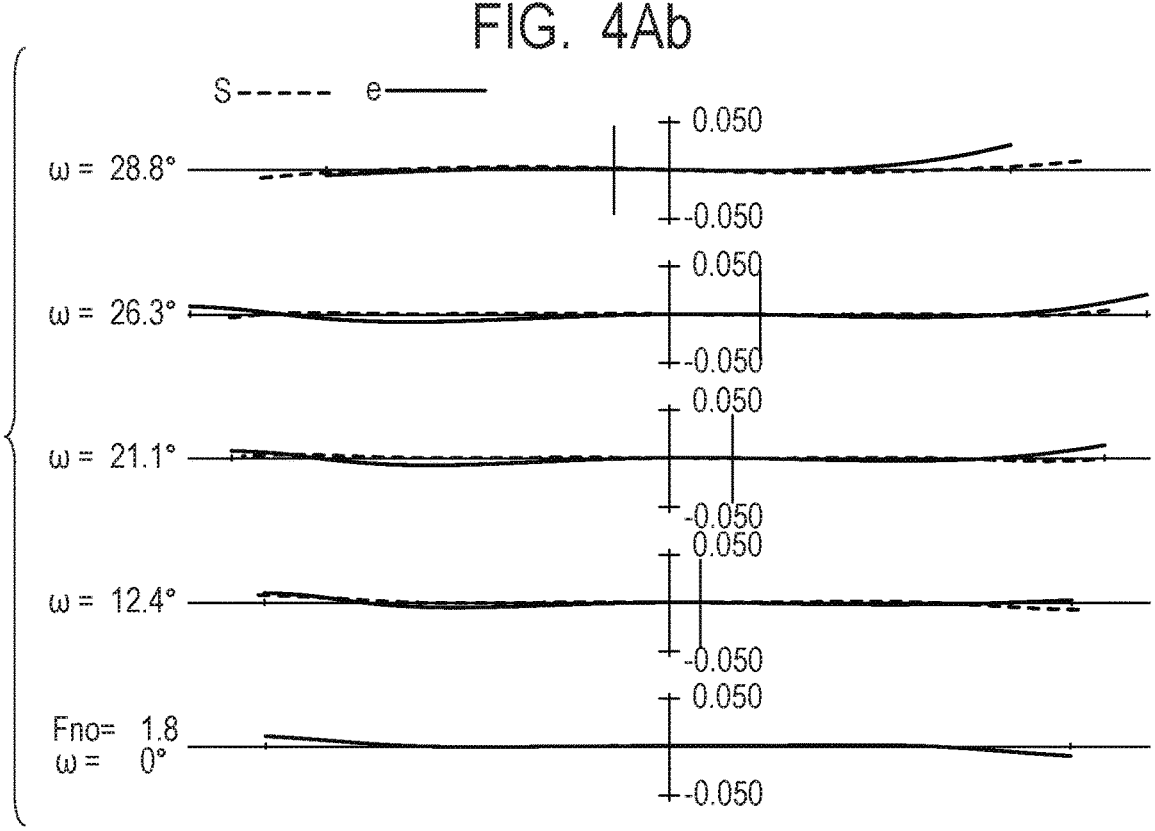
Figure 4B:
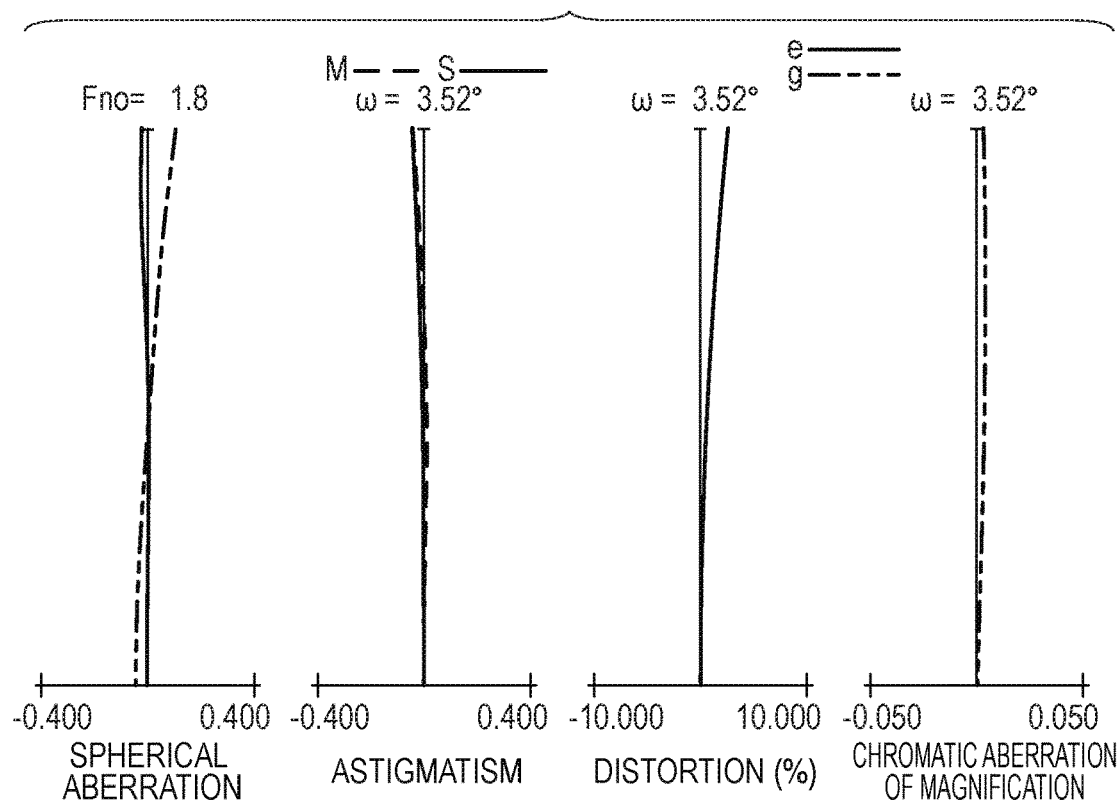
FIG. 4Ba shows longitudinal aberration diagrams in the state in which focus is at infinity at the intermediate zoom position according to Numerical Embodiment 2.
Figure 4B:
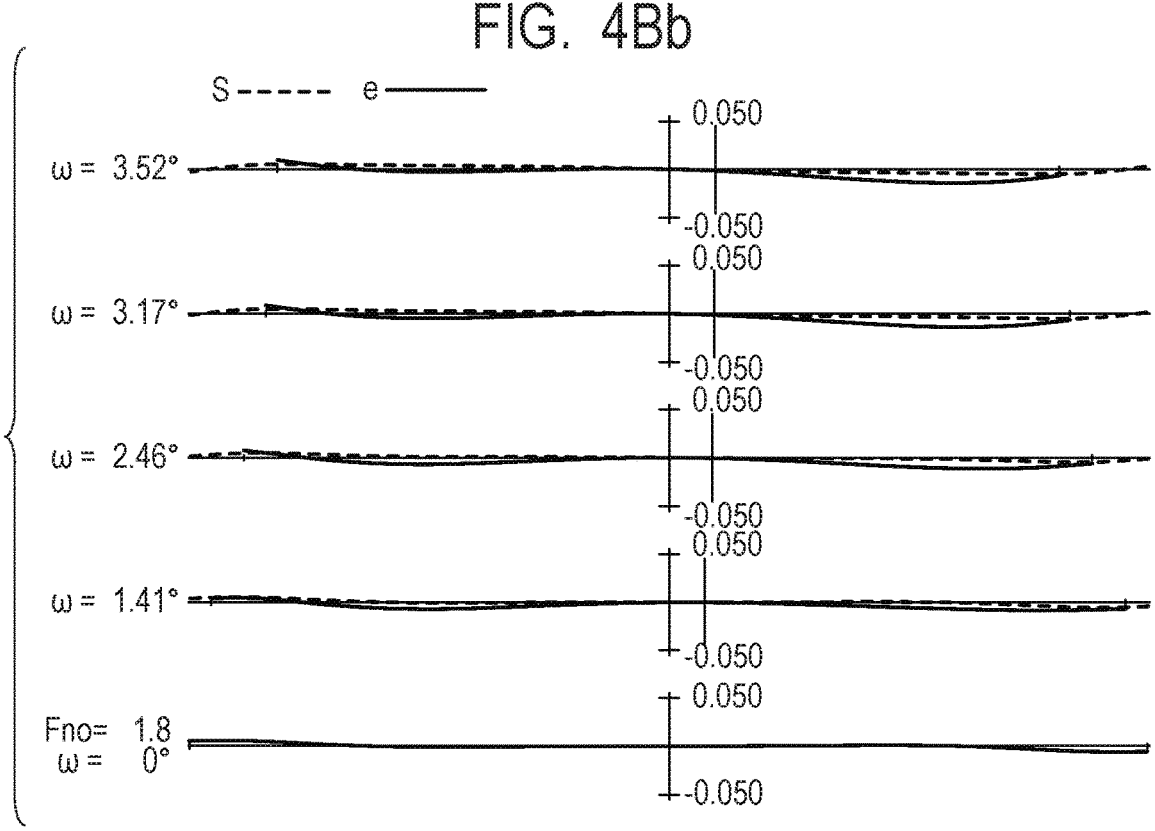
Figure 4C:
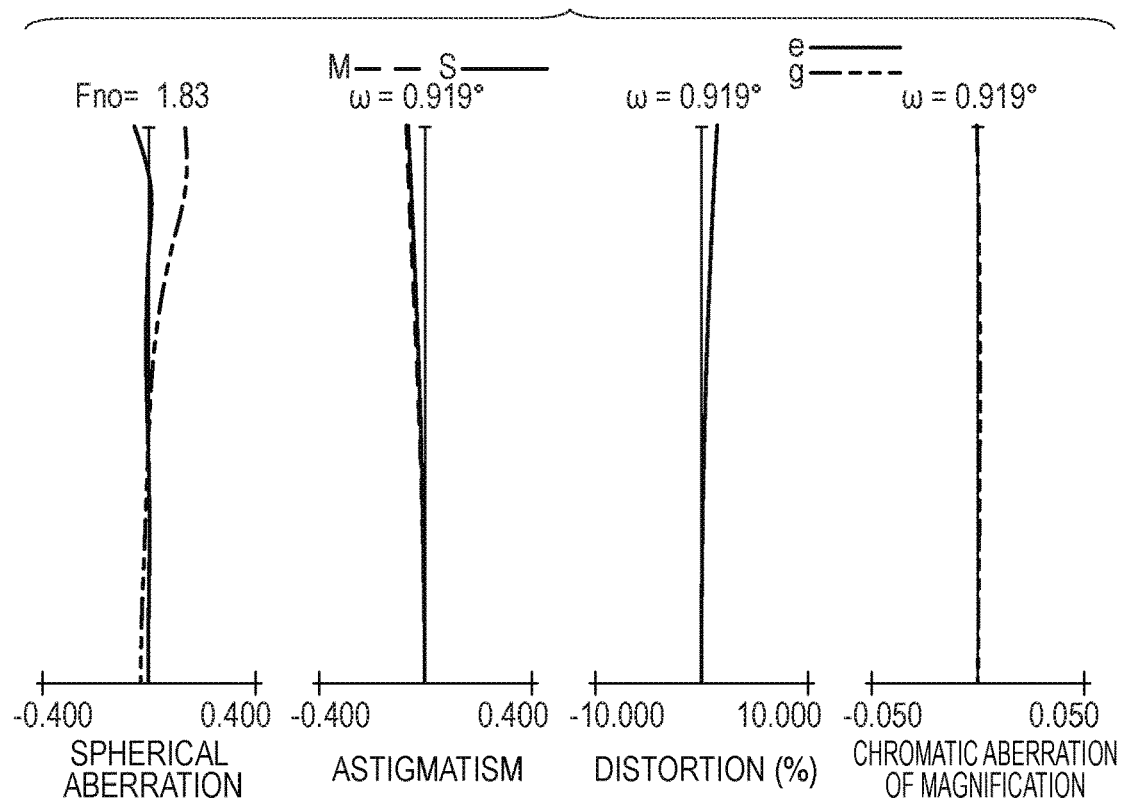
FIG. 4Ca shows longitudinal aberration diagrams in the state in which focus is at infinity at the F-drop point according to Numerical Embodiment 2.
Figure 4C:
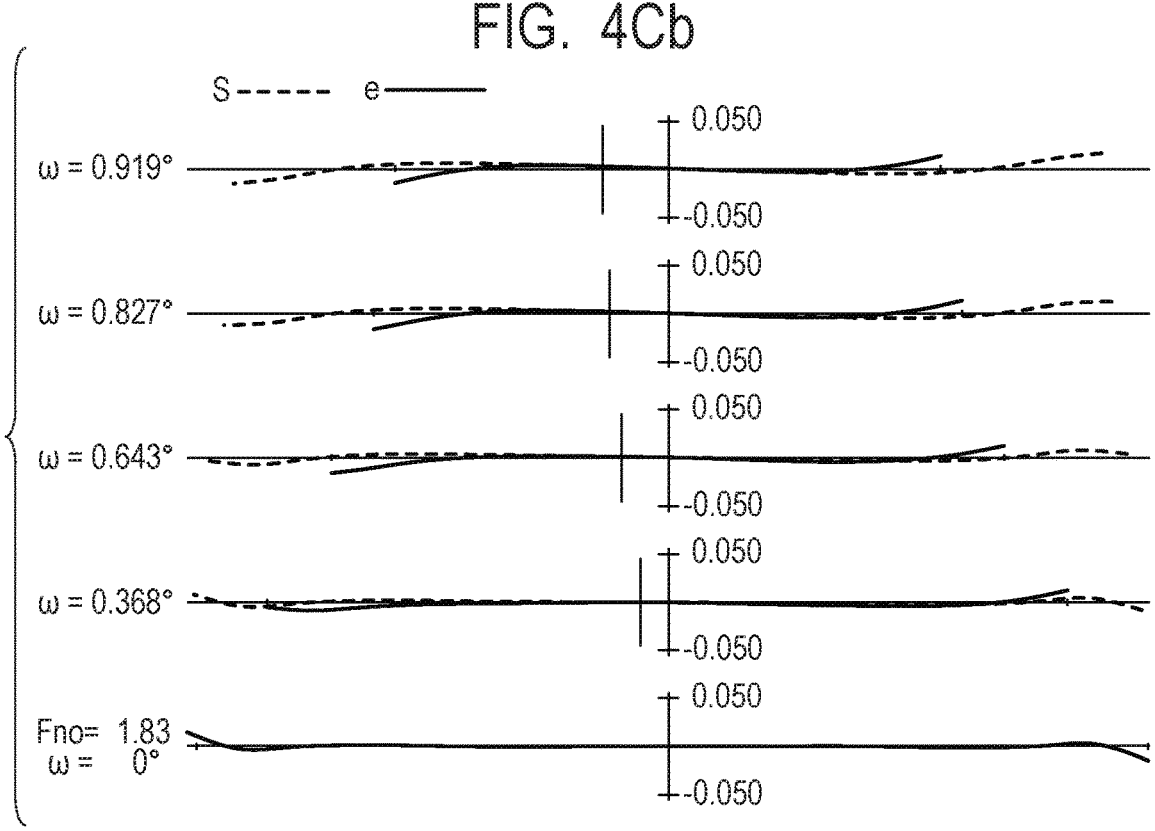
Figure 4D:
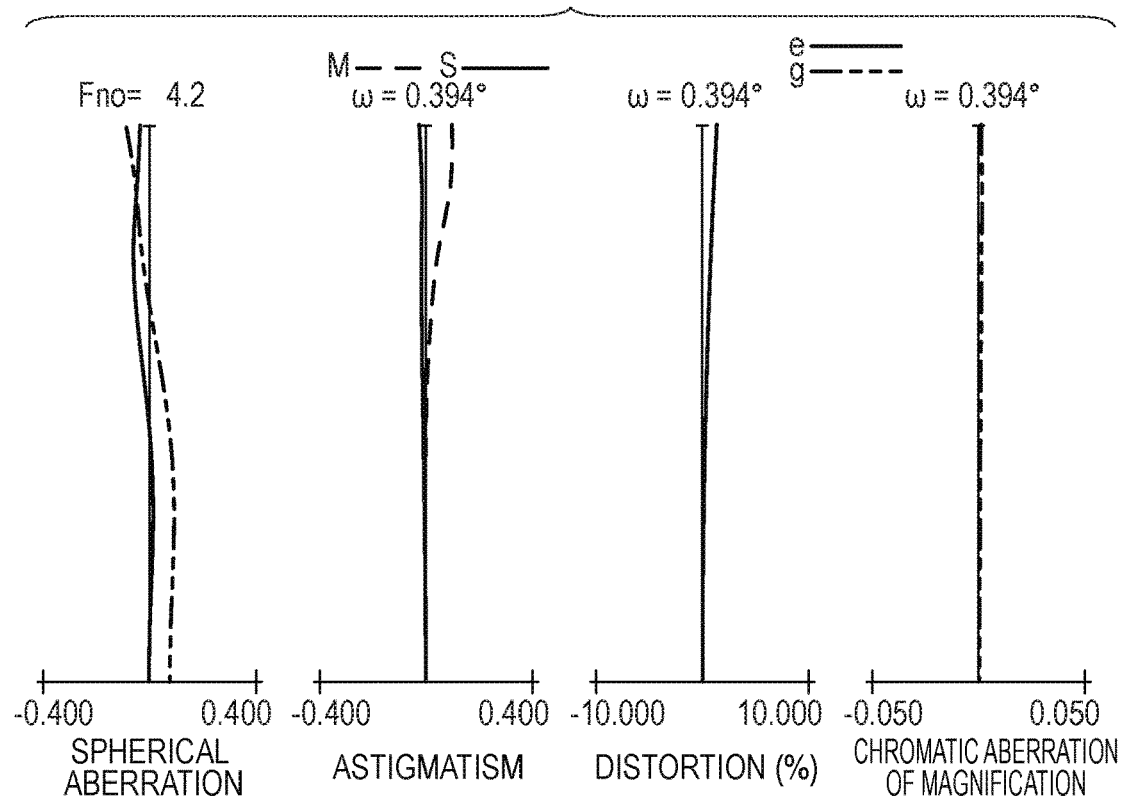
FIG. 4Da shows longitudinal aberration diagrams in the state in which focus is at infinity at the telephoto end according to Numerical Embodiment 2.
Figure 4D:
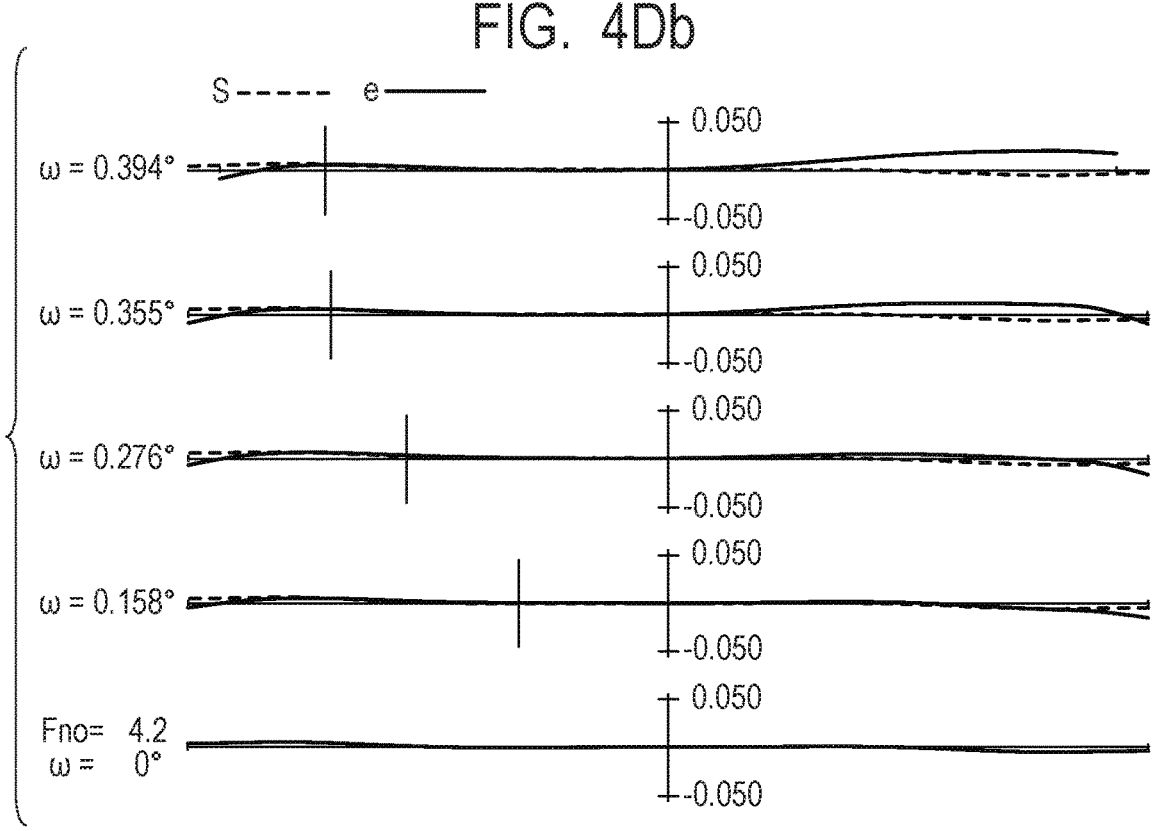

FIG. 4Aa, FIG. 4Ba, FIG. 4Ca, and FIG. 4Da are longitudinal aberration diagrams of the zoom lens according to Embodiment 2 (Numerical Embodiment 2) of the present invention in the state in which focus is on the object at infinity at the wide angle end (focal length: 10.00 mm), the intermediate zoom position (focal length: 89.44 mm), the F-drop point (focal length: 342.87 mm), and the telephoto end (focal length: 800.00 mm), respectively. FIG. 4Ab, FIG. 4Bb, FIG. 4Cb, and FIG. 4Db are lateral aberration diagrams of the zoom lens according to Embodiment 2 (Numerical Embodiment 2) of the present invention in the state in which focus is on the object at infinity ay the wide angle end (focal length: 10.00 mm), the intermediate zoom position (focal length: 89.44 mm), the F-drop point (focal length: 342.87 mm), and the telephoto end (focal length: 800.00 mm), respectively.

Next, correspondences with surface data of Numerical Embodiment 2 are described. The first lens unit U1 corresponds to the 1st surface to the 14th surface. The 1st surface to the 8th surface form a first lens subunit U11 having a negative refractive power (or substantially no power), which is configured not to move during focusing, and the 9th surface to the 14th surface correspond to a second lens subunit U12 having a positive refractive power, which is configured to move from the image pickup surface side to the object side during focusing from an infinity side to a proximity side. As the second lens subunit U12, a so-called "floating focus system" may be adopted, in which a part thereof takes a different locus when being driven for focusing, to thereby improve variations in aberrations during drive for focusing. The second lens unit U2 corresponds to the 15th surface to the 21st surface, and has a negative refractive power. The flare cutting stop IF configured to cut only the unnecessary off-axis light without affecting the f-number ray corresponds to the 22nd surface. The first lens subunit U31 corresponds to the 23rd surface to the 29th surface, and has a positive refractive power. The second lens subunit U32 corresponds to the 30th surface to the 31st surface, and has a positive refractive power. The aperture stop configured to determine the f-number corresponds to the 32nd surface. The fourth lens unit U4 corresponds to the 33rd surface to the 48th surface, and has a positive refractive power. The 49th surface to the 51st surface form the dummy glass, which corresponds to the optical filter and the color separation optical system in the camera.

Values corresponding to the conditional expressions in Embodiment 2 are shown in Table 1. In Embodiment 2, the expressions (1) to (6) are satisfied as appropriate to achieve the zoom lens having a wide angle of view, a high zoom ratio, a small size, a light weight, and high optical performance over the entire zoom range. In Embodiment 2, in particular, the structure configured to avoid interference with the flare cutting stop as illustrated in FIG. 9A, FIG. 9B, and FIG. 9C is provided to utilize an interval between the second lens unit U2 and the third lens unit U3 for varying magnification without waste. With this configuration, zooming at a high magnification with a magnification varying ratio of 80× from the wide angle end to the telephoto end is achieved with the structure that is low in cost and easily implemented without complicating the structure of the magnification varying lens unit.

Embodiment 3

FIG. 5 shows lens cross-sectional views of a zoom lens according to Embodiment 3 (Numerical Embodiment 3) of the present invention in the state in which focus is on an object at infinity at (a) a wide angle end (focal length: 10.20 mm), (b) an intermediate zoom position (focal length: 88.33 mm), (c) an F-drop point (focal length: 327.86 mm), and (d) a telephoto end (focal length: 765.00 mm).

Figure 6A:
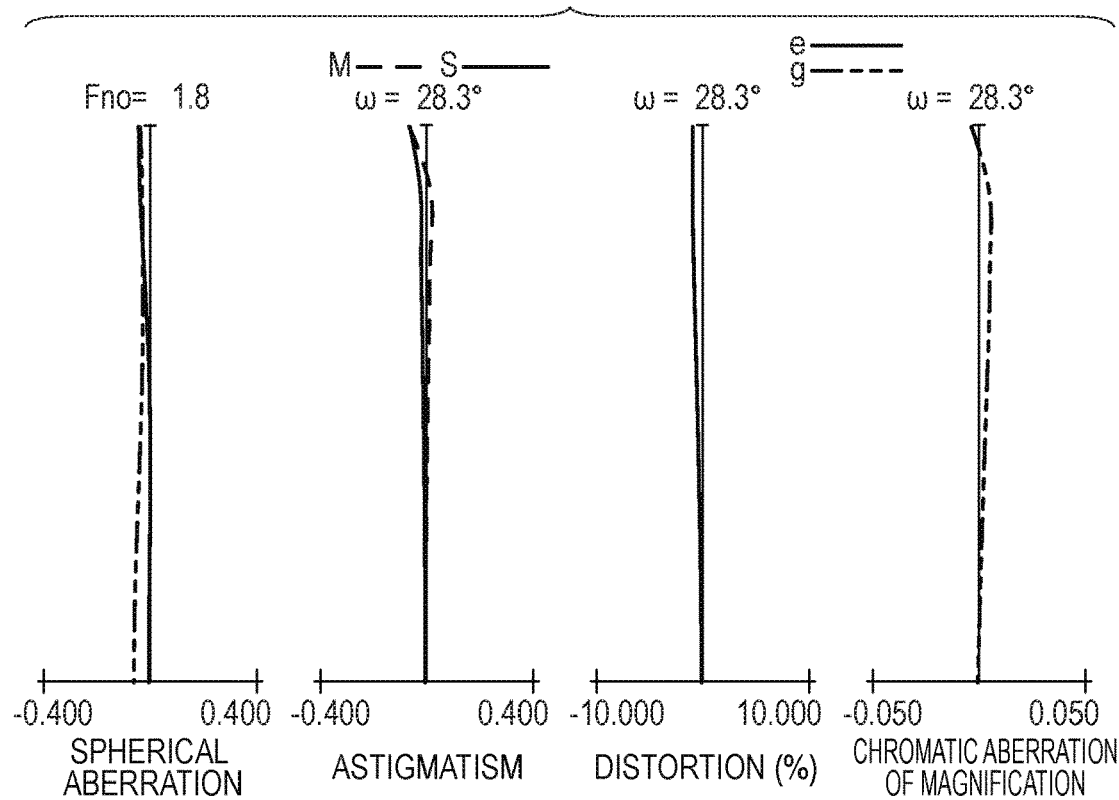
FIG. 6Aa shows longitudinal aberration diagrams in the state in which focus is at infinity at the wide angle end according to Numerical Embodiment 3.
Figure 6A:
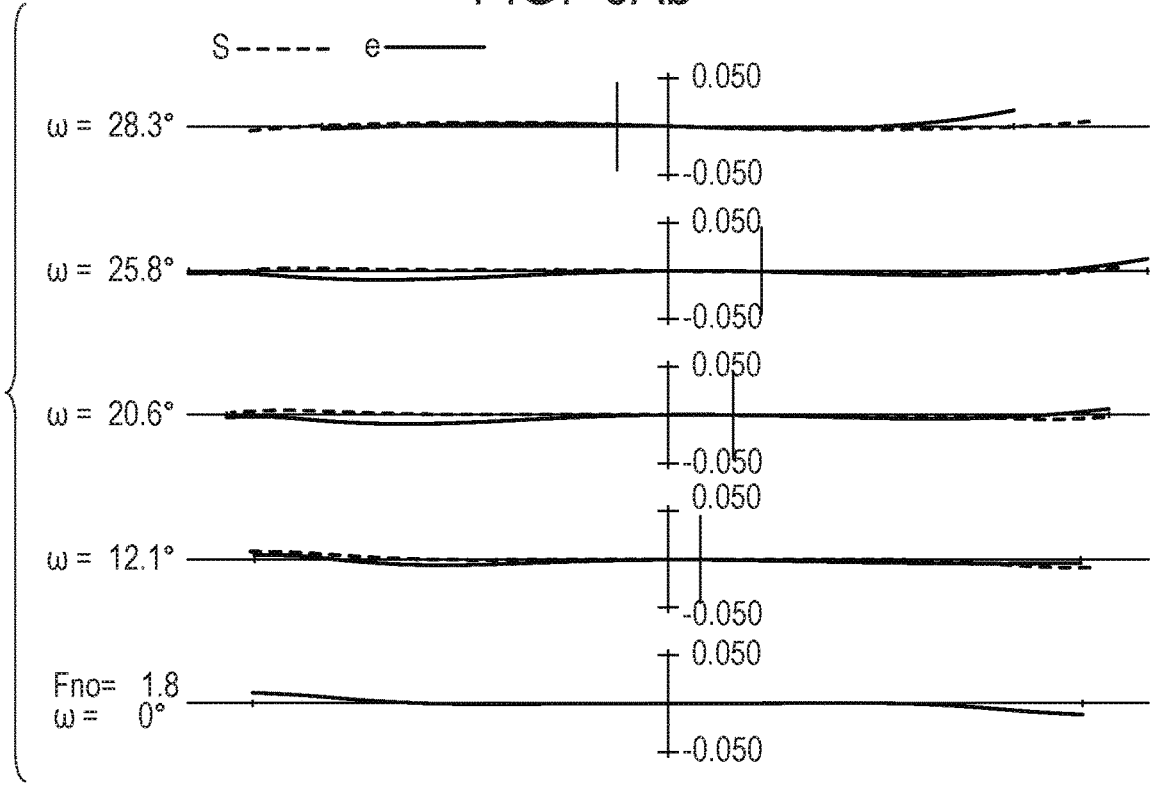
Figure 6B:
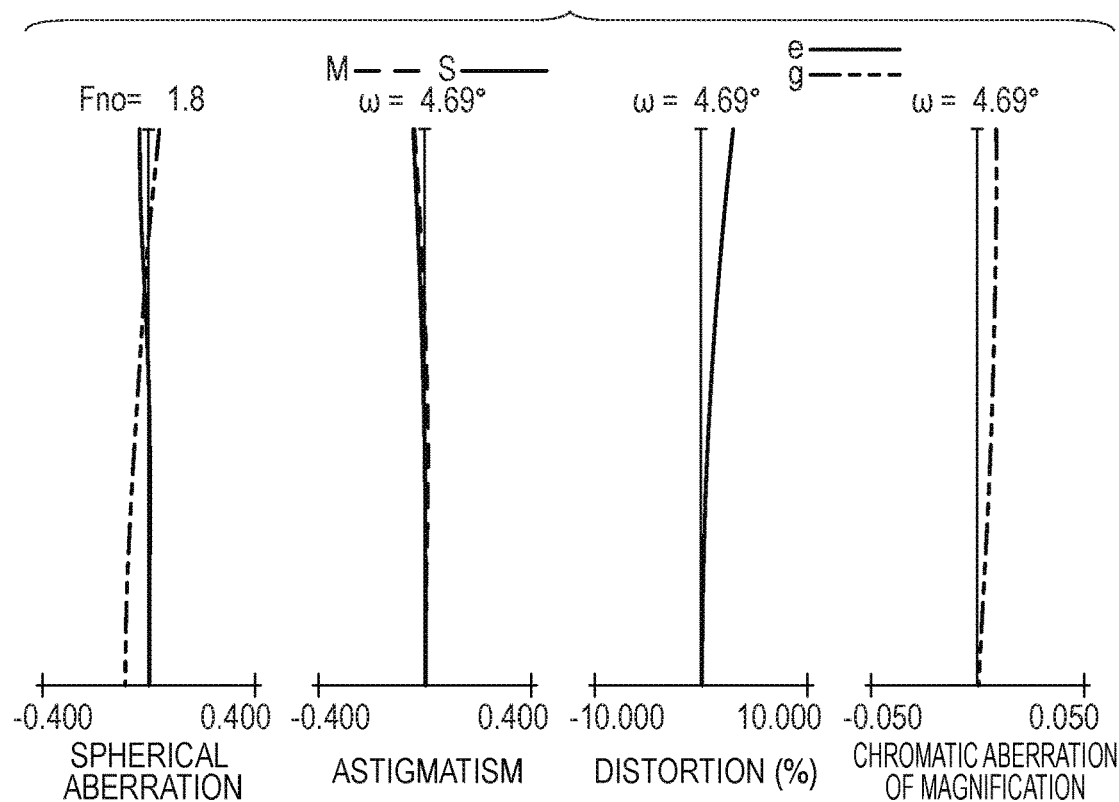
FIG. 6Ba shows longitudinal aberration diagrams in the state in which focus is at infinity at the intermediate zoom position according to Numerical Embodiment 3.
Figure 6B:
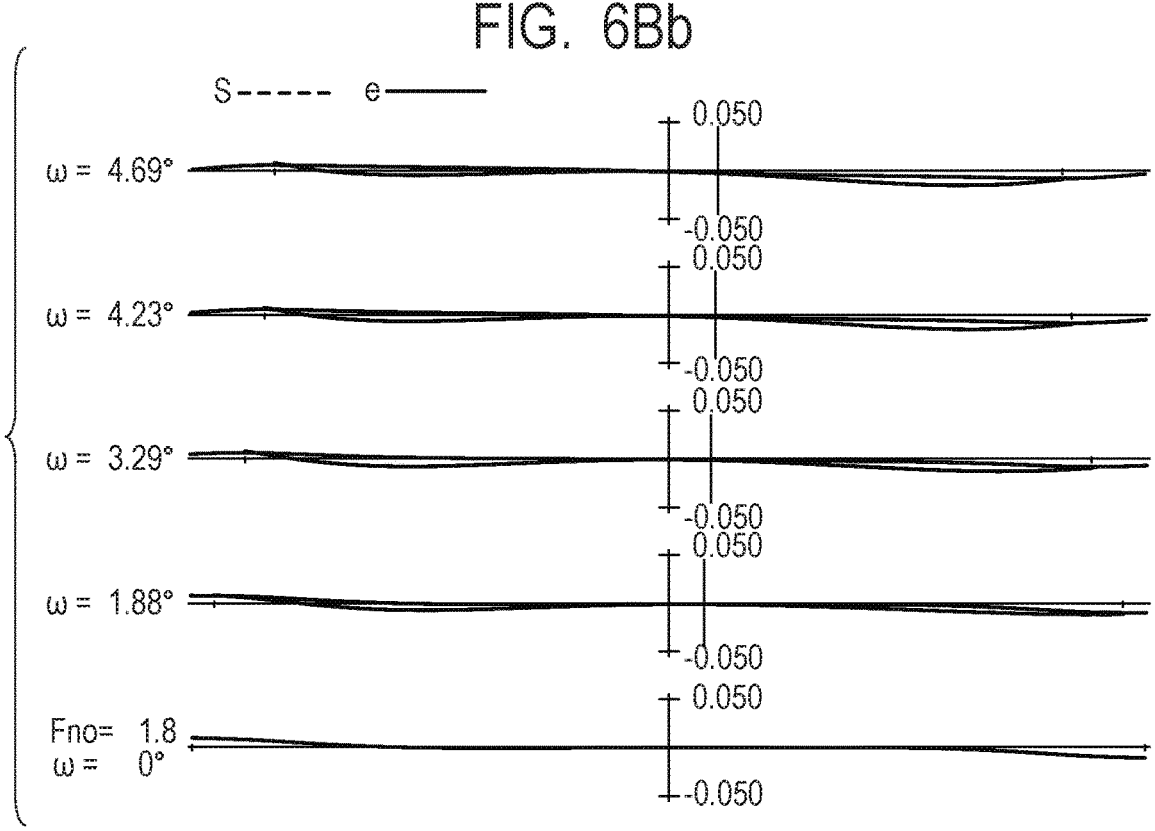
Figure 6C:
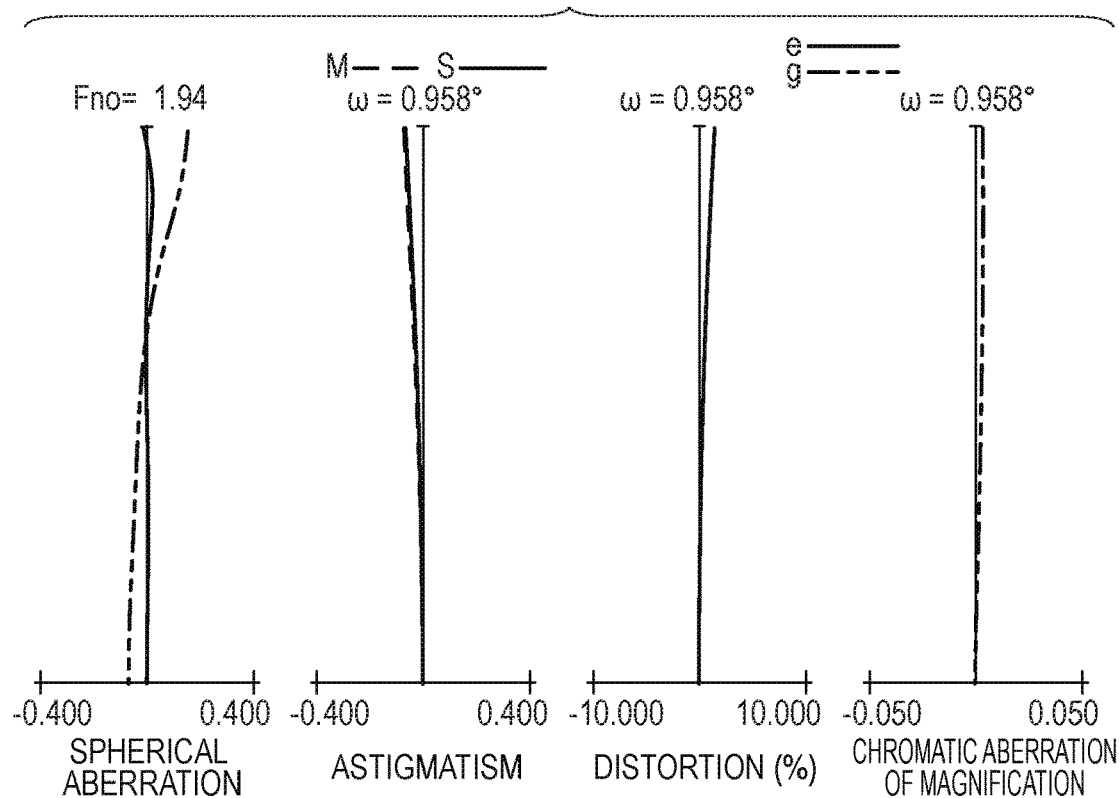
FIG. 6Ca shows longitudinal aberration diagrams in the state in which focus is at infinity at the F-drop point according to Numerical Embodiment 3.
Figure 6C:
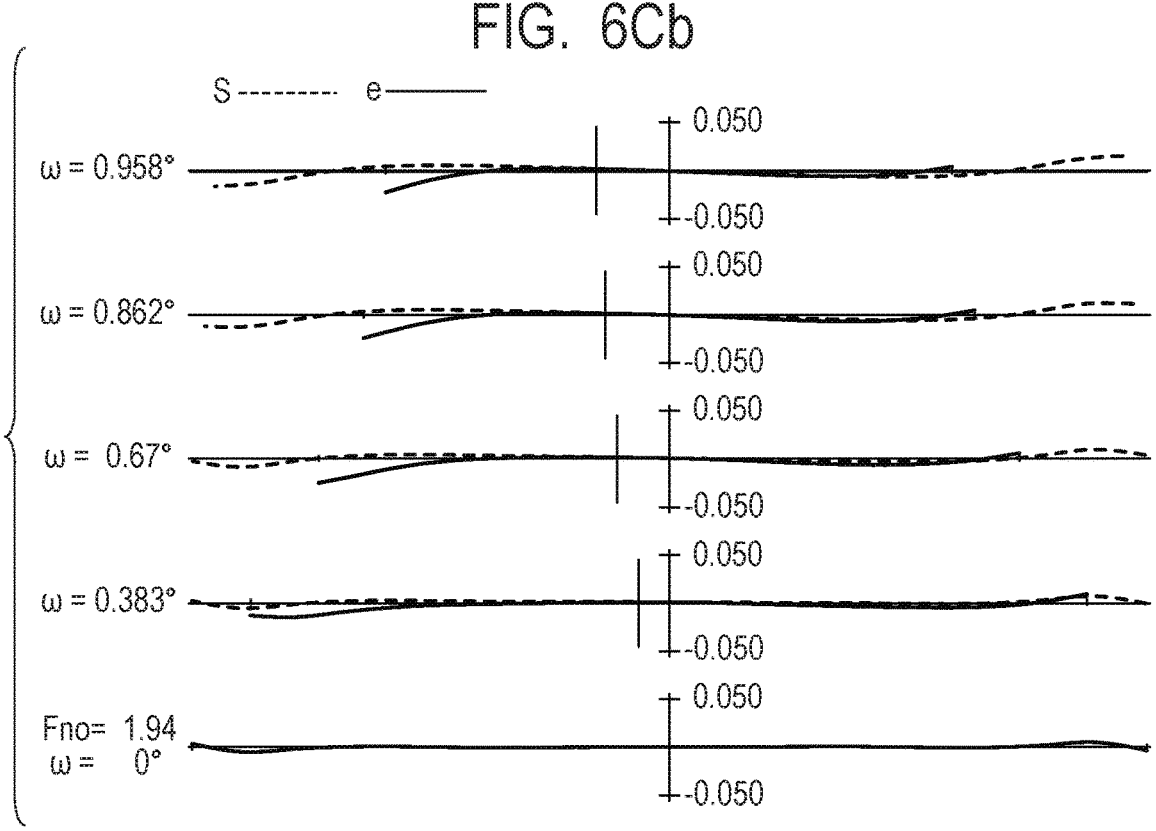
Figure 6D:
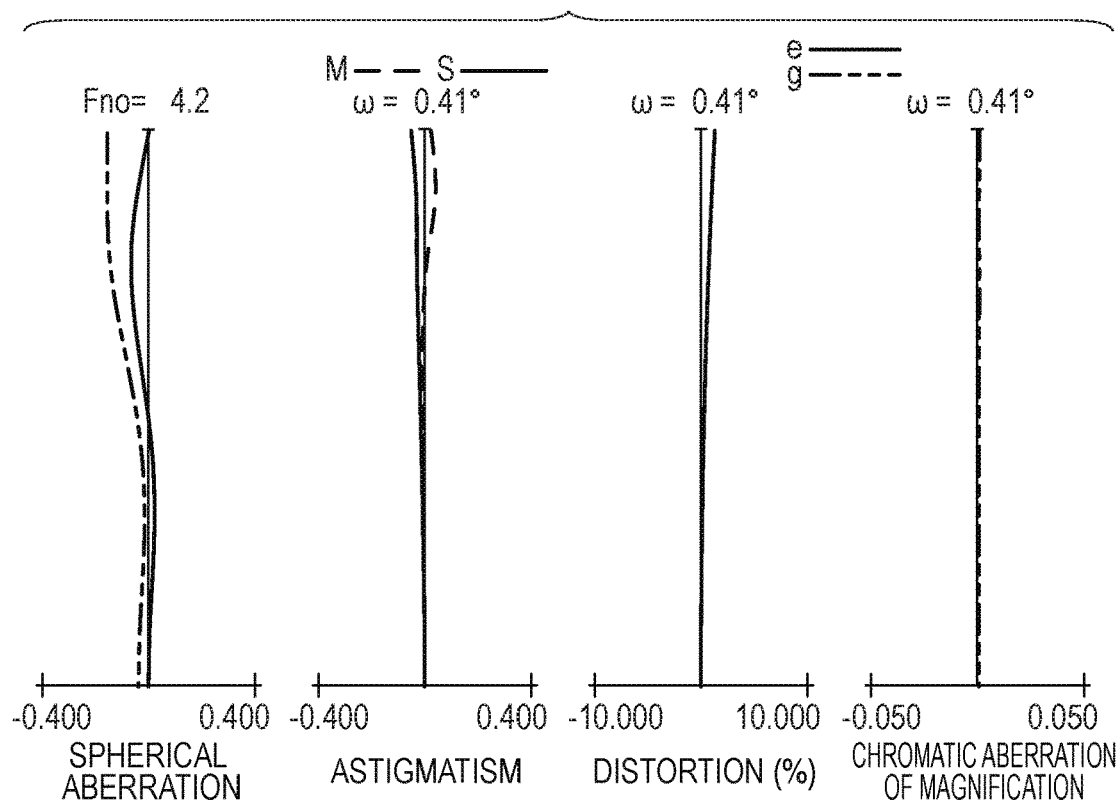
FIG. 6Da shows longitudinal aberration diagrams in the state in which focus is at infinity at the telephoto end according to Numerical Embodiment 3.
Figure 6D:
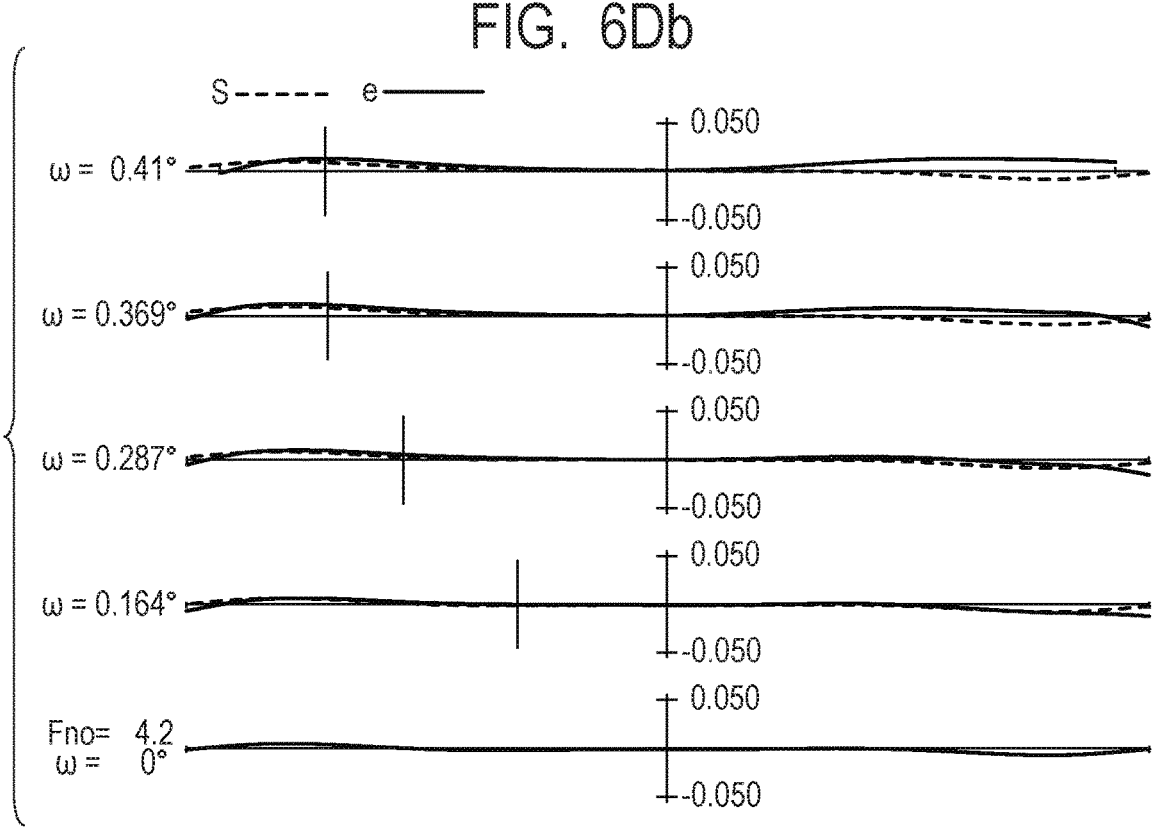

FIG. 6Aa, FIG. 6Ba, FIG. 6Ca, and FIG. 6Da are longitudinal aberration diagrams of the zoom lens according to Embodiment 3 (Numerical Embodiment 3) of the present invention in the state in which focus is on the object at infinity at the wide angle end (focal length: 10.20 mm), the intermediate zoom position (focal length: 88.33 mm), the F-drop point (focal length: 327.86 mm), and the telephoto end (focal length: 765.00 mm), respectively. FIG. 6Ab, FIG. 6Bb, FIG. 6Cb, and FIG. 6Db are lateral aberration diagrams of the zoom lens according to Embodiment 3 (Numerical Embodiment 3) of the present invention in the state in which focus is on the object at infinity at the wide angle end (focal length: 10.20 mm), the intermediate zoom position (focal length: 88.33 mm), the F-drop point (focal length: 327.86 mm), and the telephoto end (focal length: 765.00 mm), respectively.

Next, correspondences with surface data of Numerical Embodiment 3 are described. The first lens unit U1 corresponds to the 1st surface to the 14th surface. The 1st surface to the 8th surface form a first lens subunit U11 having a negative refractive power (or substantially no power), which is configured not to move during focusing, and the 9th surface to the 14th surface correspond to a second lens subunit U12 having a positive refractive power, which is configured to move from the image pickup surface side to the object side during focusing from an infinity side to a proximity side. As the second lens subunit U12, a so-called "floating focus system" may be adopted, in which a part thereof takes a different locus when being driven for focusing, to thereby improve variations in aberrations during drive for focusing. The second lens unit U2 corresponds to the 15th surface to the 21st surface, and has a negative refractive power. The flare cutting stop IF configured to cut only the unnecessary off-axis light without affecting the f-number ray corresponds to the 22nd surface. The first lens subunit U31 corresponds to the 23rd surface to the 24th surface, has a positive refractive power, and is configured to move integrally with the flare cutting stop IF during varying magnification. The second lens subunit U32 corresponds to the 25th surface to the 29th surface, and has a negative refractive power. A third lens subunit U33 corresponds to the 30th surface to the 31st surface, and has a positive refractive power. The aperture stop configured to determine the f-number corresponds to the 32nd surface. The fourth lens unit U4 corresponds to the 33rd surface to the 48th surface, and has a positive refractive power. The 49th surface to the 51st surface form the dummy glass, which corresponds to the optical filter and the color separation optical system in the camera.

Values corresponding to the conditional expressions in Embodiment 3 are shown in Table 1. In Embodiment 3, the expressions (1) to (6) are satisfied as appropriate to achieve the zoom lens having a wide angle of view, a high zoom ratio, a small size, a light weight, and high optical performance over the entire zoom range. In Embodiment 3, in particular, the second lens subunit U32 has a negative refractive power, but is adapted to the conditional expressions for exerting the effects of embodiments of the present invention without any problem. Here, Embodiment 3 is close to a form obtained by dividing the third lens unit U3 of Embodiment 2, and hence when applying the conditional expression (3) to a lens unit composed of the first lens subunit U31 and the second lens subunit U32 of Embodiment 3 as the third lens unit, $(|(\beta 3t/\beta 3w)/(\beta 2t/\beta 2w)|)$ is 0.534, which satisfies the conditional expression (3). Also in Embodiment 3, the structure configured to avoid interference between the second lens unit U2 and the flare cutting stop as illustrated in FIG. 9A, FIG. 9B, and FIG. 9C is provided as in Embodiment 2 to utilize an interval between the second lens unit U2 and the first lens subunit U31 for varying magnification without waste. With this configuration, zooming at a high magnification with a magnification varying ratio of 75× from the wide angle end to the telephoto end is achieved with the structure that is low in cost and easily implemented without complicating the structure of the magnification varying lens unit.

Embodiment 4

FIG. 7 shows lens cross-sectional views of a zoom lens according to Embodiment 4 (Numerical Embodiment 4) of the present invention in the state in which focus is on an object at infinity at (a) a wide angle end (focal length: 14.30 mm), (b) an intermediate zoom position (focal length: 107.30 mm), (c) an F-drop point (focal length: 555.00 mm), and (d) a telephoto end (focal length: 805.09 mm).

Figure 8A:
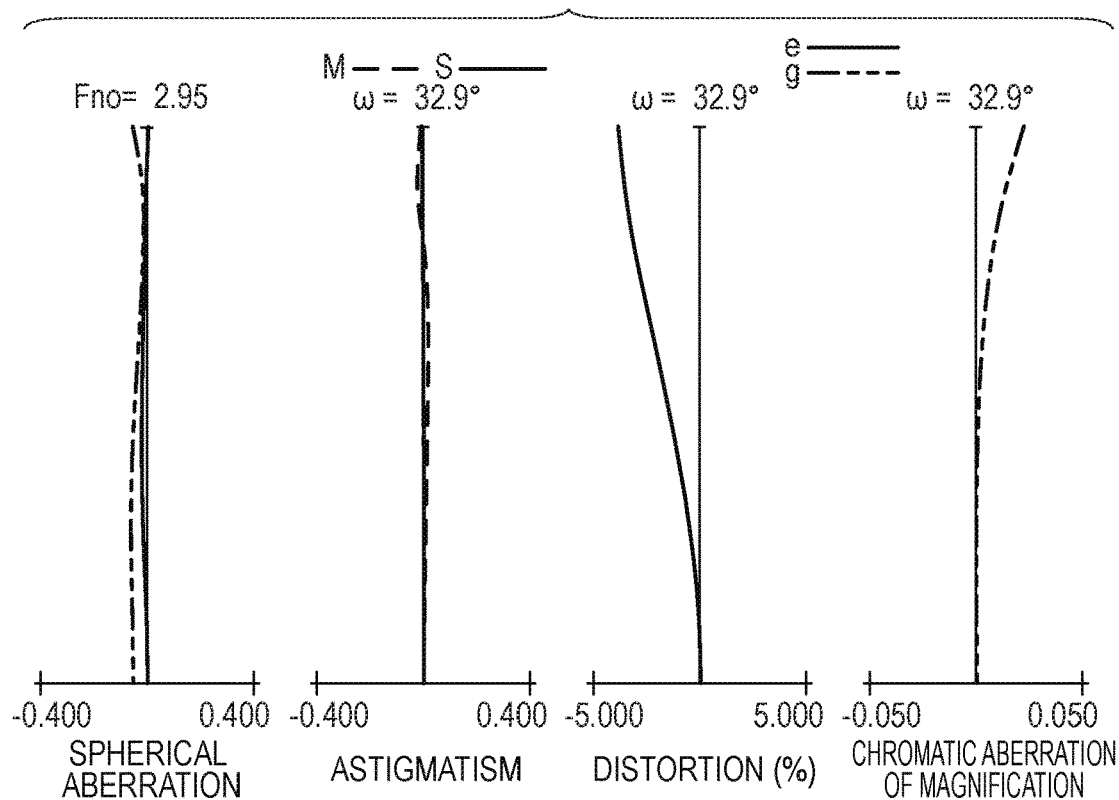
FIG. 8Aa shows longitudinal aberration diagrams in the state in which focus is at infinity at the wide angle end according to Numerical Embodiment 4.
Figure 8A:
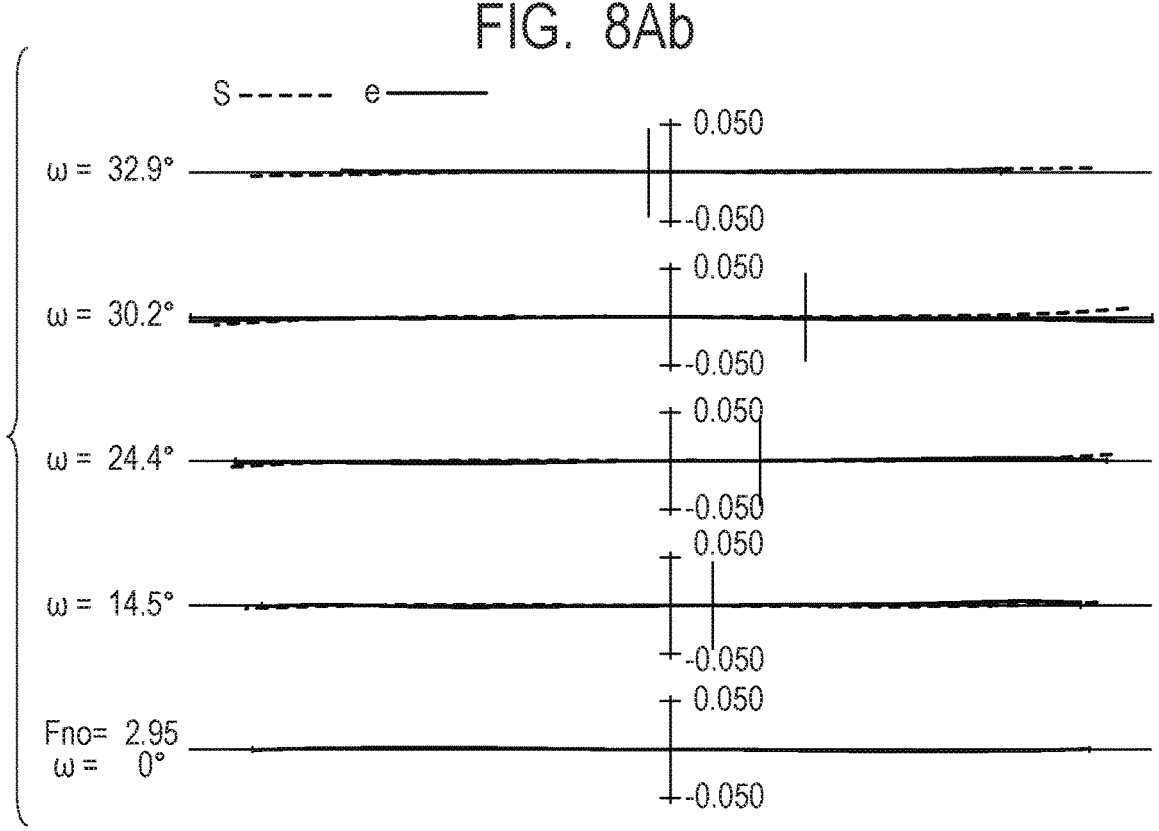
Figure 8B:
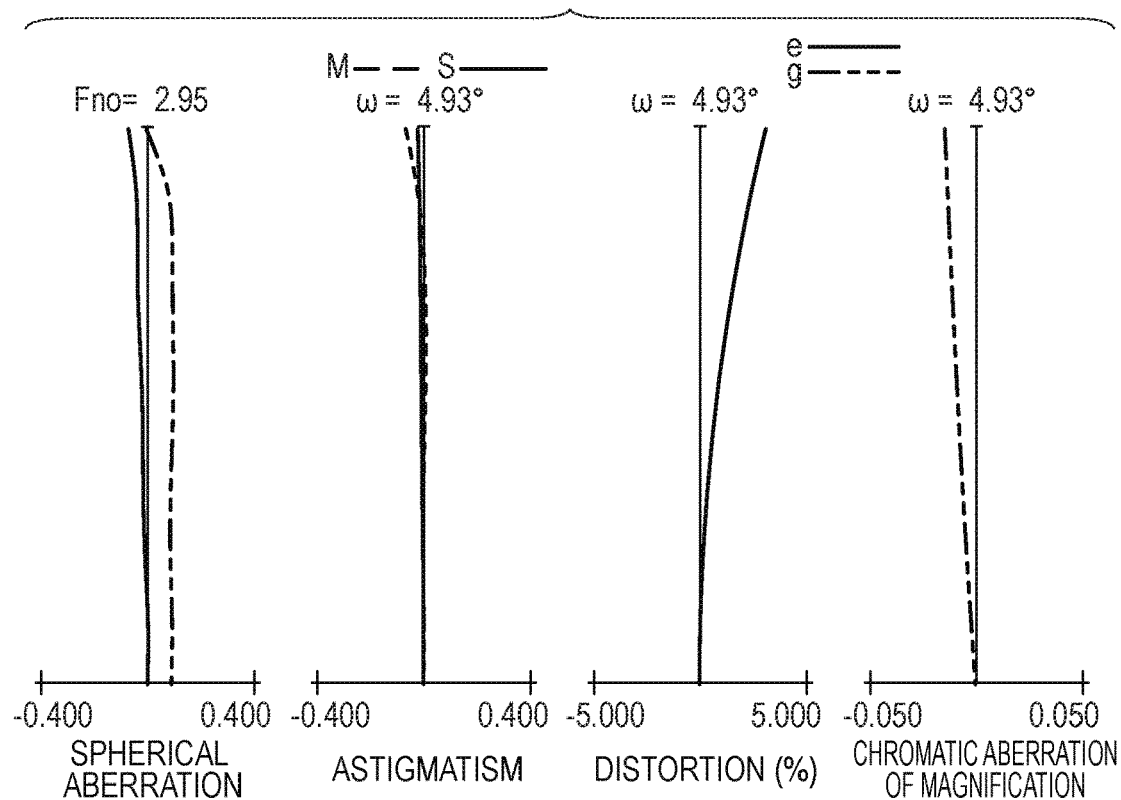
FIG. 8Ba shows longitudinal aberration diagrams in the state in which focus is at infinity at the intermediate zoom position according to Numerical Embodiment 4.
Figure 8B:
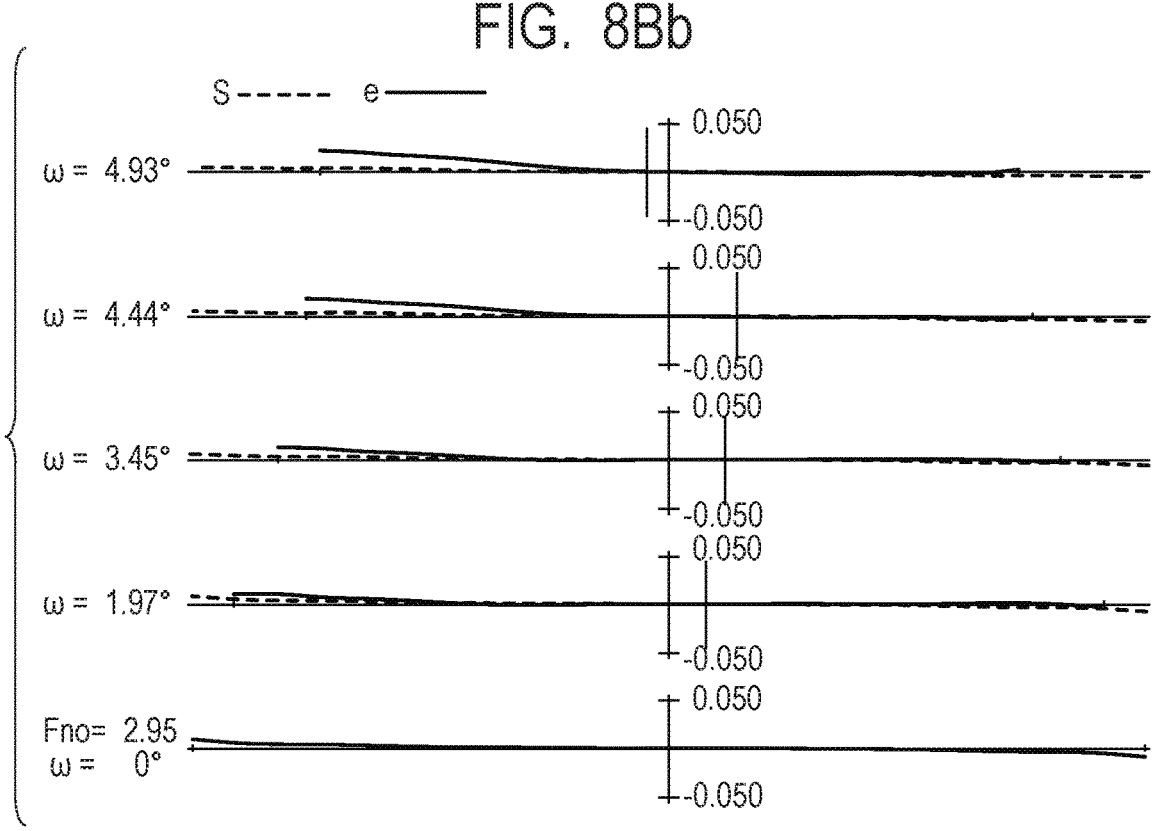
Figure 8C:
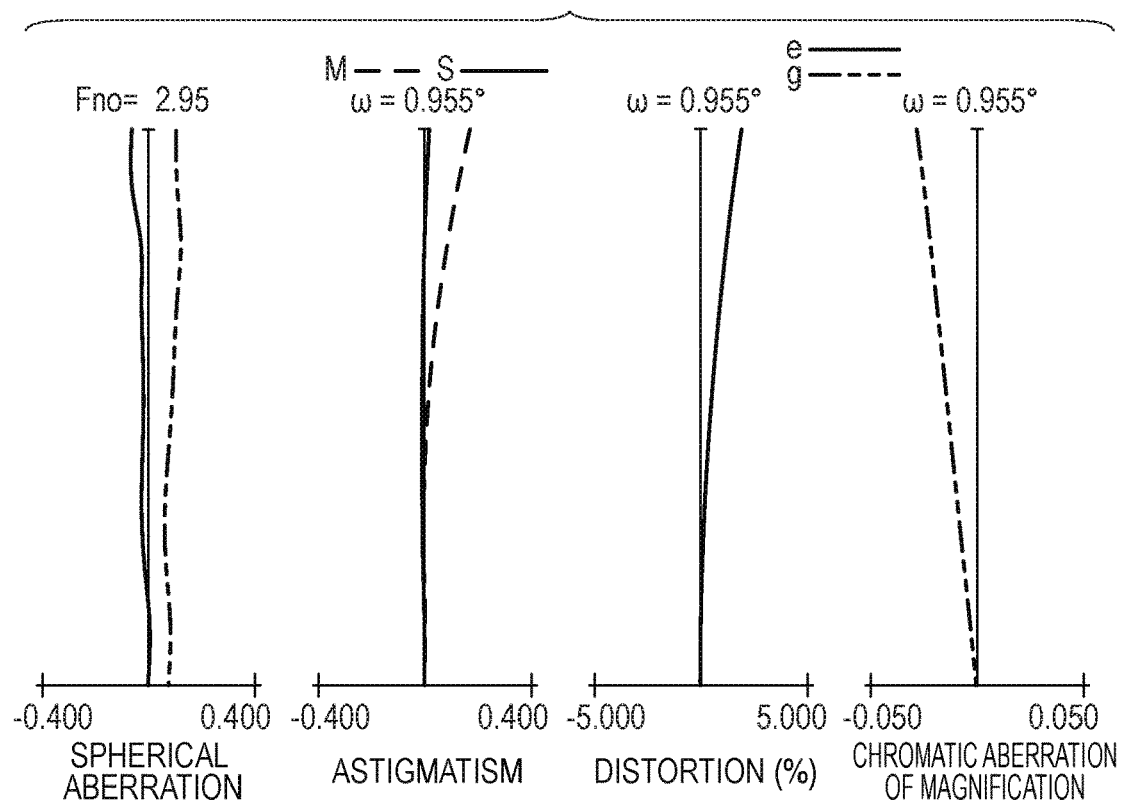
FIG. 8Ca shows longitudinal aberration diagrams in the state in which focus is at infinity at the F-drop point according to Numerical Embodiment 4.
Figure 8C:
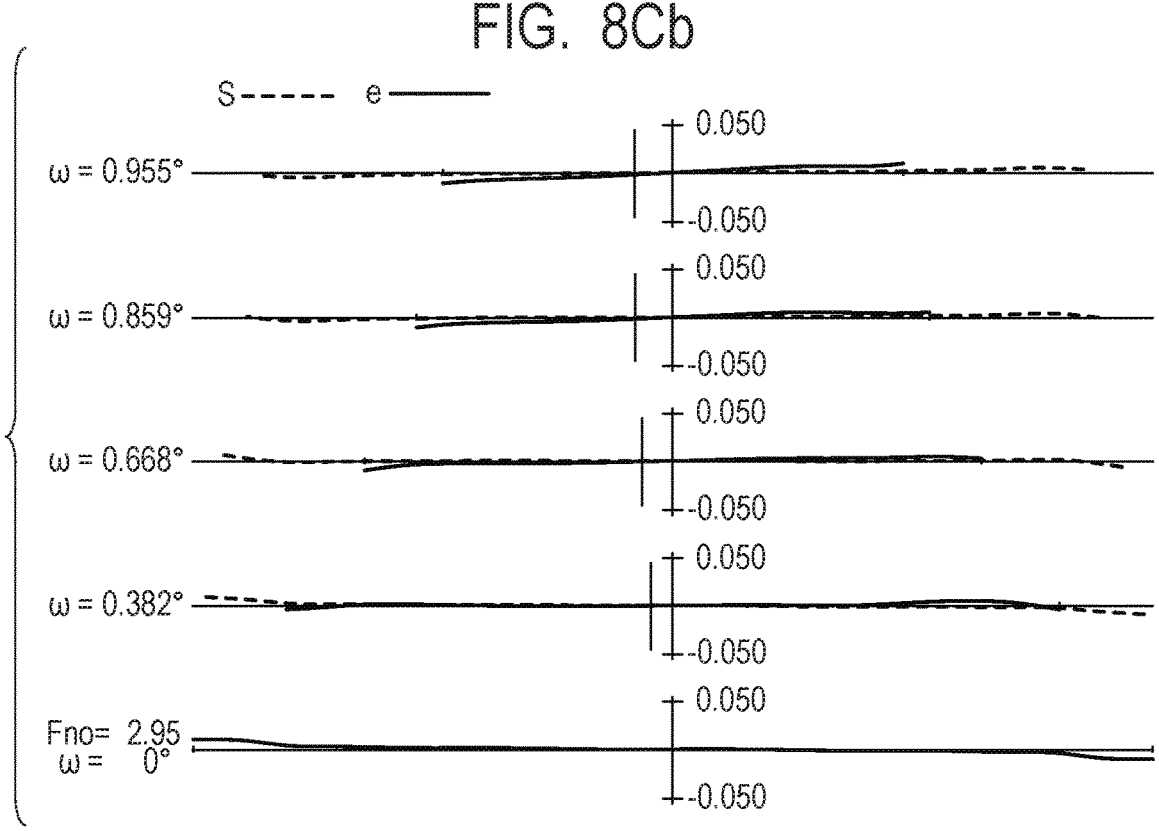
Figure 8D:
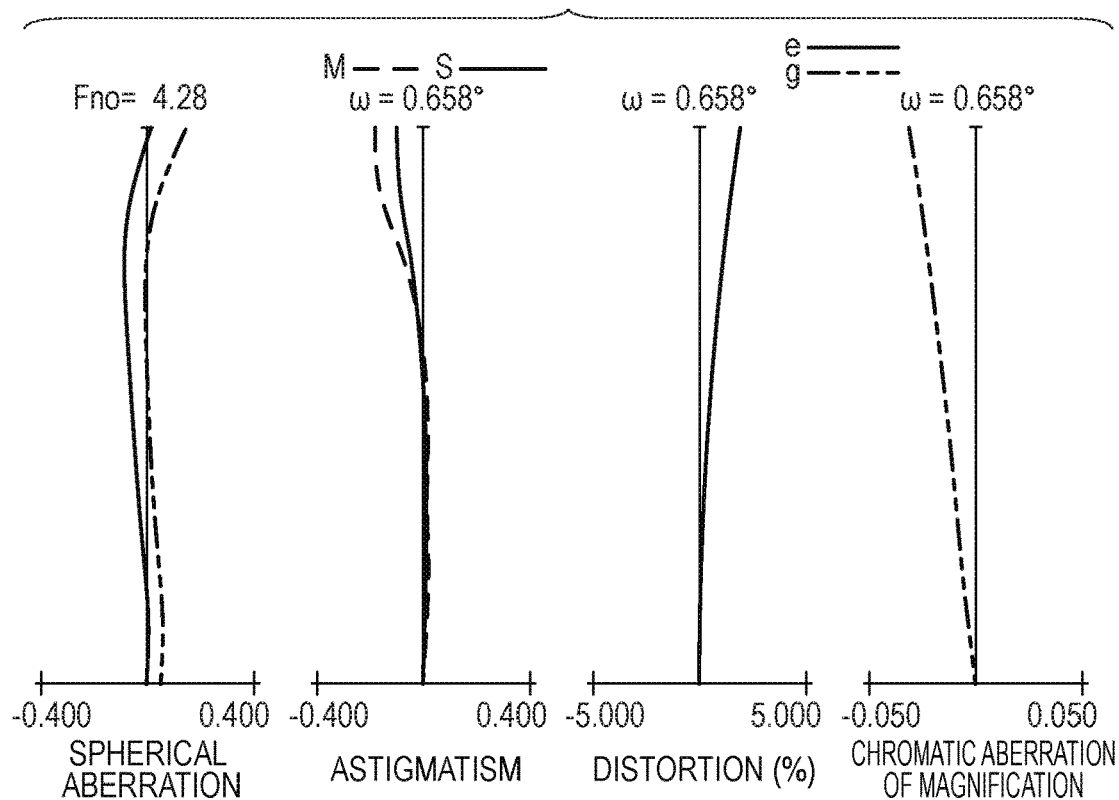
FIG. 8Da shows longitudinal aberration diagrams in the state in which focus is at infinity at the telephoto end according to Numerical Embodiment 4.
Figure 8D:
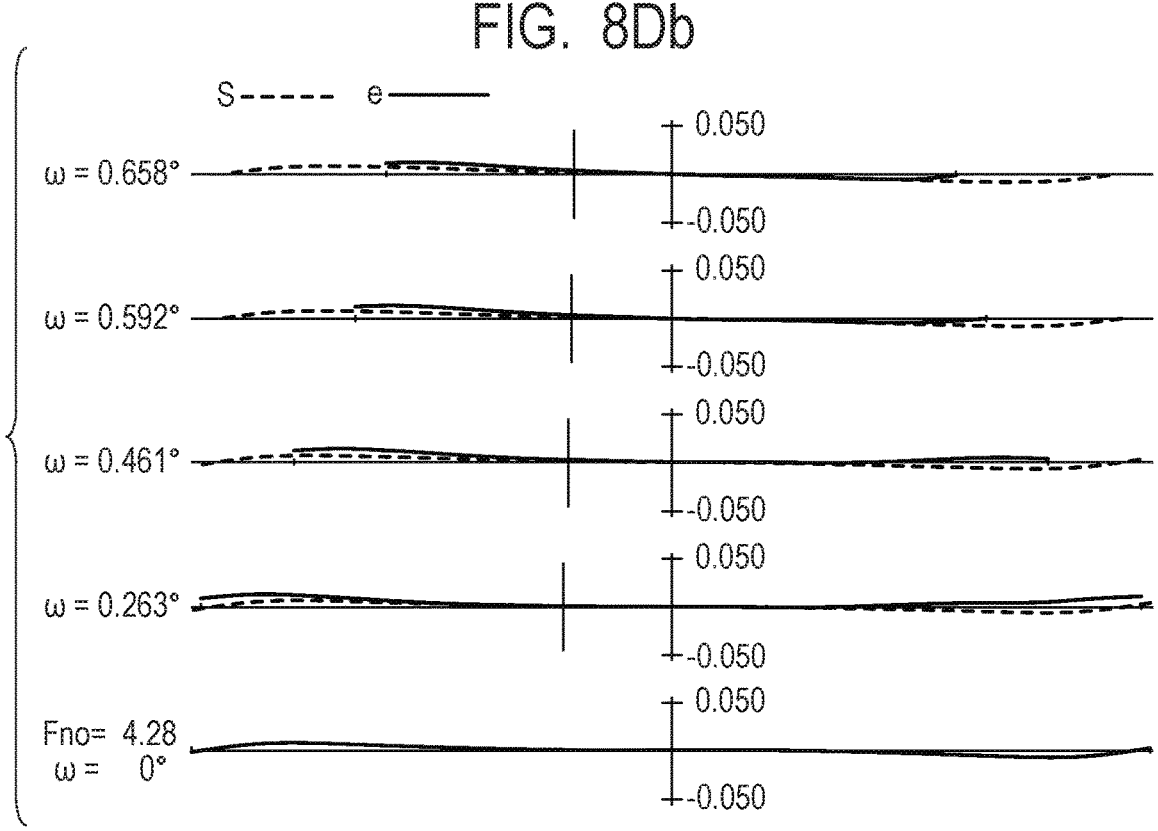

FIG. 8Aa, FIG. 8Ba, FIG. 8Ca, and FIG. 8Da are longitudinal aberration diagrams of the zoom lens according to Embodiment 4 (Numerical Embodiment 4) of the present invention in the state in which focus is on the object at infinity at the wide angle end (focal length: 14.30 mm), the intermediate zoom position (focal length: 107.30 mm), the F-drop point (focal length: 555.00 mm), and the telephoto end (focal length: 805.09 mm), respectively. FIG. 8Ab, FIG. 8Bb, FIG. 8Cb, and FIG. 8Db are lateral aberration diagrams of the zoom lens according to Embodiment 4 (Numerical Embodiment 4) of the present invention in the state in which focus is on the object at infinity at the wide angle end (focal length: 14.30 mm), the intermediate zoom position (focal length: 107.30 mm), the F-drop point (focal length: 555.00 mm), and the telephoto end (focal length: 805.09 mm), respectively.

Next, correspondences with surface data of Numerical Embodiment 4 are described. The first lens unit U1 corresponds to the 1st surface to the 12th surface. The 1st surface to the 6th surface form a first lens subunit U11 having a negative refractive power (or substantially no power), which is configured not to move during focusing, and the 7th surface to the 12th surface correspond to a second lens subunit U12 having a positive refractive power, which is configured to move from the image pickup surface side to the object side during focusing from an infinity side to a proximity side. As the second lens subunit U12, a so-called "floating focus system" may be adopted, in which a part thereof takes a different locus when being driven for focusing, to thereby improve variations in aberrations during drive for focusing. The second lens unit U2 corresponds to the 13th surface to the 19th surface, and has a negative refractive power. In Numerical Embodiment 4, the second lens unit U2 is divided into, in order from the object side, a first lens subunit U21 having a negative refractive power and a second lens subunit U22 having a negative refractive power to have slightly different loci at the intermediate zoom position. This configuration results in a form with which aberrations at the intermediate zoom position can be corrected more advantageously in particular. Values relating to the refractive power and the position of the second lens unit U2 in the conditional expressions of the present invention are calculated on the assumption that the first lens subunit U21 and the second lens subunit U22 are regarded as one lens unit. The flare cutting stop IF configured to cut only the unnecessary off-axis light without affecting the f-number ray corresponds to the 20th surface. The first lens subunit U31 corresponds to the 21st surface to the 26th surface, has a positive refractive power, and is configured to move integrally with the flare cutting stop IF during varying magnification. The second lens subunit U32 corresponds to the 27th surface to the 31st surface, and has a positive refractive power. The aperture stop configured to determine the f-number corresponds to the 32nd surface. The fourth lens unit U4 corresponds to the 33rd surface to the 53rd surface, and has a positive refractive power. The 54th surface to the 56th surface form the dummy glass, which corresponds to the optical filter and the color separation optical system in the camera.

Values corresponding to the conditional expressions in Embodiment are shown in Table 1. In Embodiment 4, the expressions (1) to (6) are satisfied as appropriate to achieve the zoom lens having a wide angle of view, a high zoom ratio, a small size, a light weight, and high optical performance over the entire zoom range. In Embodiment 4, in particular, a form in which the second lens unit U2 is divided into two lens subunits is adopted for advantages in further correcting aberrations, but when the two lens subunits are regarded as one lens unit in view of the role of sharing magnification varying, is adapted to the conditional expressions for exerting the effects of embodiments of the present invention without any problem. Embodiment 4 achieves zooming at a high magnification with a magnification varying ratio of 56.3× from the wide angle end to the telephoto end with the structure that is low in cost and easily implemented.

Embodiment 5

Figure 10:
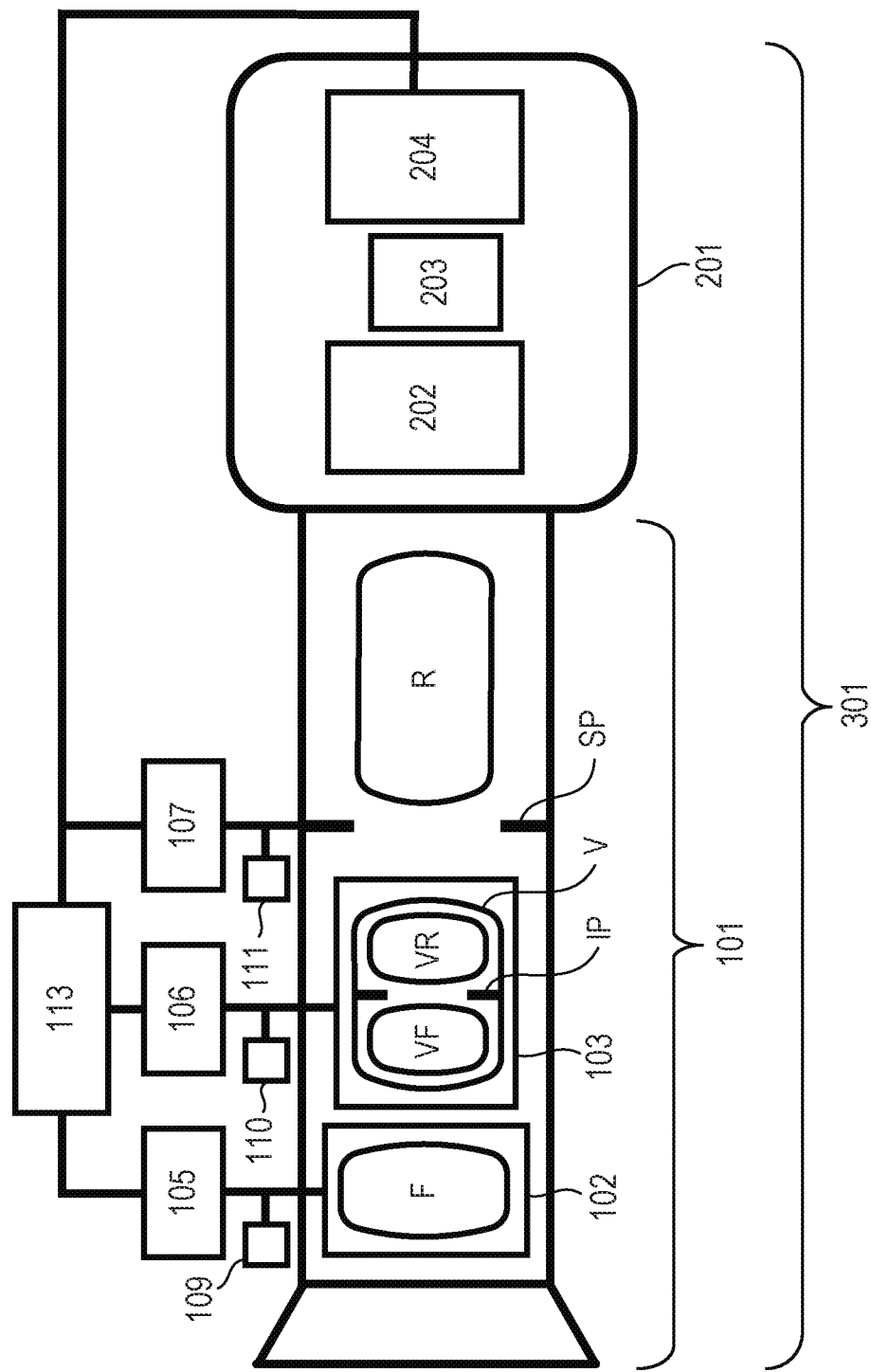
FIG. 10 is a schematic diagram of a main part of an image pickup apparatus according to Embodiment 5 of the present invention.

FIG. 10 is a schematic diagram of an image pickup apparatus (television camera system) using the zoom lens according to any one of Embodiments 1 to 4 as a photographing optical system. A zoom lens 101, which is the zoom lens according to any one of Embodiments 1 to 4, is removable from a camera 201. The zoom lens 101 is attached to the camera 201 to form an image pickup apparatus 301. The zoom lens 101 includes a first lens unit F, a magnification varying portion V, and a rear lens unit R for forming an image. The first lens unit F includes a lens unit for focusing. The magnification varying portion V includes a front magnification varying lens unit VF configured to move on the optical axis during varying magnification, the flare cutting stop IF, and a rear magnification varying lens unit VR. An aperture stop is denoted by SP. Drive mechanisms 102 and 103, such as helicoids or cams, are configured to drive the first lens unit F and the magnification varying portion V in the optical axis direction, respectively. Motors (drive units) 105 to 107 are configured to electrically drive the drive mechanisms 102 and 103 and an aperture stop SP, respectively. Detectors 109 to 111, such as encoders, potentiometers, or photosensors, are configured to detect positions on the optical axis of the first lens unit F and the magnification varying portion V, and a stop diameter of the aperture stop SP. The camera 201 includes a glass block 202, which corresponds to an optical filter or a color separation optical system in the camera 201, and a solid image pickup element (photoelectric conversion element) 203, such as a CCD sensor or a CMOS sensor, configured to receive an object image formed by the zoom lens 101. Further, CPUs 204 and 113 are configured to control various kinds of driving of the camera 201 and the zoom lens 101, respectively.

As described above, when the zoom lens according to embodiments of the present invention is applied to a television camera, the image pickup apparatus having high optical performance can be achieved.

Numerical Embodiment 1

Unit: mm

Surface data

| Surface number | r | d | nd | vd | θgF | Effective diameter | Focal length |
|---|---|---|---|---|---|---|---|
| 1 | −2,942.18811 | 6.00000 | 1.834810 | 42.74 | 0.5648 | 203.750 | −358.417 |
| 2 | 335.45859 | 1.80000 | | | | 192.610 | |
| 3 | 335.06633 | 23.70767 | 1.433870 | 95.10 | 0.5373 | 191.868 | 588.078 |
| 4 | −1,057.92901 | 0.20000 | | | | 190.148 | |
| 5 | 525.29863 | 14.68252 | 1.433870 | 95.10 | 0.5373 | 193.025 | 995.955 |
| 6 | −2,449.90453 | 25.25075 | | | | 193.154 | |
| 7 | 377.04224 | 20.53079 | 1.433870 | 95.10 | 0.5373 | 193.717 | 681.715 |
| 8 | −1,365.49684 | 0.25000 | | | | 193.047 | |
| 9 | 306.95406 | 16.15620 | 1.433870 | 95.10 | 0.5373 | 187.894 | 856.440 |
| 10 | 1,716.23164 | 1.49946 | | | | 186.359 | |
| 11 | 188.24393 | 16.19337 | 1.438750 | 94.66 | 0.5340 | 175.691 | 776.951 |
| 12 | 408.07756 | (Variable) | | | | 173.184 | |
| 13 | −532.82374 | 2.20000 | 2.003300 | 28.27 | 0.5980 | 44.984 | −35.106 |

-continued

Unit: mm

| | | | | | | | |
|---|---|---|---|---|---|---|---|
| 14 | 38.13165 | 11.72245 | | | | 38.642 | |
| 15 | −44.54614 | 1.45000 | 1.743198 | 49.34 | 0.5531 | 37.438 | −36.767 |
| 16 | 72.56546 | 9.77415 | 1.892860 | 20.36 | 0.6393 | 38.715 | 32.645 |
| 17 | −46.48441 | 1.62858 | | | | 39.806 | |
| 18 | −41.75805 | 2.00000 | 1.882997 | 40.76 | 0.5667 | 39.744 | −65.283 |
| 19 | −152.60813 | (Variable) | | | | 42.316 | |
| 20 | (Flare Cutting Stop) | 26.00000 | | | | 60.360 | |
| 21 | 152.33559 | 11.49260 | 1.729157 | 54.68 | 0.5444 | 82.983 | 133.769 |
| 22 | −265.71450 | 6.61910 | | | | 83.273 | |
| 23 | 139.88768 | 13.50202 | 1.438750 | 94.66 | 0.5340 | 83.569 | 205.022 |
| 24 | −246.30392 | 0.49825 | | | | 82.934 | |
| 25 | 264.09410 | 2.60000 | 1.854780 | 24.80 | 0.6122 | 79.988 | −179.267 |
| 26 | 97.10593 | (Variable) | | | | 77.223 | |
| 27 | 86.50601 | 15.38886 | 1.496999 | 81.54 | 0.5375 | 77.479 | 129.181 |
| 28 | −236.96933 | 0.50000 | | | | 76.571 | |
| 29 | 415.87662 | 2.50000 | 1.805181 | 25.42 | 0.6161 | 73.248 | −258.974 |
| 30 | 139.36202 | 7.84908 | 1.603112 | 60.64 | 0.5415 | 70.931 | 195.306 |
| 31 | −764.20052 | (Variable) | | | | 69.699 | |
| 32 | (Stop) | 4.84000 | | | | 34.039 | |
| 33 | −138.18307 | 1.40000 | 1.717004 | 47.92 | 0.5605 | 31.464 | −48.078 |
| 34 | 46.43091 | 0.47326 | | | | 30.197 | |
| 35 | 33.96796 | 4.50685 | 1.854780 | 24.80 | 0.6122 | 30.253 | 57.662 |
| 36 | 100.46819 | 2.99046 | | | | 29.383 | |
| 37 | −259.50169 | 1.40000 | 1.891900 | 37.13 | 0.5780 | 28.555 | −68.817 |
| 38 | 81.27385 | 20.1700 | | | | 27.879 | |
| 39 | −1,353.89742 | 4.17772 | 1.487490 | 70.23 | 0.5300 | 25.682 | 83.062 |
| 40 | −39.48578 | 1.19320 | | | | 25.530 | |
| 41 | −52.65530 | 1.60000 | 1.882997 | 40.76 | 0.5667 | 24.659 | −16.067 |
| 42 | 19.85501 | 9.52924 | 1.639799 | 34.46 | 0.5922 | 24.591 | 22.854 |
| 43 | −46.23969 | 14.9900 | | | | 25.412 | |
| 44 | −144.86408 | 7.20624 | 1.516330 | 64.14 | 0.5353 | 26.359 | 59.225 |
| 45 | −25.75718 | 0.69246 | | | | 27.232 | |
| 46 | −78.44236 | 1.80000 | 2.001000 | 29.13 | 0.5997 | 26.128 | −15.418 |
| 47 | 19.63195 | 12.22279 | 1.808095 | 22.76 | 0.6307 | 26.257 | 20.196 |
| 48 | −74.15936 | 0.19847 | | | | 27.560 | |
| 49 | 1,100.38435 | 8.06667 | 1.548141 | 45.79 | 0.5686 | 27.708 | 39.371 |
| 50 | −22.07117 | 1.80000 | 1.854780 | 24.80 | 0.6122 | 27.864 | −35.607 |
| 51 | −81.32000 | 11.65158 | | | | 29.492 | |
| 52 | −55.36979 | 8.12203 | 1.487490 | 70.23 | 0.5300 | 32.076 | 100.553 |
| 53 | −27.30240 | 9.49982 | | | | 33.752 | |
| 54 | ∞ | 63.04000 | 1.608590 | 46.44 | 0.5664 | 70.000 | |
| 55 | ∞ | 8.70000 | 1.516330 | 64.15 | 0.5352 | 70.000 | |
| 56 | ∞ | 10.99810 | | | | 70.000 | |
| Image plane | ∞ | | | | | | |

Aspherical surface data

Thirteenth surface

| | | | |
|---|---|---|---|
| K = 1.99852e+000 | A4 = 1.15677e−006 | A6 = −2.75064e−008 | A8 = −3.06848e−010 |
| A10 = 9.10515e−013 | A12 = 3.28486e−015 | A14 = 1.35261e−018 | A16 = 5.54400e−022 |
| A3 = 2.74335e−007 | A5 = 9.95673 e−008 | A7 = 4.02226e−009 | A9 = 6.12079e−012 |
| A11 = −8.52506e−014 | A13 = −6.85632e−017 | A15 = −3.84859e−020 | |

Twenty-second surface

| | | | |
|---|---|---|---|
| K = 1.21093e+001 | A4 = 2.82183e−007 | A6 = −5.59441e−011 | A8 = −2.00796e−014 |
| A10 = 9.78964e−017 | A12 = −6.30815e−020 | A14 = 1.70834e−023 | A16 = −4.73901e−027 |
| A3 = −2.90901e−008 | A5 = 1.58196e−009 | A7 = 1.10620e−012 | A9 = −1.50730e−015 |
| A11 = 5.86871e−020 | A13 = 1.04584e−022 | A15 = 1.44467e−025 | |

Thirty-first surface

| | | | |
|---|---|---|---|
| K = −2.23400e+002 | A4 = 2.77687e−007 | A6 = 4.69555e−010 | A8 = 1.39733e−013 |
| A10 = −2.98156e−016 | A12 = 4.58582e−019 | A14 = −2.25443e−022 | A16 = 5.80568e−026 |
| A3 = 1.70768e−007 | A5 = −5.73181e−009 | A7 = −1.36230e−011 | A9 = 7.92918e−015 |
| A11 = −8.14405e−018 | A13 = 2.06016e−021 | A15 = −8.57551e−025 | |

Various data

| | | | | |
|---|---|---|---|---|
| Zoom ratio | 56.00 | | | |
| Focal length | 14.30 | 107.04 | 552.17 | 800.80 |
| F-number | 2.95 | 2.95 | 2.95 | 4.28 |
| Half angle of view | 32.90 | 4.94 | 0.96 | 0.66 |
| Total lens length | 727.27 | 727.27 | 727.27 | 727.27 |

-continued

| Unit: mm | | | | |
|---|---|---|---|---|
| d12 | 3.47 | 136.28 | 184.78 | 188.97 |
| d19 | 263.33 | 89.82 | 31.05 | 13.68 |
| d26 | 4.21 | 17.44 | 3.79 | 6.78 |
| d31 | 2.99 | 30.47 | 54.38 | 64.58 |
| Entrance pupil position | 133.62 | 741.83 | 3,367.79 | 4,979.68 |
| Exit pupil position | 473.66 | 473.66 | 473.66 | 473.66 |
| Front principal point position | 148.37 | 873.63 | 4,578.95 | 7,166.52 |
| Rear principal point position | −3.30 | −96.04 | −541.17 | −789.80 |

| Zoom lens unit data | | | | | |
|---|---|---|---|---|---|
| Unit | First surface | Focal length | Lens structure length | Front principal point position | Rear principal point position |
| 1 | 1 | 251.50 | 126.27 | 72.69 | −19.27 |
| 2 | 13 | −24.07 | 28.78 | 3.62 | −16.98 |
| 31 | 20 | 134.62 | 60.71 | 20.97 | −27.55 |
| 32 | 27 | 112.37 | 26.24 | 4.27 | −13.07 |
| 4 | 32 | 72.20 | 119.03 | 88.04 | 126.80 |

| Single lens data | | |
|---|---|---|
| Lens | First surface | Focal length |
| 1 | 1 | −358.42 |
| 2 | 3 | 588.08 |
| 3 | 5 | 995.95 |
| 4 | 7 | 681.71 |
| 5 | 9 | 856.44 |
| 6 | 11 | 776.95 |
| 7 | 13 | −35.11 |
| 8 | 15 | −36.77 |
| 9 | 16 | 32.64 |
| 10 | 18 | −65.28 |
| 11 | 21 | 133.77 |
| 12 | 23 | 205.02 |
| 13 | 25 | −179.27 |
| 14 | 27 | 129.18 |
| 15 | 29 | −258.97 |
| 16 | 30 | 195.31 |
| 17 | 33 | −48.08 |
| 18 | 35 | 57.66 |
| 19 | 37 | −68.82 |
| 20 | 39 | 83.06 |
| 21 | 41 | −16.07 |
| 22 | 42 | 22.85 |
| 23 | 44 | 59.22 |
| 24 | 46 | −15.42 |
| 25 | 47 | 20.20 |
| 26 | 49 | 39.37 |
| 27 | 50 | −35.61 |
| 28 | 52 | 100.55 |
| 29 | 54 | 0.00 |
| 30 | 55 | 0.00 |

Numerical Embodiment 2

| Surface data | | | | | | | |
|---|---|---|---|---|---|---|---|
| Surface number | R | d | nd | vd | θgF | Effective diameter | Focal length |
| 1 | 1,997.02113 | 6.00000 | 1.788001 | 47.37 | 0.5559 | 195.890 | −452.598 |
| 2 | 303.49132 | 1.94485 | | | | 189.686 | |
| 3 | 317.22604 | 19.16858 | 1.433870 | 95.10 | 0.5373 | 190.331 | 698.448 |
| 4 | −7,044.93390 | 0.20000 | | | | 190.807 | |
| 5 | 673.24372 | 6.00000 | 1.834000 | 37.16 | 0.5776 | 192.066 | −1,014.711 |

-continued

| | | | | | | | |
|---|---|---|---|---|---|---|---|
| 6 | 374.48011 | 0.79177 | | | | 191.559 | |
| 7 | 345.92209 | 19.79827 | 1.433870 | 95.10 | 0.5373 | 192.306 | 687.598 |
| 8 | −2,170.21310 | 28.23869 | | | | 192.619 | |
| 9 | 339.68529 | 21.07732 | 1.433870 | 95.10 | 0.5373 | 195.887 | 648.526 |
| 10 | −1,632.16760 | 0.25000 | | | | 195.399 | |
| 11 | 246.79128 | 21.92714 | 1.433870 | 95.10 | 0.5373 | 190.025 | 593.790 |
| 12 | 5,400.98293 | 1.20000 | | | | 188.476 | |
| 13 | 187.53643 | 11.51644 | 1.496999 | 81.54 | 0.5375 | 175.349 | 938.175 |
| 14 | 306.70190 | (Variable) | | | | 173.642 | |
| 15 | 930.09210 | 2.35000 | 1.882997 | 40.76 | 0.5667 | 53.860 | −58.233 |
| 16 | 48.93704 | 8.62302 | | | | 46.980 | |
| 17 | −228.62144 | 1.45000 | 1.772499 | 49.60 | 0.5520 | 45.855 | −37.375 |
| 18 | 33.31892 | 13.01460 | 1.784696 | 26.29 | 0.6135 | 43.011 | 34.566 |
| 19 | −126.76144 | 3.63452 | | | | 43.106 | |
| 20 | −47.00906 | 2.00000 | 1.696797 | 55.53 | 0.5434 | 43.046 | −59.719 |
| 21 | 383.02728 | (Variable) | | | | 45.323 | |
| 22 | (Flare Cutting Stop) | 25.00000 | | | | 62.791 | |
| 23 | 359.47102 | 10.40779 | 1.603112 | 60.64 | 0.5415 | 79.418 | 159.320 |
| 24 | −130.40784 | 0.88057 | | | | 80.339 | |
| 25 | 229.25254 | 11.10721 | 1.496999 | 81.54 | 0.5375 | 82.087 | 205.850 |
| 26 | −182.74509 | 9.50174 | | | | 82.045 | |
| 27 | −206.21310 | 2.50000 | 1.717362 | 29.52 | 0.6047 | 79.378 | −106.306 |
| 28 | 123.17797 | 7.78057 | 1.496999 | 81.54 | 0.5375 | 79.607 | 284.767 |
| 29 | 912.13699 | (Variable) | | | | 79.861 | |
| 30 | 247.96165 | 14.10652 | 1.618000 | 63.33 | 0.5441 | 81.677 | 126.414 |
| 31 | −112.19096 | (Variable) | | | | 81.715 | |
| 32 | (Stop) | 4.90749 | | | | 33.163 | |
| 33 | −72.13544 | 1.80000 | 1.816000 | 46.62 | 0.5568 | 31.566 | −39.850 |
| 34 | 60.43089 | 5.13557 | 1.808095 | 22.76 | 0.6307 | 31.230 | 59.455 |
| 35 | −237.28216 | 7.55722 | | | | 31.078 | |
| 36 | −28.78125 | 1.49977 | 1.816000 | 46.62 | 0.5568 | 30.264 | −24.953 |
| 37 | 72.49578 | 10.08032 | 1.548141 | 45.79 | 0.5686 | 33.567 | 38.544 |
| 38 | −28.55262 | 16.01453 | | | | 34.877 | |
| 39 | 194.31854 | 9.07524 | 1.531717 | 48.84 | 0.5631 | 38.230 | 68.490 |
| 40 | −44.35136 | 1.49161 | | | | 38.328 | |
| 41 | −104.49421 | 1.50000 | 1.882997 | 40.76 | 0.5667 | 36.109 | −38.029 |
| 42 | 50.24421 | 8.69548 | 1.518229 | 58.90 | 0.5457 | 35.505 | 45.865 |
| 43 | −42.76309 | 0.49453 | | | | 35.604 | |
| 44 | 151.55145 | 6.51018 | 1.496999 | 81.54 | 0.5375 | 33.452 | 59.851 |
| 45 | −36.61436 | 1.50000 | 1.882997 | 40.76 | 0.5667 | 32.872 | −44.960 |
| 46 | −449.26887 | 1.00055 | | | | 32.614 | |
| 47 | 79.39231 | 5.73260 | 1.522494 | 59.84 | 0.5440 | 32.142 | 83.887 |
| 48 | −96.27308 | 10.00000 | | | | 31.452 | |
| 49 | ∞ | 33.00000 | 1.608590 | 46.44 | 0.5664 | 40.000 | |
| 50 | ∞ | 13.20000 | 1.516330 | 64.14 | 0.5353 | 40.000 | |
| 51 | ∞ | 14.52000 | | | | 50.000 | |
| Image plane | ∞ | | | | | | |

Aspherical surface data

Fifteenth surface

| | | | |
|---|---|---|---|
| $K = -2.51552\mathrm{e}+003$ | $A4 = 1.29148\mathrm{e}{-006}$ | $A6 = -5.23984\mathrm{e}{-010}$ | $A8 = 3.22417\mathrm{e}{-013}$ |

Twenty-third surface

| | | | |
|---|---|---|---|
| $K = 4.42423\mathrm{e}+000$ | $A4 = -3.50816\mathrm{e}{-007}$ | $A6 = 4.78501\mathrm{e}{-012}$ | $A8 = -2.62170\mathrm{e}{-015}$ |

Various data

| | | | | |
|---|---|---|---|---|
| Zoom ratio | 80.00 | | | |
| Focal length | 10.00 | 89.44 | 342.87 | 800.00 |
| F-number | 1.80 | 1.80 | 1.83 | 4.20 |
| Half angle of view | 28.81 | 3.52 | 0.92 | 0.39 |
| Total lens length | 697.94 | 697.94 | 697.94 | 697.94 |
| d14 | 2.99 | 139.53 | 167.98 | 176.93 |
| d21 | 274.47 | 99.82 | 31.50 | −15.54 |
| d29 | 1.47 | 4.67 | 5.34 | 7.40 |
| d31 | 14.83 | 49.75 | 88.93 | 124.97 |
| Entrance pupil position | 157.062 | 1,033.44 | 3,371.19 | 10,682.26 |
| Exit pupil position | 11,703.09 | 11,703.09 | 11,703.09 | 11,703.09 |
| Front principal point position | 167.07 | 1,123.56 | 3,724.12 | 11,536.76 |

-continued

| | | | | |
|---|---|---|---|---|
| Rear principal point position | 4.52 | −74.92 | −328.35 | −785.26 |

Zoom lens unit data

| Unit | First surface | Focal length | Lens structure length | Front principal point position | Rear principal point position |
|---|---|---|---|---|---|
| 1 | 1 | 246.00 | 138.11 | 81.41 | −19.51 |
| 2 | 15 | −28.50 | 31.07 | 8.71 | −11.29 |
| 31 | 22 | 162.05 | 67.18 | 15.80 | −37.04 |
| 32 | 30 | 126.41 | 14.11 | 6.09 | −2.75 |
| 4 | 32 | 60.40 | 139.20 | 60.72 | 7.63 |

Single lens data

| Lens | First surface | Focal length |
|---|---|---|
| 1 | 1 | −452.60 |
| 2 | 3 | 698.45 |
| 3 | 5 | −1,014.71 |
| 4 | 7 | 687.60 |
| 5 | 9 | 648.53 |
| 6 | 11 | 593.79 |
| 7 | 13 | 938.17 |
| 8 | 15 | −58.23 |
| 9 | 17 | −37.37 |
| 10 | 18 | 34.57 |
| 11 | 20 | −59.72 |
| 12 | 23 | 159.32 |
| 13 | 25 | 205.85 |
| 14 | 27 | −106.31 |
| 15 | 28 | 284.77 |
| 16 | 30 | 126.41 |
| 17 | 34 | −39.85 |
| 18 | 35 | 59.45 |
| 19 | 37 | −24.95 |
| 20 | 38 | 38.54 |
| 21 | 40 | 68.49 |
| 22 | 42 | −38.03 |
| 23 | 43 | 45.87 |
| 24 | 45 | 59.85 |
| 25 | 46 | −44.96 |
| 26 | 48 | 83.89 |
| 27 | 50 | 0.00 |
| 28 | 51 | 0.00 |

Numerical Embodiment 3

Unit: mm

| Surface number | r | d | nd | νd | θgF | Effective diameter | Focal length |
|---|---|---|---|---|---|---|---|
| 1 | 1,997.02113 | 6.00000 | 1.788001 | 47.37 | 0.5559 | 191.702 | −434.145 |
| 2 | 292.93504 | 1.94485 | | | | 182.157 | |
| 3 | 306.27157 | 19.16858 | 1.433870 | 95.10 | 0.5373 | 182.775 | 709.381 |
| 4 | 40,647.76021 | 0.20000 | | | | 183.428 | |
| 5 | 644.82819 | 6.00000 | 1.834000 | 37.16 | 0.5776 | 184.630 | −1,043.409 |
| 6 | 369.80177 | 0.79177 | | | | 184.233 | |
| 7 | 340.12243 | 19.79827 | 1.433870 | 95.10 | 0.5373 | 184.977 | 663.014 |
| 8 | −1,862.37637 | 28.23869 | | | | 185.367 | |
| 9 | 344.48142 | 21.07732 | 1.433870 | 95.10 | 0.5373 | 188.697 | 631.883 |
| 10 | −1,334.37205 | 0.25000 | | | | 188.150 | |
| 11 | 238.37882 | 21.92714 | 1.433870 | 95.10 | 0.5373 | 183.035 | 568.371 |
| 12 | 6,480.80392 | 1.20000 | | | | 181.276 | |
| 13 | 186.26080 | 11.51644 | 1.496999 | 81.54 | 0.5375 | 169.039 | 982.666 |
| 14 | 294.36889 | (Variable) | | | | 166.664 | |
| 15 | 902.31264 | 2.35000 | 1.882997 | 40.76 | 0.5667 | 52.994 | −59.961 |
| 16 | 50.22465 | 8.42696 | | | | 46.500 | |
| 17 | −206.37092 | 1.45000 | 1.772499 | 49.60 | 0.5520 | 45.377 | −37.051 |
| 18 | 33.51906 | 12.77912 | 1.784696 | 26.29 | 0.6135 | 42.303 | 34.802 |
| 19 | −128.75037 | 3.69367 | | | | 42.418 | |

-continued

| Unit: mm | | | | | | | |
|---|---|---|---|---|---|---|---|
| 20 | −47.50344 | 2.00000 | 1.696797 | 55.53 | 0.5434 | 42.318 | −60.277 |
| 21 | 383.02728 | (Variable) | | | | 44.481 | |
| 22 | (Flare Cutting Stop) | 15.00000 | | | | 62.791 | |
| 23 | 362.55588 | 10.16936 | 1.603112 | 60.64 | 0.5415 | 77.257 | 156.579 |
| 24 | −127.01769 | (Variable) | | | | 78.203 | |
| 25 | 264.91299 | 10.45745 | 1.496999 | 81.54 | 0.5375 | 80.475 | 215.010 |
| 26 | −177.62551 | 10.00285 | | | | 80.483 | |
| 27 | −213.23223 | 2.50000 | 1.717362 | 29.52 | 0.6047 | 77.926 | −106.127 |
| 28 | 120.47636 | 8.98229 | 1.496999 | 81.54 | 0.5375 | 78.226 | 271.870 |
| 29 | 1,058.69990 | (Variable) | | | | 78.646 | |
| 30 | 254.51562 | 14.10652 | 1.618000 | 63.33 | 0.5441 | 79.859 | 122.586 |
| 31 | −106.14322 | (Variable) | | | | 79.928 | |
| 32 | (Stop) | 4.90749 | | | | 33.149 | |
| 33 | −72.13544 | 1.80000 | 1.816000 | 46.62 | 0.5568 | 31.533 | −39.850 |
| 34 | 60.43089 | 5.13557 | 1.808095 | 22.76 | 0.6307 | 31.182 | 59.455 |
| 35 | −237.28216 | 7.55722 | | | | 31.023 | |
| 36 | −28.78125 | 1.49977 | 1.816000 | 46.62 | 0.5568 | 30.185 | −24.953 |
| 37 | 72.49578 | 10.08032 | 1.548141 | 45.79 | 0.5686 | 33.439 | 38.544 |
| 38 | −28.55262 | 16.01453 | | | | 34.771 | |
| 39 | 194.31854 | 9.07524 | 1.531717 | 48.84 | 0.5631 | 37.986 | 68.490 |
| 40 | −44.35136 | 1.49161 | | | | 38.073 | |
| 41 | −104.49421 | 1.50000 | 1.882997 | 40.76 | 0.5667 | 35.871 | −38.029 |
| 42 | 50.24421 | 8.69548 | 1.518229 | 58.90 | 0.5457 | 35.263 | 45.865 |
| 43 | −42.76309 | 0.49453 | | | | 35.364 | |
| 44 | 151.55145 | 6.51018 | 1.496999 | 81.54 | 0.5375 | 33.231 | 59.851 |
| 45 | −36.61436 | 1.50000 | 1.882997 | 40.76 | 0.5667 | 32.624 | −44.960 |
| 46 | −449.26887 | 1.00055 | | | | 32.357 | |
| 47 | 79.39231 | 5.73260 | 1.522494 | 59.84 | 0.5440 | 31.878 | 83.887 |
| 48 | −96.27308 | 10.00000 | | | | 31.171 | |
| 49 | ∞ | 33.00000 | 1.608590 | 46.44 | 0.5664 | 40.000 | |
| 50 | ∞ | 13.20000 | 1.516330 | 64.14 | 0.5353 | 40.000 | |
| 51 | ∞ | 14.00000 | | | | 50.000 | |
| Image plane | ∞ | | | | | | |

Aspherical surface data

Fifteenth surface

| K = −2.66393e+003 | A4 = 1.23749e−006 | A6 = −5.73970e−010 | A8 = 3.72435e−013 |
|---|---|---|---|

Twenty-third surface

| K = 6.47133e+000 | A4 = −3.95205e−007 | A6 = 2.42444e−012 | A8 = −2.35458e−015 |
|---|---|---|---|

Various data

| Zoom ratio | 75.00 | | | |
|---|---|---|---|---|
| Focal length | 10.20 | 88.33 | 327.86 | 765.00 |
| F-number | 1.80 | 1.80 | 1.94 | 4.20 |
| Half angle of view | 28.26 | 3.55 | 0.96 | 0.41 |
| Total lens length | 690.36 | 690.36 | 690.36 | 690.36 |
| BF | 14.00 | 14.00 | 14.00 | 14.00 |
| d14 | 3.03 | 136.43 | 164.78 | 173.91 |
| d21 | 277.58 | 107.00 | 40.42 | −7.68 |
| d24 | 1.00 | 4.26 | 5.01 | 4.24 |
| d29 | 1.45 | 1.66 | 2.71 | 7.52 |
| d31 | 14.07 | 47.77 | 84.21 | 119.14 |
| Entrance pupil position | 157.01 | 998.27 | 3,156.40 | 9,859.86 |
| Exit pupil position | 11,703.09 | 11,703.09 | 11,703.09 | 11,703.09 |
| Front principal point position | 167.25 | 1,087.54 | 3,494.71 | 10,678.34 |
| Rear principal point position | 3.77 | −74.60 | −315.05 | −754.02 |

-continued

| Unit: mm |
| --- |

| Zoom lens unit data | | | | | |
| --- | --- | --- | --- | --- | --- |
| Unit | First surface | Focal length | Lens structure length | Front principal point position | Rear principal point position |
| 1  | 1  | 242.80    | 138.11 | 81.68  | −18.91 |
| 2  | 15 | −28.73    | 30.70  | 8.74   | −11.09 |
| 31 | 22 | 156.58    | 25.17  | 19.73  | −1.66  |
| 32 | 25 | −1,370.11 | 31.94  | 113.83 | 82.28  |
| 33 | 30 | 122.59    | 14.11  | 6.24   | −2.60  |
| 4  | 32 | 60.40     | 139.20 | 60.72  | 7.63   |

| Single lens data | | |
| --- | --- | --- |
| Lens | First surface | Focal length |
| 1  | 1  | −434.15   |
| 2  | 3  | 709.38    |
| 3  | 5  | −1,043.41 |
| 4  | 7  | 663.01    |
| 5  | 9  | 631.88    |
| 6  | 11 | 568.37    |
| 7  | 13 | 982.67    |
| 8  | 15 | −59.96    |
| 9  | 17 | −37.05    |
| 10 | 18 | 34.80     |
| 11 | 20 | −60.28    |
| 12 | 23 | 156.58    |
| 13 | 25 | 215.01    |
| 14 | 27 | −106.13   |
| 15 | 28 | 271.87    |
| 16 | 30 | 122.59    |
| 17 | 33 | −39.85    |
| 18 | 34 | 59.45     |
| 19 | 36 | −24.95    |
| 20 | 37 | 38.54     |
| 21 | 39 | 68.49     |
| 22 | 41 | −38.03    |
| 23 | 42 | 45.87     |
| 24 | 44 | 59.85     |
| 25 | 45 | −44.96    |
| 26 | 47 | 83.89     |
| 27 | 49 | 0.00      |
| 28 | 50 | 0.00      |

Numerical Embodiment 4

| Unit: mm | | | | | | | |
| --- | --- | --- | --- | --- | --- | --- | --- |
| Surface number | r | d | nd | vd | θgF | Effective diameter | Focal length |
| 1  | −2,942.18811 | 6.00000    | 1.834810 | 42.74 | 0.5648 | 217.338 | −358.417 |
| 2  | 335.45859    | 1.80000    |          |       |        | 205.268 |          |
| 3  | 335.06633    | 23.70767   | 1.433870 | 95.10 | 0.5373 | 204.608 | 588.078  |
| 4  | −1,057.92901 | 0.20000    |          |       |        | 203.310 |          |
| 5  | 525.29863    | 14.68252   | 1.433870 | 95.10 | 0.5373 | 194.016 | 995.955  |
| 6  | −2,449.90453 | 25.25075   |          |       |        | 194.142 |          |
| 7  | 377.04224    | 20.53079   | 1.433870 | 95.10 | 0.5373 | 194.714 | 681.715  |
| 8  | −1,365.49684 | 0.25000    |          |       |        | 194.066 |          |
| 9  | 306.95406    | 16.15620   | 1.433870 | 95.10 | 0.5373 | 188.834 | 856.440  |
| 10 | 1,716.23164  | 1.49946    |          |       |        | 187.339 |          |
| 11 | 188.24393    | 16.19337   | 1.438750 | 94.66 | 0.5340 | 176.515 | 776.951  |
| 12 | 408.07756    | (Variable) |          |       |        | 174.075 |          |
| 13 | −532.82374   | 2.20000    | 2.003300 | 28.27 | 0.5980 | 45.965  | −35.598  |
| 14 | 38.70473     | 11.72245   |          |       |        | 39.358  |          |
| 15 | −44.02487    | 1.45000    | 1.743198 | 49.34 | 0.5531 | 38.272  | −36.949  |
| 16 | 74.97068     | 9.77415    | 1.892860 | 20.36 | 0.6393 | 39.450  | 33.422   |
| 17 | −47.40353    | (Variable) |          |       |        | 40.531  |          |
| 18 | −41.60635    | 2.00000    | 1.882997 | 40.76 | 0.5667 | 40.435  | −67.527  |
| 19 | −138.92605   | (Variable) |          |       |        | 43.138  |          |

-continued

| | | | Unit: mm | | | | |
|---|---|---|---|---|---|---|---|
| 20 | (Flare Cutting Stop) | 23.00000 | | | | 63.353 | |
| 21 | 144.13786 | 11.49260 | 1.729157 | 54.68 | 0.5444 | 82.058 | 129.132 |
| 22 | −265.71450 | 6.61910 | | | | 82.314 | |
| 23 | 156.77329 | 13.50202 | 1.438750 | 94.66 | 0.5340 | 82.423 | 222.075 |
| 24 | −252.33271 | 0.49825 | | | | 81.676 | |
| 25 | 263.81666 | 2.60000 | 1.854780 | 24.80 | 0.6122 | 79.054 | −167.484 |
| 26 | 92.94563 | (Variable) | | | | 76.338 | |
| 27 | 84.17766 | 15.38886 | 1.496999 | 81.54 | 0.5375 | 76.936 | 126.593 |
| 28 | −236.69003 | 0.50000 | | | | 76.160 | |
| 29 | 381.41978 | 2.50000 | 1.805181 | 25.42 | 0.6161 | 73.073 | −300.006 |
| 30 | 148.29386 | 7.84908 | 1.603112 | 60.64 | 0.5415 | 71.042 | 205.783 |
| 31 | −764.20052 | (Variable) | | | | 69.767 | |
| 32 | (Stop) | 4.84000 | | | | 32.930 | |
| 33 | −128.97009 | 1.40000 | 1.717004 | 47.92 | 0.5605 | 30.504 | −48.412 |
| 34 | 48.03452 | 0.46927 | | | | 29.399 | |
| 35 | 34.19077 | 4.49157 | 1.854780 | 24.80 | 0.6122 | 29.468 | 55.493 |
| 36 | 112.28150 | 3.00681 | | | | 28.626 | |
| 37 | −212.76669 | 1.40000 | 1.891900 | 37.13 | 0.5780 | 27.741 | −63.929 |
| 38 | 78.81799 | 18.42000 | | | | 27.097 | |
| 39 | −516.38868 | 4.15431 | 1.487490 | 70.23 | 0.5300 | 25.535 | 83.729 |
| 40 | −38.04634 | 1.21516 | | | | 25.439 | |
| 41 | −52.28324 | 1.60000 | 1.882997 | 40.76 | 0.5667 | 24.584 | −16.155 |
| 42 | 20.06016 | 9.53057 | 1.639799 | 34.46 | 0.5922 | 24.625 | 22.915 |
| 43 | −45.48049 | 14.90110 | | | | 25.500 | |
| 44 | −161.46817 | 7.07021 | 1.516330 | 64.14 | 0.5353 | 26.161 | 58.695 |
| 45 | −25.97910 | 0.68287 | | | | 26.929 | |
| 46 | −74.12050 | 1.80000 | 2.001000 | 29.13 | 0.5997 | 25.951 | −15.374 |
| 47 | 19.86030 | 10.53753 | 1.808095 | 22.76 | 0.6307 | 26.222 | 20.184 |
| 48 | −73.70705 | 0.20030 | | | | 27.252 | |
| 49 | 803.00743 | 8.16674 | 1.548141 | 45.79 | 0.5686 | 27.454 | 38.874 |
| 50 | −21.92635 | 1.80000 | 1.854780 | 24.80 | 0.6122 | 27.672 | −35.784 |
| 51 | −78.51014 | 11.41542 | | | | 29.352 | |
| 52 | −55.33406 | 8.00662 | 1.487490 | 70.23 | 0.5300 | 32.053 | 99.245 |
| 53 | −27.08806 | 10.70540 | | | | 33.719 | |
| 54 | ∞ | 63.04000 | 1.608590 | 46.44 | 0.5664 | 70.000 | |
| 55 | ∞ | 8.70000 | 1.516330 | 64.15 | 0.5352 | 70.000 | |
| 56 | ∞ | 12.93000 | | | | 70.000 | |
| Image plane | ∞ | | | | | | |

Aspherical surface data

Thirteenth surface

| K = 1.99852e+000 | A4 = 1.15677e−006 | A6 = −2.75064e−008 | A8 = −3.06848e−010 |
| A10 = 9.10515e−013 | A12 = 3.28486e−015 | A14 = 1.35261e−018 | A16 = 5.54400e−022 |
| A3 = 2.74335e−007 | A5 = 9.95673 e−008 | A7 = 4.02226e−009 | A9 = 6.12079e−012 |
| A11 = −8.52506e−014 | A13 = −6.85632e−017 | A15 = −3.84859e−020 | |

Twenty-second surface

| K = 1.21093e+001 | A4 = 2.82183e−007 | A6 = −5.59441e−011 | A8 = −2.00796e−014 |
| A10 = 9.78964e−017 | A12 = −6.30815e−020 | A14 = 1.70834e−023 | A16 = −4.73901e−027 |
| A3 = −2.90901e−008 | A5 = 1.58196e−009 | A7 = 1.10620e−012 | A9 = −1.50730e−015 |
| A11 = 5.86871e−020 | A13 = 1.04584e−022 | A15 = 1.44467e−025 | |

Thirty-first surface

| K = −2.23400e+002 | A4 = 2.77687e−007 | A6 = 4.69555e−010 | A8 = 1 .39733e−013 |
| A10 = −2.98156e−016 | A12 = 4.58582e−019 | A14 = −2.25443e−022 | A16 = 5.80568e−026 |
| A3 = 1.70768e−007 | A5 = −5.73181e−009 | A7 = −1.36230e−011 | A9 = 7.92918e−015 |
| A11 = −8.14405e−018 | A13 = 2.06016e−021 | A15 = −8.57551e−025 | |

Various data

| Zoom ratio | 56.30 | | | |
|---|---|---|---|---|
| Focal length | 14.30 | 107.30 | 555.00 | 805.09 |
| F-number | 2.95 | 2.95 | 2.95 | 4.28 |
| Half angle of view | 32.90 | 4.93 | 0.95 | 0.66 |
| Total lens length | 728.48 | 728.48 | 728.48 | 728.48 |
| BF | 12.93 | 12.93 | 12.93 | 12.93 |
| d12 | 6.61 | 136.28 | 184.15 | 188.26 |
| d17 | 2.11 | 4.89 | 3.34 | 3.05 |
| d19 | 261.93 | 85.90 | 29.61 | 12.81 |
| d26 | 7.53 | 20.05 | 4.00 | 5.24 |
| d31 | 2.45 | 33.51 | 59.53 | 71.27 |

-continued

| Unit: mm | | | | |
|---|---|---|---|---|
| Entrance pupil position | 138.95 | 753.72 | 3,450.77 | 5,157.20 |
| Exit pupil position | 519.25 | 519.25 | 519.25 | 519.25 |
| Front principal point position | 153.65 | 883.75 | 4,614.13 | 7,242.45 |
| Rear principal point position | −1.37 | −94.37 | −542.07 | −792.16 |

Zoom lens unit data

| Unit | First surface | Focal length | Lens structure length | Front principal point position | Rear principal point position |
|---|---|---|---|---|---|
| 1 | 1 | 251.50 | 126.27 | 72.69 | −19.27 |
| 2 | 13 | −24.18 | 29.26 | 3.76 | −17.17 |
| (21 | 13 | −58.94 | 25.15 | −9.89 | −36.49) |
| (22 | 18 | −67.53 | 2.00 | −0.46 | −1.53) |
| 31 | 20 | 142.07 | 57.71 | 15.57 | −29.49 |
| 32 | 27 | 107.51 | 26.24 | 4.41 | −12.95 |
| 4 | 32 | 73.30 | 87.52 | 123.65 | 115.11 |

Single lens data

| Lens | First surface | Focal length |
|---|---|---|
| 1 | 1 | −358.42 |
| 2 | 3 | 588.08 |
| 3 | 5 | 995.95 |
| 4 | 7 | 681.71 |
| 5 | 9 | 856.44 |
| 6 | 11 | 776.95 |
| 7 | 13 | −35.60 |
| 8 | 15 | −36.95 |
| 9 | 16 | 33.42 |
| 10 | 18 | −67.53 |
| 11 | 21 | 129.13 |
| 12 | 23 | 222.07 |
| 13 | 25 | −167.48 |
| 14 | 27 | 126.59 |
| 15 | 29 | −300.01 |
| 16 | 30 | 205.78 |
| 17 | 33 | −48.41 |
| 18 | 35 | 55.49 |
| 19 | 37 | −63.93 |
| 20 | 39 | 83.73 |
| 21 | 41 | −16.16 |
| 22 | 42 | 22.91 |
| 23 | 44 | 58.69 |
| 24 | 46 | −15.37 |
| 25 | 47 | 20.18 |
| 26 | 49 | 38.87 |
| 27 | 50 | −35.78 |
| 28 | 52 | 99.25 |
| 29 | 54 | 0.00 |
| 30 | 55 | 0.00 |

TABLE 1

| | Conditional Expression | Embodiment 1 | Embodiment 2 | Embodiment 3 | Embodiment 4 |
|---|---|---|---|---|---|
| (1) | f1/f2 | −10.448 | −8.632 | −8.451 | −10.476 |
| (2) | Xi3/S23 | 0.456 | 0.442 | 0.270 | 0.437 |
| (3) | |(β3t/β3w)/(β2t/β2w)| | 0.331 | 0.539 | 0.202 | 0.356 |
| (4) | x2i/s23 | 0.776 | 0.800 | 0.877 | 0.789 |
| (5) | ft/fw | 56.0 | 80.0 | 75.0 | 56.3 |
| (6) | 2ωw | 65.8 | 57.6 | 56.5 | 65.8 |
| | f1 | 251.50 | 246.00 | 242.80 | 251.50 |
| | f2 | −24.07 | −28.50 | −28.73 | −24.18 |
| | Xi3 | 26.00 | 25.00 | 15.00 | 23.00 |
| | S23 | 57.05 | 56.50 | 55.42 | 29.61 |
| | β3t | −1.11 | −2.16 | 2.82 | −1.21 |
| | β3w | −0.26 | −0.26 | −0.97 | −0.27 |
| | β2t | −1.55 | −2.31 | −2.30 | −1.51 |
| | β2w | −0.12 | −0.15 | −0.16 | −0.12 |
| | x2i | 89.82 | 99.82 | 107.00 | 85.90 |
| | s23 | 115.82 | 124.82 | 122.00 | 108.90 |
| | ft | 800.80 | 800.00 | 765.00 | 805.09 |
| | fw | 14.30 | 10.00 | 10.20 | 14.30 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-214834, filed Nov. 15, 2018, which is hereby incorporated by reference herein in its entirety.

What is claimed is:

1. A zoom lens comprising in order from an object side to an image side:
   a first lens unit having a positive refractive power and configured not to be moved for zooming;
   one or two second lens units having a negative refractive power and configured to be moved for zooming;
   a stop configured to reduce an outer part of an off-axial light;
   two or three third lens units configured to be moved for zooming; and
   a fourth lens unit,
   wherein conditional expressions $$-13.0 \leq f1/f2 \leq -5.0; \text{ and}$$

$$0.26 \leq Xi3/S23 \leq 0.46$$

are satisfied where f1 represents a focal length of the first lens unit, f2 represents a focal length of the one or two second lens units, Xi3 represents a distance on an optical axis from the stop to a vertex of a surface closest to the object side in the two or three third lens units at a zoom state in which F-drop starts, and S23 represents a distance on the optical axis from a vertex of a surface closest to the image side in the one or two second lens units to the vertex of the surface closest to the object side in the two or three third lens units at the zoom state.

2. The zoom lens according to claim 1, wherein a conditional expression $$0.1 \leq (\beta 3t/\beta 3w)/((\beta 2t/\beta 2w) \leq 0.9$$

is satisfied where $\beta 2w$ and $\beta 2t$ represent lateral magnifications of the one or two second lens units at a wide angle end and a telephoto end, respectively, and $\beta 3w$ and $\beta 3t$ represent lateral magnifications of the two or three third lens units at the wide angle end and the telephoto end, respectively.

3. The zoom lens according to claim 1, wherein a conditional expression $$0.73 \leq x2i/s23 \leq 0.95$$

is satisfied at a zoom state in which a focal length is expressed by $$fw \times \sqrt{Z},$$

where fw represents a focal length of the zoom lens at a wide angle end, and Z represents a zoom ratio of the zoom lens, x2i represents a distance on the optical axis from the vertex on the surface closest to the image side in the one or two second lens units to the stop.

4. The zoom lens according to claim 1, wherein the stop is configured to be moved monotonously from the image side to the object side for zooming from a wide angle end to a telephoto end.

5. The zoom lens according to claim 1, wherein the stop is configured to be moved along with a lens unit closest to the object side of the two or three third lens units.

6. The zoom lens according to claim 1, further comprising a stop arranged on the image side of the stop and having a variable diameter of an aperture formed thereby.

7. The zoom lens according to claim 1, wherein the two or three third lens units have a positive refractive power.

8. The zoom lens according to claim 1, wherein the two or three third lens units include a lens unit having a negative refractive power.

9. The zoom lens according to claim 1, wherein the fourth lens unit has a positive refractive power and is arranged closest to the image side.

10. The zoom lens according to claim 1, wherein a conditional expression $$45 \leq ft/fw \leq 130$$

is satisfied where fw represents a focal length of the zoom lens at a wide angle end, and ft represents a focal length of the zoom lens at a telephoto end.

11. An image pickup apparatus comprising:
    a zoom lens comprising in order from an object side to an image side:
        a first lens unit having a positive refractive power and configured not to be moved for zooming;
        one or two second lens units having a negative refractive power and configured to be moved for zooming;
        a stop configured to reduce an outer part of an off-axial light;
        two or three third lens units configured to be moved for zooming; and
        a fourth lens unit,
        wherein conditional expressions $$-13.0 \leq f1/f2 \leq -5.0; \text{ and}$$

$$0.26 \leq Xi3/S23 \leq 0.46$$

are satisfied where f1 represents a focal length of the first lens unit, f2 represents a focal length of the one or two second lens units, Xi3 represents a distance on an optical axis from the stop to a vertex of a surface closest to the object side in the two or three third lens units at a zoom state in which F-drop starts, and S23 represents a distance on the optical axis from a vertex of a surface closest to the image side in the one or two second lens units to the vertex of the surface closest to the object side in the two or three third lens units at the zoom state; and
    an image pickup element configured to receive an image formed by the zoom lens.

12. The image pickup apparatus according to claim 11, wherein a conditional expression $$56.0 \leq 2\omega w \leq 72.6$$

is satisfied where $\omega w$ represents a half angle of view of the zoom lens at a wide angle end.

* * * * *